United States Patent
Guan et al.

(10) Patent No.: US 7,593,611 B2
(45) Date of Patent: *Sep. 22, 2009

(54) PHOTONIC BAND GAP FIBER AND METHOD OF PRODUCING THE SAME

(75) Inventors: Ning Guan, Sakura (JP); Katsuhiro Takenaga, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/061,417

(22) Filed: Apr. 2, 2008

(65) Prior Publication Data

US 2008/0247721 A1    Oct. 9, 2008

Related U.S. Application Data

(62) Division of application No. 11/623,644, filed on Jan. 16, 2007.

(51) Int. Cl.
*G02B 6/02* (2006.01)
*G02B 6/032* (2006.01)
*G02B 6/44* (2006.01)

(52) U.S. Cl. .................. 385/125; 385/100; 385/123
(58) Field of Classification Search ................ 385/100, 385/123, 125
See application file for complete search history.

(56) References Cited

U.S. PATENT DOCUMENTS

| | | | |
|---|---|---|---|
| 6,539,155 B1 * | 3/2003 | Broeng et al. ............... | 385/125 |
| 6,598,428 B1 | 7/2003 | Cryan et al. | |
| 6,954,574 B1 | 10/2005 | Russell et al. | |
| 2002/0061176 A1 | 5/2002 | Libori et al. | |
| 2003/0059185 A1 | 3/2003 | Russell et al. | |
| 2004/0156610 A1 | 8/2004 | Charlton et al. | |
| 2005/0226578 A1 * | 10/2005 | Mangan et al. ............... | 385/125 |
| 2005/0249470 A1 | 11/2005 | Bird et al. | |

(Continued)

FOREIGN PATENT DOCUMENTS

JP    2003-227941 A    8/2003

(Continued)

OTHER PUBLICATIONS

"Wide-band single-mode photonic band-gap fiber with extended triangular lattice☐☐and capillary core," by Goto et al, Optical Fiber Communication Conference, 2006 and the 2006 National Fiber Optic Engineers Conference. Mar. 2006, paper OFC4.*

(Continued)

*Primary Examiner*—Frank G Font
*Assistant Examiner*—Robert Tavlykaev
(74) *Attorney, Agent, or Firm*—Sughrue Mion, PLLC

(57) ABSTRACT

A photonic band gap fiber is provided having multiple air holes in a silica portion extending in the longitudinal direction of the fiber. The fiber includes a cladding containing an air hole periodic structure in an extended triangular lattice configuration, wherein first rows each having a number of air holes at a first pitch are arranged alternately in the cross section of the fiber with multiple second rows of air holes each with multiple air holes at a second pitch which is twice the first pitch. The fiber further includes an air hole core.

9 Claims, 64 Drawing Sheets

U.S. PATENT DOCUMENTS

| | | |
|---|---|---|
| 2005/0276556 A1 | 12/2005 | Williams et al. |
| 2006/0010921 A1 | 1/2006 | Mori et al. |
| 2006/0133763 A1 | 6/2006 | Dangui et al. |
| 2006/0153512 A1 | 7/2006 | Falkenstein et al. |
| 2007/0163301 A1 | 7/2007 | Dong et al. |

FOREIGN PATENT DOCUMENTS

| | | |
|---|---|---|
| JP | 2005-17650 A | 1/2005 |
| WO | WO 02/075392 A2 | 9/2002 |
| WO | WO 2004/083919 A1 | 9/2004 |

OTHER PUBLICATIONS

"All-solid photonic bandgap fiber," by Luan et al, Optics Letters, vol. 29, No. 20, Oct. 2004, pp. 2369-2371.*

"Two-dimensional Kagome structure, fundamental hexagonal photonic cryustal configuration," by Nielsen et al, Electronics Letters, vol. 35, No. 20, Sep. 1999, pp. 1736-1737.*

"A new photonic bandgap fibre with extended triangular lattice and capillary core," by Takenaga et al, proceedings of 31st European Conference on Optical Communication, vol. 2, Sep. 2005, pp. 153-154.*

"Mode areas and field-energy distribution in honeycomb photonic bandgap fibers," by Laegsgaard et al, Journal of Optical Society of America, part B, vol. 20, No. 10, Oct. 2003, pp. 2037-2045.*

Cregan, et al., "Single-Mode Photonic Band Gap Guidance of Light in Air", Science, Sep. 3, 1999, pp. 1537-1539, vol. 285.

West, et al., "Surface modes in air-core photonic band-gap fibers", Optics Express, Apr. 19, 2004, pp. 1485-1496, vol. 12, No. 8, OSA.

Johnson, et al., "Block-iterative frequency-domain methods for Maxwell's equations in a planewave basis", Optics Express, Jan. 29, 2001, pp. 173-190, vol. 8, No. 3, OSA.

Kim, et al., "Designing Air-Core Photonic-Bandgap Fibers Free of Surface Modes", IEEE Journal of Quantum Electronics, May 2004, pp. 551-556, vol. 40, No. 5, IEEE.

Kaiser, et al., "Spectral losses of unclad vitreous silica and soda-lime-silicate fibers", Journal of the Optical Society of America, Sep. 1973, pp. 1141-1148, vol. 63, No. 9.

Stig E. Barkou et al., "Photonic Bandgap Fibers," LEOS '99, IEEE Lasers and Electro-Optics Society 1999 12th Annual Meeting San Francisco, CA, USA Nov. 8-11, 1999, Piscataway, NJ, USA, IEEE, US, vol. 2, Nov. 8, 1999, pp. 615-616.

* cited by examiner

FIG. 5                                              PRIOR ART
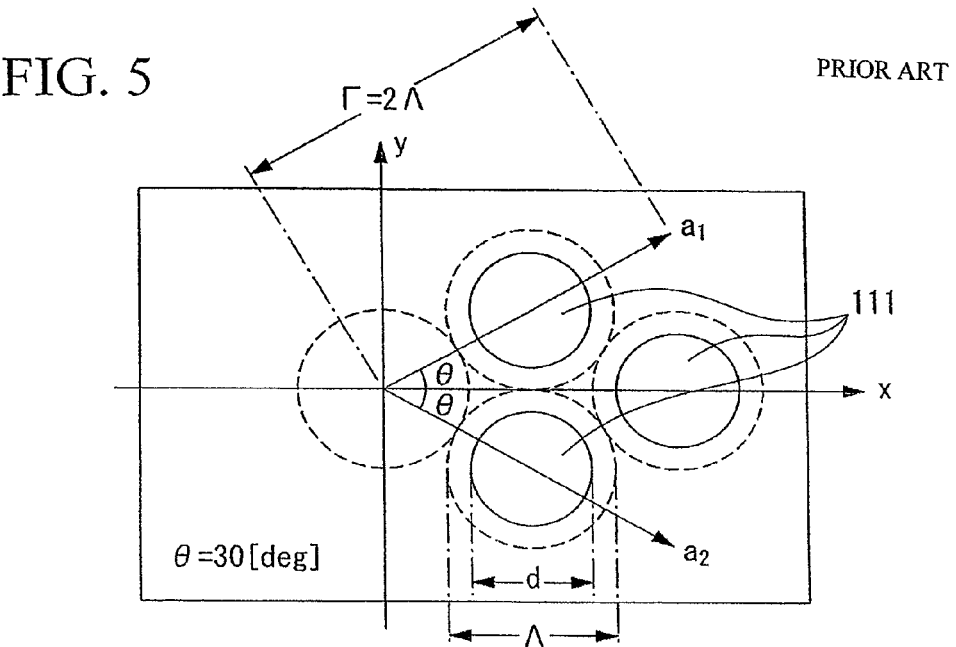
FIG. 6                                              PRIOR ART
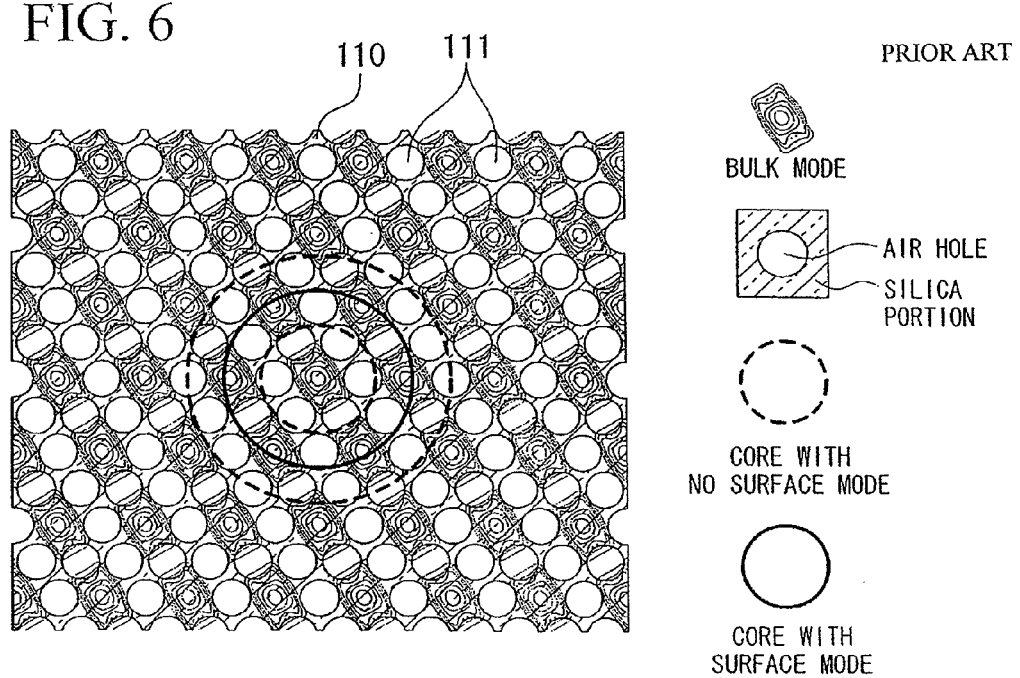

PHOTONIC BAND GAP FIBER AND METHOD OF PRODUCING THE SAME

BACKGROUND OF THE INVENTION

1. Field of the Invention

The present invention relates to a photonic band gap fiber wherein multiple air holes are provided in silica portions along the longitudinal direction of the fiber. The photonic band gap fiber of the present invention can inhibit surface modes specific to ordinary photonic band gap fibers and can expand the transmission bandwidth of the fiber. It can, therefore, be used in very low loss optical transmissions, optical transmissions from the UV region to the visible light region and infrared region, and in fiber laser optical transmissions.

2. Description of Related Art

By using a periodic structure of air holes in the cladding, a photonic band gap fiber (hereinafter referred to as "PBGF") can confine light in the core by making use of its photonic band gap. Even if the core is air, wave guidance is possible. (See R. F. Cregan, B. J. Mangan, J. C. Knight, T. A. Birks, P. St. J. Russell, P. J. Roberts, and D. C. Allan, "Single-mode photonic band gap guidance of light in air," Science, vol. 285, no. 3, pp. 1537-1539, 1999.)

However, even if the periodic structure of air holes provided in the cladding forms a band gap, the core mode wherein light is concentrated in the core couples with the surface mode wherein light is concentrated in the silica close to the core edge and causes a large transmission loss. Thus, optical wave guiding cannot be obtained for the entire wavelength band of the band gap (see J. A. West, C. M. Smith, N. F. Borrelli, D. C. Allan, and K. W. Koch, "Surface modes in air-core photonic band-gap fibers," Opt. Express, vol. 12, no. 8, pp. 1485-1496, 2004).

The presence of a surface mode depends on the magnitude of the core diameter. FIG. 1 shows this dependency.

The conventional PBGF 1 shown in FIG. 1 comprises multiple circular air holes 11 in a triangular lattice configuration in the silica portion 10 seen in the cross section of the fiber. The air hole at the center forms an air hole core 12. The structure of air holes forming a triangular lattice periodic structure with multiple circular air holes 10 arranged at constant pitch in the cross section of fiber in this way is referred to hereinafter as a "normal triangular lattice periodic structure."

In FIG. 1, "bulk mode" refers to a mode with $\Gamma$ points (points at which the wavelength vector has components only in the transmission direction), which has maximum frequencies in the low pass band of the band gap, when the periodic structure of air holes constitutes the band gap.

In the PBGF of the structure as shown in FIG. 1, it is well known that a surface mode is present when the edge of core 12 cuts through the bulk mode, and a surface mode is absent when it does not cut through the bulk mode (see H. K. Kim, J. Shin, S. Fan, M. J. F. Digonnet, and G. S. Kino, "Designing air-core photonic-bandgap fibers free of surface modes," IEEE J. Quant. Electron., vol. 40, no. 5, pp. 551-556, 2004).

FIGS. 2 and 3 are examples of the positional relationship between an air hole core 12 and a bulk mode in the conventional PBGF 1 with a normal triangular lattice periodic structure. The conventional PBGF 1 shown in FIG. 2 comprises multiple circular air holes 11 arranged in a triangular lattice configuration in the silica portion 10 that forms the cladding in the cross section of the fiber. An air hole core 12 is provided formed by air holes in a region that includes six air holes surrounding one central air hole. The conventional PBGF 1 shown in FIG. 3 comprises multiple circular air holes 11 arranged in triangular lattice configuration in the silica portion 10 in the cross section of the fiber. An air hole core 12 is formed by one air hole at the center surrounded by 18 air holes in two layers.

However, when a normal triangular lattice periodic structure as shown in FIGS. 2 and 3 is used in the cladding, the edge of the air hole core 12 cuts through the region wherein bulk mode 13 is present; therefore, it becomes difficult to avoid the surface mode. The result is that the light in the core mode couples with the surface mode, causing large transmission loss, such that optical wave guiding throughout the wavelength band cannot be obtained, the wave guide bandwidth becomes narrow, and the transmission loss increases further.

SUMMARY OF THE INVENTION

An exemplary object of the present invention is to offer a PBGF with low transmission loss and wide wave guide bandwidth after considering the circumstances mentioned above.

A first exemplary aspect of the present invention offers a PBGF with multiple air holes provided in silica portions extending in the longitudinal direction of the fiber. the fiber comprises: a cladding having an air hole periodic structure in an extended triangular lattice configuration in the cross section of the fiber wherein first rows each having a number of air holes at a first pitch, and second rows each having a plurality of air holes at a second pitch which is twice the first pitch, are arranged such that the air holes of the first rows and the air holes of the second rows are disposed alternately so as to form a triangular lattice in the cross section of the fiber. The fiber further comprises an air hole core.

In the PBGF of the first aspect of the present invention, the air hole core may have an almost circular shape in the cross section of the fiber and the diameter D of the air hole core may have the relationship $0.7\Lambda \leq D \leq 3.3\Lambda$ with respect to the first pitch $\Lambda$.

In the PBGF of the first aspect of the present invention, the air hole core may have an almost circular shape in the cross section of the fiber and the diameter D of the air hole core may have the relationship of $4.7\Lambda \leq D \leq 7.3\Lambda$ with respect to the first pitch $\Lambda$.

In the PBGF of the first aspect of the present invention, the air hole core may have an almost circular shape in the cross section of the fiber and the diameter D of the air hole core may have the relationship of $8.7\Lambda \leq D \leq 11.3\Lambda$ with respect to the first pitch $\Lambda$.

In the PBGF of aspect of the present invention, the air holes may have a circular cross section with a diameter d that satisfies the relationship $0.85\Lambda \leq d \leq \Lambda$ with respect to the first pitch $\Lambda$.

In the PBGF of the first aspect of the present invention, three or more layers of the air hole periodic structure in the extended triangular lattice configuration in the cladding may be provided outside the air hole core.

The PBGF of the first aspect of the present invention may have a core mode in which 60% or more of a transmitting power is concentrated in the air hole core region, and may have optical characteristics wherein a surface mode is substantially absent.

The PBGF of the present invention may have optical characteristics wherein only a single core mode (where the number of modes in case of all degenerative modes is taken as 1) is present.

The PBGF of the first aspect of the present invention may have optical characteristics wherein a core mode is present when a wavelength λ, transmitted in the fiber, satisfies a range of 0.7≦Γ/λ≦1.2 (where Γ=2Λ, where Λ is the first pitch).

The PBGF of the first aspect of the present invention may have optical characteristics wherein a core mode is present when a wavelength λ, transmitted in the fiber, is in the range 1.4≦Γ/λ≦1.8 (where Γ=2Λ, and Λ is a first pitch).

In a second exemplary aspect of the present invention, a method of producing PBGF is provided, the method comprising arranging silica capillary tubes and silica rods into first rows of air holes and into second rows of air holes, wherein in each first row, a number of capillary tubes are arranged at a first pitch, and in each second row capillary tubes and silica rods are alternately arranged, such that a capillary tube arrangement of a cross section forms an extended triangular lattice. The method further comprises forming an air hole core region with capillary tube bundles containing silica rods by eliminating a central silica rod, or by eliminating the central silica rod together with capillary tubes and silica rods surrounding the central silica rod, heating the capillary tube bundles containing the silica rods and making them integrated, thus forming a preform for fiber spinning. The method further comprises spinning the preform.

In the method of producing a PBGF according to the second aspect of the present invention, the capillary tubes may have annular cross sections, and the silica rods may have circular cross sections and diameters equal to those of the capillary tubes.

In the method of producing PBGF of the second aspect of the present invention, forming the preform may comprise making the capillary tube bundle containing silica rods integrated while it is inserted in the hole of the silica tube.

In the method of producing PBGF according to the second aspect of the present invention, forming an air hole core region comprises eliminating only one silica rod at a center of a cross section of the capillary tube bundle containing silica rods.

In the method of producing PBGF according to the second aspect of the present invention, forming an air hole core region comprise eliminating one silica rod at a center of a cross section of the capillary tube bundle containing silica rods, and capillary tubes and silica rods in no less than one layer and no more than five layers surrounding the central silica rod.

In the method of production of PBGF according to the present invention, the capillary tube bundle containing silica rods may be provided such that the air hole periodic structure in an extended triangular lattice configuration surrounding the air hole core region has three or more layers of silica rods facing the rear and directed outward.

A third exemplary aspect of the present invention offers a PBGF having multiple air holes in silica portion extending in the longitudinal direction of the fiber, the fiber comprising: a cladding having an air hole periodic structure in an extended triangular lattice configuration in a cross section of the fiber wherein first rows each having a number of air holes at a first pitch, and second rows each having a plurality of air holes at a second pitch which is twice the first pitch, are arranged such that the air holes of the first rows and the air holes of the second rows are arranged so as to form a triangular lattice in the cross section of the fiber. The fiber further comprises an air hole core comprising multiple air holes arranged at a constant pitch in triangular lattice configuration.

In the PBGF of the third aspect of the present invention, the core may comprise a central air hole at a center of the fiber cross section and a first layer of air holes surrounding the central air hole.

In the PBGF of the present invention, the core may comprise an air hole at a center of the fiber cross section and two or more layers of air holes surrounding the air hole at the center of the fiber.

In the PBGF of the third aspect of the present invention, the cross sectional shape of the air holes may be circular and their diameter d may satisfy the relationship 0.85Λ≦d≦Λ with respect to the first pitch Λ.

In the PBGF of the third aspect of the present invention, three or more layers of air hole periodic structure in the extended triangular lattice configuration in the cladding may be provided outside the core.

The PBGF of the present invention may have a core mode in which 60% or more of a transmitting power is concentrated in the core region, and optical characteristics wherein a surface mode is substantially absent.

The PBGF of the third aspect of the present invention may have optical characteristics wherein only a single core mode (where the number of modes in case of all degenerative modes is taken as 1) is present.

The PBGF of the third aspect of the present invention may have optical characteristics wherein a core mode is present when a wavelength λ, transmitted in the fiber, satisfies a range of 0.7≦Γ/λ≦1.2 (where Γ=2Λ, where Λ is the first pitch).

The PBGF of the third aspect of the present invention may have optical characteristics wherein a core mode is present within a range in which a wavelength λ, transmitted in the fiber, satisfies of 1.4≦Γ/λ≦1.8 (where Γ=2Λ, where Λ is the first pitch).

In a fourth exemplary aspect of the present invention, a method of producing a PBGF is provided, the method comprising: arranging silica capillary tubes and silica rods into first rows of air holes wherein a number of capillary tubes are arranged at a first pitch, and into second rows of air holes, wherein the capillary tubes and the silica rods of the second rows are alternately arranged with the tubes and rods of the first rows and arranged such that the capillary tube arrangement of a cross section forms an extended triangular lattice. The method further comprises forming an air hole core region with capillary tube bundles containing silica rods by eliminating a central silica rod, or by eliminating the central silica rod together with capillary tubes and silica rods in one or more layers surrounding the central silica rod, and heating the capillary tube bundles containing the silica rods and making them integrated in order to make a preform for fiber spinning; and subsequently, spinning the preform.

In the method of producing the PBGF according to the fourth aspect of the present invention, the capillary tubes may have an annular cross section, and the silica rods may have a circular cross section with diameters equal to that of the capillary tubes.

In the method of producing PBGF of the fourth aspect of the present invention, the preform for fiber spinning may be produced by making the capillary tube bundle containing silica rods integrated while it is inserted in a hole of a silica tube.

In the method of producing PBGF according to the fourth aspect of the present invention, forming an air hole core region may comprise replacing only one silica rod at a center of the capillary tube bundle containing silica rods with a capillary tube.

In the method of producing PBGF according to the fourth aspect of the present invention, forming an air hole core region may comprise replacing one silica rod at a center of the capillary tube bundle containing silica rods and one layer of silica rods surrounding the silica rod with capillary tubes.

In the method of producing PBGF according to the fourth aspect of the present invention, forming an air hole core region may comprise replacing one silica rod at a center of the capillary tube bundle containing silica rods and two layers of silica rods surrounding the silica rod with capillary tubes.

In the method of production of PBGF according to the fourth aspect of the present invention, the capillary tube bundle containing silica rods may be provided such that the air hole periodic structure in the extended triangular lattice configuration surrounding the air hole core region has three or more layers of silica rods facing the rear and are directed outward.

A fifth exemplary aspect of the present invention offers a PBGF with multiple air holes provided in silica portions along the longitudinal direction of the fiber. The fiber comprises: multiple hexagonally-shaped silica portions at constant pitch $\Gamma$ in a cross section of the fiber arranged in triangular lattice configuration; air holes disposed between the silica portions; a cladding having a periodic structure wherein a length $\omega_r$ between two sides facing each other of the silica portion is equal to a length $\Lambda$ which is half of the pitch $\Gamma$; and an air hole core or a core with multiple hexagonal air holes arranged in triangular lattice configuration.

The sixth exemplary aspect of the present invention offers a PBGF having multiple air holes in a silica portion extending in the longitudinal direction of the fiber. the fiber comprises: a cladding having an air hole periodic structure in an extended triangular lattice configuration with a length $\omega_r$ between two sides facing each other of the silica portion is substantially equal to a first pitch $\Lambda$, wherein first rows of air holes each comprising multiple hexagonal air holes at the first pitch $\Lambda$ is arranged through a silica partition wall in a cross section of the fiber, and second rows of air holes each comprising multiple hexagonal air holes at a second pitch $\Gamma$ which is twice the first pitch are arranged through hexagonally-shaped silica portions such that the air holes of the first rows are disposed alternately with the air holes of the second rows, so as to form a triangular lattice in the cross section of the fiber. The fiber further comprises an air hole core or a core with multiple hexagonal air holes arranged in a triangular lattice configuration.

The PBGF of the sixth aspect of the present invention wherein a thickness $\omega_b$ of the silica partitioning wall may be in the range $0.005\Lambda \leq \omega_b \leq 0.2\Lambda$.

The PBGF of the sixth aspect of the present invention wherein a diameter D of the air hole core has the relationship of $0.7\Lambda \leq D \leq 3.3\Lambda$ with respect to the pitch $\Lambda$.

The PBGF of the fifth and sixth aspects of the present invention wherein a diameter D of the air hole core has the relationship of $4.7\Lambda \leq D \leq 7.3\Lambda$ with respect to the pitch $\Lambda$.

The PBGF of the fifth and sixth aspects of the present invention wherein a diameter D of the air hole core has the relationship of $8.7\Lambda \leq D \leq 11.3\Lambda$ with respect to the pitch $\Lambda$.

In the PBGF of the fifth and sixth aspects of the present invention, three or more layers of the air hole periodic structure in the extended triangular lattice configuration in the cladding may be provided outside the core.

The PBGF of the fifth and sixth aspects of the present invention may have a core mode in which 60% or more of a transmitting power is concentrated in the air hole core region, and may have optical characteristics wherein a surface mode is substantially absent.

The PBGF of the fifth and sixth aspects of the present invention may have optical characteristics wherein only a single core mode (where the number of modes in case of all degenerative modes is taken as 1) is present.

The PBGF of the fifth and sixth aspects of the present invention may have optical characteristics wherein a core mode is present within a range in which a wavelength $\lambda$, transmitted in the fiber, satisfies of $0.6 \leq \Gamma/\lambda \leq 1.5$.

The PBGF of the fifth and sixth aspects of the present invention may have optical characteristics wherein a core mode is present within a range in which a wavelength $\lambda$, transmitted in the fiber, satisfies of $1.4 \leq \Gamma/\lambda \leq 2.3$.

The PBGF of the fifth and sixth aspects of the present invention may have optical characteristics wherein a core mode is present when a wavelength $\lambda$, transmitted in the fiber, satisfies a range of $2.2 \leq \Gamma/\lambda \leq 3.2$.

A seventh exemplary aspect of the present invention provides a method of producing a PBGF, the method comprising: arranging silica capillary tubes and silica rods into first rows of air holes and into second rows of air holes, wherein each first row comprises multiple capillary tubes, and each second row comprises capillary tubes and silica rods are alternately arranged, such that the capillary tube arrangement of a cross section forms an extended triangular lattice. The method further comprises forming an air hole core region by eliminating a central silica rod or by eliminating the central silica rod together with capillary tubes and silica rods surrounding the central silica rod, or by forming a capillary tube bundle containing silica rods by replacing the silica rod with capillary tubes. the method further comprises heating the arrangement of capillary tubes and silica rods and making it integrated, thus forming a preform for fiber spinning while maintaining a pressure in the spaces in the capillary tubes at a higher level than a pressure in the spaces surrounding the capillary tubes. the method further comprises spinning the preform.

In the method of producing PBGF according to the seventh aspect of the present invention, the capillary tubes may have annular cross sections, and the silica rods may have circular cross sections with diameters equal to those of the capillary tubes.

In the method of producing PBGF of the seventh aspect of the present invention, making the arrangement of capillary tubes and silica rods integrated may comprise making the arrangement of capillary tubes and silica rods integrated while it is inserted in a hole of a silica tube.

The method of producing PBGF according to the seventh mode wherein only a pressure in the spaces in the capillary tubes in the arrangement of capillary tubes and silica rods inserted in the air hole of the silica tube may be maintained at or above the atmospheric pressure, and the spaces other than the spaces in the capillary tubes may be maintained in a low pressure condition when performing the integration.

In the method of producing PBGF according to the seventh aspect of the present invention, forming the air hole core region may comprise eliminating one silica rod at a center of a cross section of the arrangement of capillary tubes and silica rods.

In the method of producing PBGF according to the seventh aspect of the present invention, forming the air hole core region may comprise eliminating one silica rod at a center of a cross section of the arrangement of capillary tubes and silica rods, and capillary tubes and silica rods in no less than one layer and no more than five layers surrounding the central silica rod.

The method of producing PBGF according to the seventh aspect of the present invention wherein forming the air hole core region may comprise replacing one silica rod at a center of a cross section of the arrangement of capillary tubes and silica rods with a capillary tube.

The method of producing PBGF according to the seventh aspect of the present invention wherein forming the air hole core region may comprise replacing one silica rod at a center of a cross section of the arrangement of capillary tubes and silica rods, and silica rods and capillary tubes surrounding the silica rod at the center, with capillary tubes.

In the method of production of PBGF according to the seventh aspect of the present invention, the arrangement of capillary tubes and silica rods may be provided such that the air hole periodic structure in the extended triangular lattice configuration surrounding the air hole core region has three or more layers of silica rods facing the rear and are directed outward.

An eighth exemplary aspect of the present invention offers a PBGF with multiple air holes in silica portions along a longitudinal direction of the PBGF, the fiber comprising: multiple hexagonally-shaped silica portions at a constant pitch $\Gamma$ in a cross section of the fiber arranged in a triangular lattice configuration; air holes between the silica portions; a cladding having a periodic structure wherein a length $\omega_r$ between two sides facing each other of the silica portions is smaller than a length $\Lambda$ which is half of the pitch $\Gamma$; and an air hole core or a core with multiple hexagonal air holes arranged in a triangular lattice configuration.

A ninth exemplary aspect of the present invention offers a PBGF having multiple air holes in silica portions extending in a longitudinal direction of the fiber, the fiber comprising: a cladding having an air hole periodic structure in an extended triangular lattice configuration wherein a length $\omega_r$ between two sides facing each other of the silica portions is smaller than a first pitch $\Lambda$, first rows of air holes each comprising multiple hexagonal air holes at the first pitch $\Lambda$ in a cross section of the fiber arranged through a partition wall, and second rows of air holes each second row comprising multiple hexagonal air holes at a second pitch $\Gamma$ which is twice the first pitch arranged through the hexagonally-shaped silica portions; and an air hole core or a core with multiple hexagonal air holes arranged in a triangular lattice configuration.

The PBGF of the ninth aspect of the present invention wherein a thickness $\omega_b$ of a silica partitioning wall surrounding the air holes may be in the range $0.005\Lambda \leq \omega_b \leq 0.2\Lambda$.

The PBGF of the ninth aspect of the present invention wherein a thickness $\omega_b$ of a silica partitioning wall surrounding the air holes may be in the range $0.05\Lambda \leq \omega_b \leq 0.5\Lambda$.

The PBGF of the present invention wherein $\omega_r$, the length between two sides facing each other of the silica portion may be in the range $0.4\Lambda \leq \omega_r \leq \Lambda$.

The PBGF of the ninth aspect of the present invention wherein a diameter D of the air hole core may have the relationship $0.7\Lambda \leq D \leq 3.3\Lambda$ with respect to the first pitch $\Lambda$.

The PBGF of the eighth aspect or the ninth aspect of the present invention wherein a diameter D of the air hole core may have the relationship of $4.7\Lambda \leq D \leq 7.3\Lambda$ with respect to the first pitch $\Lambda$.

The PBGF of the eighth aspect or the ninth aspect of the present invention wherein a diameter D of the air hole core may have the relationship of $8.7\Lambda \leq D \leq 11.3\Lambda$ with respect to the first pitch $\Lambda$.

In the PBGF of the eighth aspect or the ninth aspect of the present invention, three or more layers of the air hole periodic structure in the extended triangular lattice configuration in the cladding may be provided outside the core.

The PBGF of the eighth aspect or the ninth aspect of the present invention may have a core mode in which 60% or more of a transmitting power is concentrated in the air hole core region, and optical characteristics wherein a surface mode is substantially absent.

The PBGF of the present invention may have optical characteristics wherein only a single core mode (where the number of modes in case of all degenerative modes is taken as 1) is present.

The PBGF of the fifth and sixth aspects of the present invention may have optical characteristics wherein a core mode is present within a range in which a wavelength $\lambda$, transmitted in the fiber, satisfies a range of $0.6 \leq \Gamma/\lambda \leq 1.7$.

The PBGF of the eighth aspect or the ninth aspect of the present invention may preferably have optical characteristics wherein a core mode is present within a range in which a wavelength $\lambda$, transmitted in the fiber, satisfies a range of $1.5 \leq \Gamma/\lambda \leq 2.4$.

The PBGF of the eighth aspect or the ninth aspect of the present invention may have optical characteristics wherein a core mode is present when a wavelength $\lambda$, transmitted in the fiber, satisfies a range of $2.1 \leq \Gamma/\lambda \leq 3.5$.

The PBGF of the eighth aspect or the ninth aspect of the present invention may have optical characteristics wherein a core mode is present when a wavelength $\lambda$, transmitted in the fiber, satisfies a range of $0.7 \leq \Gamma/\lambda \leq 2.4$.

A tenth exemplary aspect of the present invention provides a method of producing a PBGF, the method comprising: arranging silica capillary tubes and hollow silica tubes, having wall thicknesses greater than that of the capillary tubes, into first rows of air holes and into second rows of air holes, wherein each first row comprises multiple capillary tubes, and each second row comprises capillary tubes and hollow silica tubes, wherein the first and second rows are disposed such that a capillary arrangement of a cross section of the fiber forms an extended triangular lattice. the method further comprises forming an air hole core region by eliminating a central hollow silica tube or b eliminating the central hollow silica tube together with capillary tubes and hollow silica tubes surrounding the central silica tube, or by forming a capillary tube bundle in the capillary core region by replacing the central silica tube with capillary tubes. the method further comprises forming a preform for fiber spinning by heating the arrangement of capillary tubes and hollow silica tubes and integrating the arrangement while maintaining a pressure in spaces in the capillary tubes at a high level and a pressure in the spaces within the hollow silica tubes at a low level, such that the spaces within the hollow capillary tubes collapse, and the capillary air holes are converted to hexagonal shape. the method further comprises spinning the preform.

In the method of producing PBGF according to the tenth aspect of the present invention, the capillary tubes may have annular cross sections, and the hollow silica tubes may have cross sections with diameters equal to that of the capillary tubes.

In the method of producing PBGF according to the tenth aspect of the present invention, forming the preform for fiber spinning may comprise integrating the arrangement of capillary tubes and silica rods while it is inserted in a hole of a silica tube.

In the method of producing PBGF according to the tenth aspect of the present invention, only the spaces in the capillary tubes in the arrangement of capillary tubes and silica rods inserted in the air hole of the silica tube may be maintained at or above the atmospheric pressure, and the spaces other than the spaces in the capillary tubes, including the spaces in the hollow silica tubes, may be maintained in a low pressure condition when performing the integration.

In the method of producing PBGF according to the tenth aspect of the present invention, forming the air hole core may comprise eliminating one hollow silica tube at a center of a cross section of the arrangement of capillary tubes and silica rods.

In the method of producing PBGF according to the tenth aspect of the present invention, forming the air hole core may comprise eliminating one hollow silica tube at a center of a cross section of the arrangement of capillary tubes and silica rods together with capillary tubes and hollow silica tubes in no less than one layer and no more than five layers surrounding the hollow silica tube.

In the method of producing PBGF according to the tenth aspect of the present invention, forming the air hole core may comprise replacing one hollow silica tube at a center of a cross section of the arrangement of capillary tubes and silica rods with a capillary tube.

In the method of producing PBGF according to the tenth aspect of the present invention, forming the air hole core region may comprise replacing one hollow silica tube at a center of a cross section of the arrangement of capillary tubes and silica rods and hollow silica tubes surrounding the hollow silica tube with capillary tubes.

In the method of production of PBGF according to the tenth aspect of the present invention, the arrangement of capillary tubes and silica rods may be provided such that the air hole periodic structure in the extended triangular lattice configuration surrounding the core region has three or more layers of hollow silica tubes facing the rear and directed outward.

The PBGF in the first aspect of the present invention has a cladding containing an air hole periodic structure in an extended triangular lattice configuration. Thus, a core made of air holes in a triangular lattice configuration can be realized without the core edge cutting across the bulk mode; optical characteristics wherein only a core mode is present and a surface mode is not generated, can be obtained; a wide wave guide bandwidth can be obtained, and transmission loss can be reduced.

The PBGF in the third aspect of the present invention has a cladding containing an air hole periodic structure in an extended triangular lattice configuration. Thus, a core made of air holes in triangular lattice configuration can be realized without the core edge cutting across the bulk mode; optical characteristics wherein only a core mode is present and a surface mode is not generated, can be obtained; a wide wave guide bandwidth can be obtained, and transmission loss can be reduced.

Moreover, since the core is disposed with multiple air holes in a triangular lattice configuration in the silica portion, compared to a PBGF with a conventional air hole core in which the silica portions between the air holes of the core act as reinforcing material, the mechanical strength of the fiber can be increased.

The PBGF in the fifth aspect of the present invention has a cladding containing an air hole periodic structure in an extended triangular lattice configuration. Thus, an air hole core or a capillary core can be configured without the core edge cutting across the bulk mode; optical characteristics wherein only a core mode is present and a surface mode is not generated, can be obtained; a wide wave guide bandwidth can be obtained, and transmission loss can be reduced.

The PBGF in the eighth and ninth aspects of the present invention has a cladding containing an air hole periodic structure in an extended triangular lattice configuration. Thus, a core at the center of the fiber can be configured without the core edge cutting across the bulk mode; optical characteristics wherein only a core mode is present and a surface mode is not generated, can be obtained; a wide wave guide bandwidth can be obtained, and transmission loss can be reduced.

In the periodic structure mentioned above, the hexagonally-shaped silica portion was made smaller than the pitch $\Lambda$ of the hexagonal air holes. Compared to a periodic structure in which a pitch of the silica portion is equal to the pitch $\Lambda$ of the air holes, the band gap widens, the position of the band gap becomes higher, the size of the fiber required to realize the same wavelength pass band increases, and production becomes easier.

BRIEF DESCRIPTION OF THE DRAWINGS

FIG. 5 is an extended cross section showing the unit cell of the extended triangular lattice of FIG. 4.

FIG. 6 is a cross section showing the relationship between core diameter and surface mode in a PBGF of the present invention.

FIG. 120 shows the power distribution of the modes of the PBGF of Example 4-7.

FIG. 121 shows the permittivity distribution of the PBGF of Example 4-7.

FIG. 122 is a cross section of a PBGF using hexagonal air hole extended triangular lattice structure with $\omega_r/\Lambda=0.8$, $\omega_b/\Lambda=0.1$ produced in Example 4-8.

FIG. 123 is a graph showing the dispersion in the first band gap of the PBGF of Example 4-8.

FIG. 124 shows the power distribution of the modes of the PBGF of Example 4-8.

FIG. 125 shows the permittivity distribution of the PBGF of Example 4-8.

DETAILED DESCRIPTION OF THE INVENTION

First Embodiment

Figure 1:
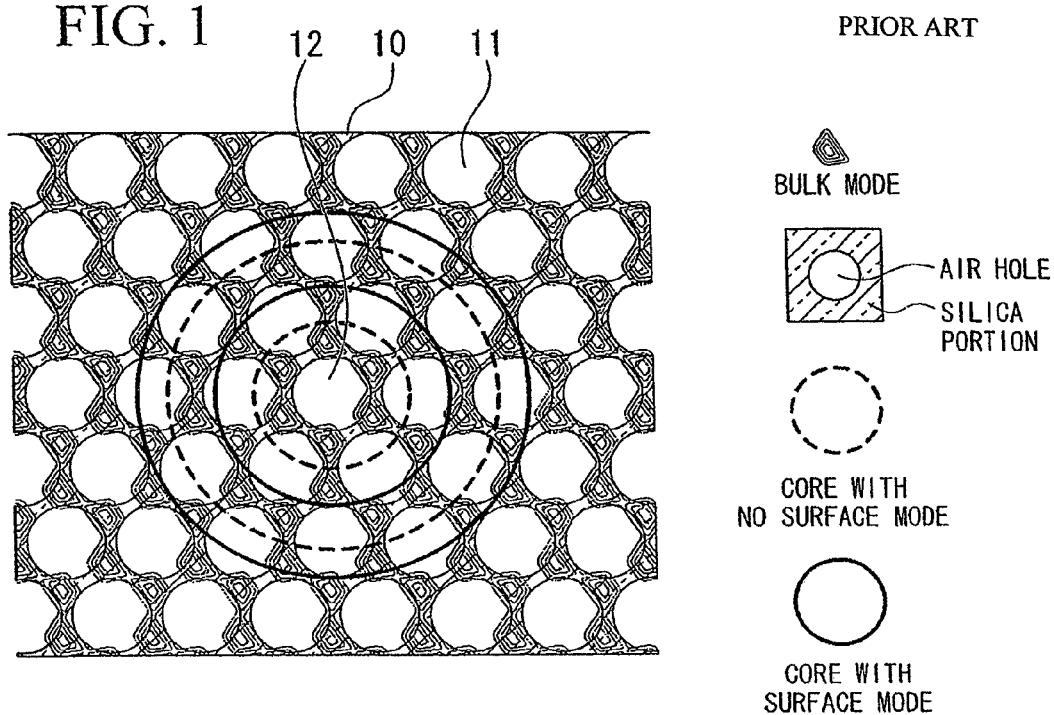
FIG. 1 is a cross section showing the relationship between core diameter and surface mode in a PBGF with a normal triangular lattice periodic structure.
Figure 2:
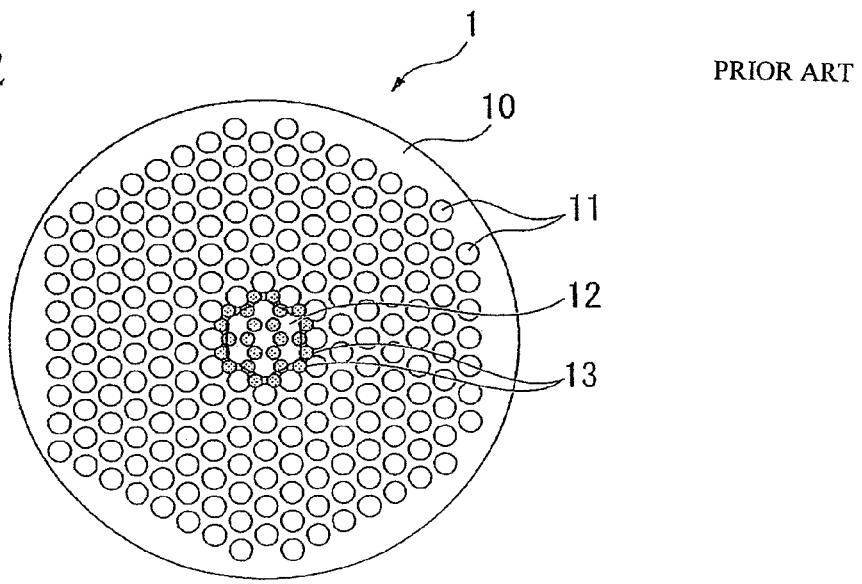
FIG. 2 is a cross section showing the relationship between the air hole core and a bulk mode in a PBGF with a normal triangular lattice periodic structure and air hole core.
Figure 3:
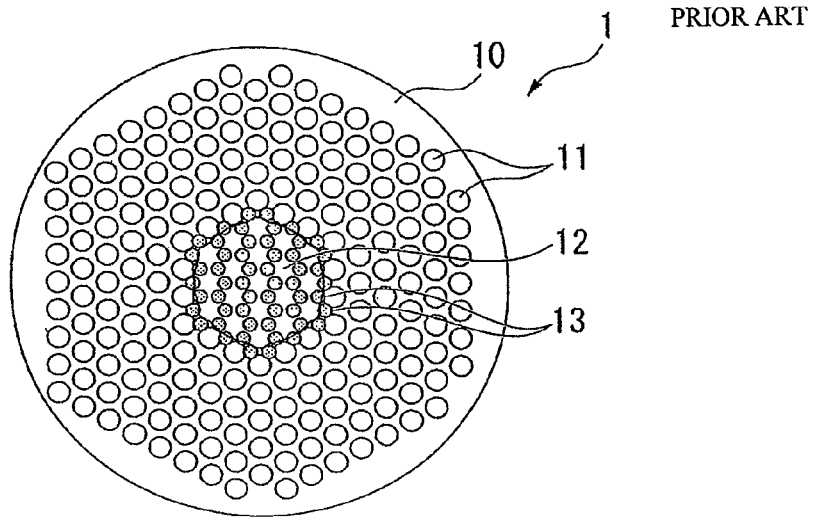
FIG. 3 is a cross section showing the relationship between the air hole core and a bulk mode in a PBGF with a normal triangular lattice periodic structure and air hole core.

The first exemplary embodiment of the present invention is described below referring to the drawings.

Figure 4:
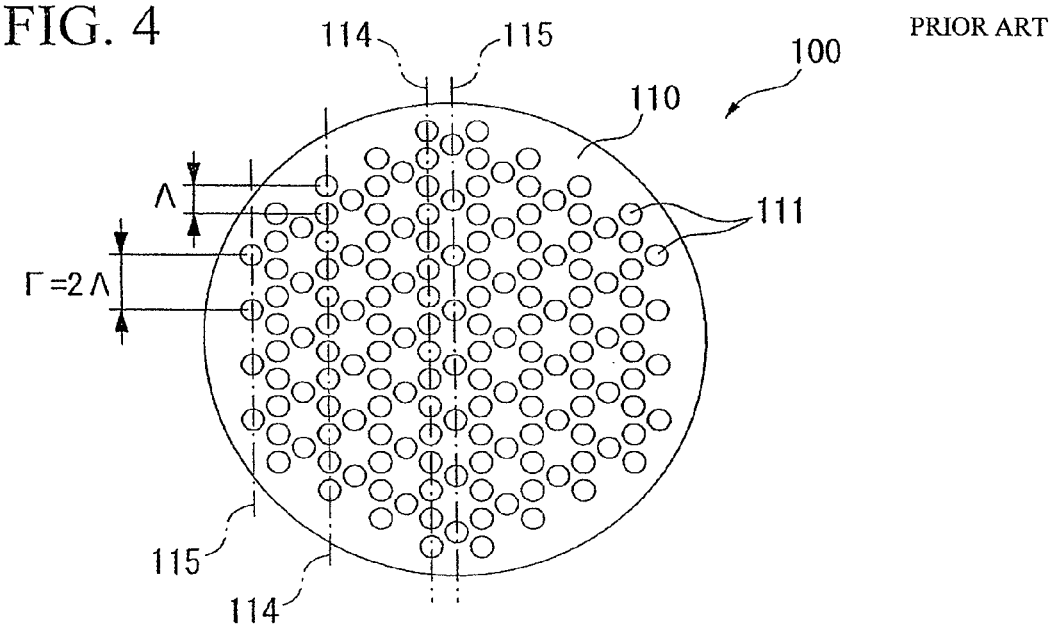
FIG. 4 is a cross section illustrating an air hole periodic structure of an extended triangular lattice used in a PBGF of the first embodiment of the present invention.

FIG. 4 shows an example of an air hole periodic structure in an extended triangular lattice (ETL) form used in the cladding part of a PBGF 100 of the present invention. In this figure, reference numeral 110 is the silica portion, reference numeral 111 are air holes, reference numeral 114 are first rows of air holes, and reference numeral 115 are second rows of air holes.

This air hole periodic structure in an extended triangular lattice configuration is a periodic structure alternately arranged with first rows of air holes 114 each row 114 having multiple air holes 111 at first pitch $\Lambda$ in the cross section of the fiber, and second rows of air holes 115 each row 115 having multiple air holes 111 at a second pitch $\Gamma$, which is twice the first pitch $\Lambda$ ($\Gamma=2\Lambda$) such that the air holes 111 of the second rows 115 and the air holes 111 of the first air rows 114 form a triangular lattice.

FIG. 5 shows a unit cell structure of this extended triangular lattice. In this unit cell, the distance between the centers of adjacent air holes (first pitch) is taken as $\Lambda$, and the diameter of the air holes 11 is taken as d. The fundamental vectors $a_1$ and $a_2$ indicating the periodicity of the lattice are inclined at 30 degrees and −30 degrees with respect to the x axis respectively, while the second pitch $\Gamma$ is $2\Lambda$.

If this air hole periodic structure in an extended triangular lattice configuration is used in the cladding of the PBGF 100, and an appropriate core region is designed, a layer of air holes can be provided between the core and the cladding. The result is that the surface mode can be prevented, and a wide transmission bandwidth can be realized. An air hole periodic structure in an extended triangular lattice configuration can be created by combining capillary tubes and silica rods. Compared to creating a normal triangular lattice periodic structure by combining only capillary tubes, the capillary tube wall does not become extremely thin, and the shape of the air holes can be restricted to a circular shape; therefore, the compression of band gap due to deformation of air holes can be prevented.

FIG. 6 is a cross section showing the relationship between core diameter and surface mode in a PBGF 100 of the present invention. In the air hole periodic structure in an extended triangular lattice configuration used in a PBGF 100 of the present invention, the bulk mode is localized in the silica portion disposed in the silica rod. If an air hole core 112 (see e.g. FIG. 7) is formed at the center of this extended triangular lattice, the core edge can be formed without cutting across the bulk mode. Thus, the surface mode can be avoided.

A PBGF 100 of the present invention has an air hole periodic structure of an extended triangular lattice mentioned earlier, in the cladding, and also has an air hole core 112 at the center. The material of the silica portion 110, other than the air holes in the PBGF 100, of the present invention can be made the same over the entire fiber. For instance, pure silica ($SiO_2$) may be used, but silica glass including a dopant for adjusting the refractive index, such as fluorine or germanium dioxide may alternately be used.

The air hole core 112 is almost circular in shape in the cross section of the fiber. The diameter D of this air hole core can be made to have the relationship: $0.7\Lambda \leq D \leq 3.3\Lambda$ with respect to the first pitch $\Lambda$. By setting the diameter D of the air hole core 112 within the range mentioned above, a PBGF without a surface mode can be provided.

The diameter D of the air hole core 112 may satisfy the relationship: $4.7\Lambda \leq D \leq 7.3\Lambda$ with respect to the first pitch $\Lambda$. By setting the diameter D of the air hole core 112 within the range mentioned above, a PBGF without a surface mode can be provided.

The diameter D of the air hole core may satisfy the relationship of $8.7\Lambda \leq D \leq 11.3\Lambda$ with respect to the first pitch $\Lambda$. By setting the diameter D of the air hole core 112 within the range mentioned above, a PBGF without a surface mode can be provided.

Figure 7:
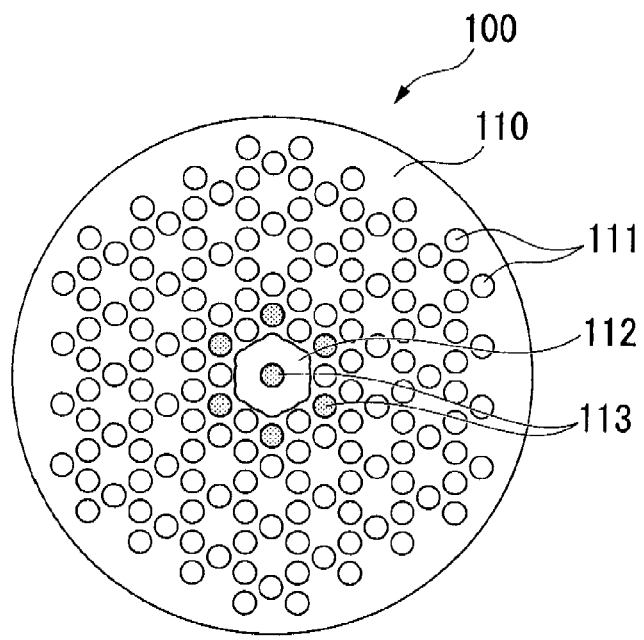
FIG. 7 is a cross section showing a first example of a PBGF of the first embodiment of the present invention.

FIG. 7 is a cross section that shows the first example of a PBGF 100 of the present invention. In this example, the PBGF has an air hole periodic structure in an extended triangular lattice configuration, mentioned above, in the cladding, and comprises an air hole core 112 formed by taking one air hole at the center of the fiber cross section surrounded by a region that includes six air holes in one layer as the air hole core.

Figure 8:
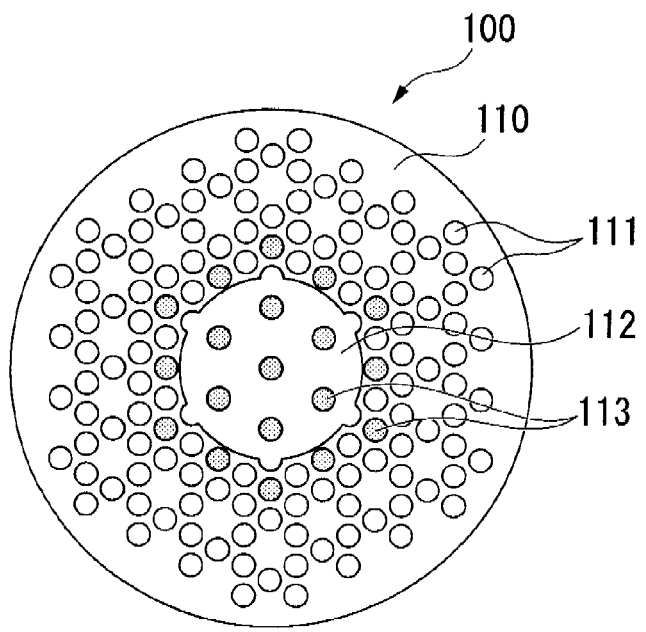
FIG. 8 is a cross section showing a second example of a PBGF of the first embodiment of the present invention.

FIG. 8 is a cross section that shows the second example of a PBGF 100 of the present invention. In this example, the PBGF has an air hole periodic structure in an extended triangular lattice configuration, mentioned above, in the cladding, and comprises an air hole core 112 formed by taking one air hole at the center of the fiber cross section surrounded by a region that includes 36 air holes in three layers as the air hole core.

In these examples, the air holes 111 formed in the PBGF 100 have the same diameter, but the present invention is not restricted to air holes with this diameter only; and it may include air holes with different diameters. The diameters of the air holes may be adjusted by setting the wall thickness of the capillary tubes used in the production of the PBGF.

In an exemplary embodiment of the present invention, the diameter d of the air holes 111 of the PBGF 100 may satisfy the relationship $0.85\Lambda \leq d \leq \Lambda$ with respect to the first pitch $\Lambda$, and may have a cross section of circular shape. If the diameter d is less than the range mentioned above, the band gap becomes too narrow; on the other hand, if it exceeds the range mentioned above, the lattice structure is difficult to retain. Moreover, the cross section shape of the air hole 111 need not necessarily be circular; it can be slightly modified and can be of hexagonal shape, or close to circular shape.

The air hole periodic structure of the extended triangular lattice configuration provided in the cladding may be provided in three or more layers outside the core 112. If the number of layers of extended triangular lattice provided in the cladding is 2 or less, the confinement of light may become inadequate and the loss may increase.

A PBGF 100 of the present invention may have a core mode in which 60% or more, 70% or more or 80% or more of the transmitting power is concentrated in the region of the air hole core 112, and may have optical characteristics wherein the surface mode is substantially absent. If the percentage of the transmitting power of the core mode mentioned above is less than 60%, light will be transmitted into the silica, which is not preferable.

As shown in FIG. 7, a PBGF with a comparatively small air hole core diameter can have optical characteristics wherein only a single core mode (where the number of modes in case of all degenerative modes is taken as 1) is present. This PBGF can be used as a single mode fiber.

On the other hand, as shown in FIG. 8, a PBGF with a large air hole core diameter can be a multi-mode fiber that transmits multiple modes.

The PBGF of the present invention may have optical characteristics wherein the core mode is present when a wavelength $\lambda$, transmitted in the fiber, satisfies a range of $0.7 \leq \Gamma/\lambda \leq 1.2$ (where $\Gamma = 2\Lambda$, where $\Lambda$ is the first pitch). If $\Gamma/\lambda$ is less than 0.7, band gap will be no longer present, and light will not be transmitted. Moreover, if $\Gamma/\lambda$ exceeds 1.2, the band gap will be no longer present, and light will not be transmitted.

If a PBGF operates in a higher order band gap, then $\Gamma/\lambda$ may be within a range of $1.4 \leq \Gamma/\lambda \leq 1.8$. If $\Gamma/\lambda$ is less than 1.4, band gap will be no longer present, and light will not be transmitted. Moreover, if $\Gamma/\lambda$ exceeds 1.8, the band gap will be no longer present, and light will not be transmitted.

Next, as an example of the method of production of a PBGF of the present invention, an example of production of a PBGF 100 of the present invention shown in FIG. 7 and FIG. 8 is described.

In this production method, first, silica capillary tubes and silica rods are arranged into first rows of air holes and second rows of air holes. Each first row is arranged with multiple capillary tubes at the first pitch, and each second row is arranged with alternating capillary tubes and silica rods. Thus, the capillary tube arrangement of the cross section forms an extended triangular lattice. An air hole core region with silica rods containing capillary tube bundles is made by eliminating the central silica rods, or the central silica rods together with the capillary tubes and silica rods surrounding the central silica rods. The capillary tubes used in the production method of the present invention may be of annular cross section and the silica rods may be of circular cross section with diameters equal to that of the capillary tubes.

In case of the production of a PBGF shown in FIG. 7, multiple capillary tubes are combined with silica rods to form extended triangular lattices, and an air hole core region is formed by eliminating one silica rod at the center surrounded by six capillary tubes in one layer surrounding the silica rod.

In case of the production of a PBGF shown in FIG. 8, multiple capillary tubes are combined with silica rods to form extended triangular lattices, and an air hole core region is formed by eliminating one silica rod at the center surrounded by thirty-six capillary tubes and silica rods (30 capillary tubes and six silica rods) in three layers surrounding the central silica rod.

Next, the capillary tube bundle containing silica rods is heated and integrated to produce the preform for fiber spinning. This heating and integrating process can be implemented using the same equipment and method as the heating and integrating process in a conventional method of production of a PBGF wherein capillary tube bundles are used. The capillary tube bundle containing silica rods mentioned above may be taken as the preform for fiber spinning after inserting it in the air hole of the silica tube and integrating it. In this way, when the capillary tube bundle containing silica rods is inserted in the air hole of the silica tube and integrated, the pressure and gas composition in the silica tube may be adjusted appropriately such that deformation of the air hole is minimized and the circular shape is retained after integration.

By spinning the preform for fiber spinning produced as mentioned above, the PBGF shown in FIG. 7 or the PBGF shown in FIG. 8 can be obtained. This spinning process can be implemented using the same equipment and method used in conventional spinning processes in the production of conventional PBGFs and other various kinds of silica glass-based fibers.

The PBGF in the present example has an air hole periodic structure in an extended triangular lattice configuration in the cladding. Thus, a core made of air holes in triangular lattice configuration can be realized without the edge cutting across the bulk mode, optical characteristics wherein only the core mode is present without generating a surface mode can be obtained, wide wave guide bandwidth can be obtained, and transmission loss can be reduced.

The production method of a PBGF according to the present example can be made the same as the conventional method of using capillary tubes, except for replacing some of the capillary tubes with silica rods and combining them, and a PBGF with an air hole periodic structure in an extended triangular lattice configuration can be easily produced. Thus, a PBGF with better optical characteristics than the conventional PBGF can be produced more easily and more economically by using methods similar to those used to produce the conventional PBGF.

EXAMPLE 1-1

Figure 9:
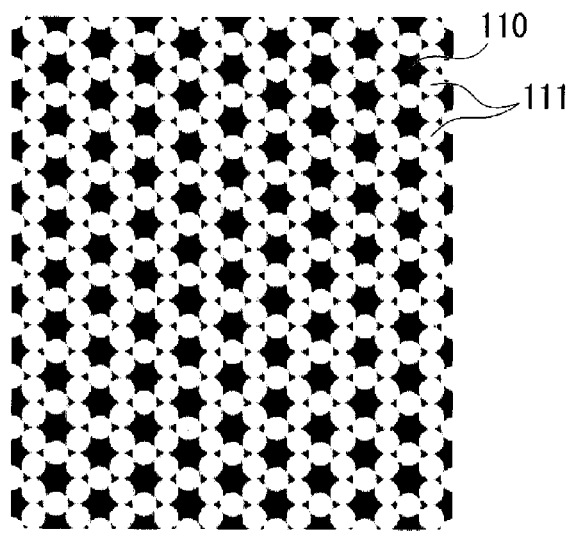
FIG. 9 is a cross section showing the extended triangular lattice structure with $d/\Lambda=1$ in Example 1-1.
Figure 10:
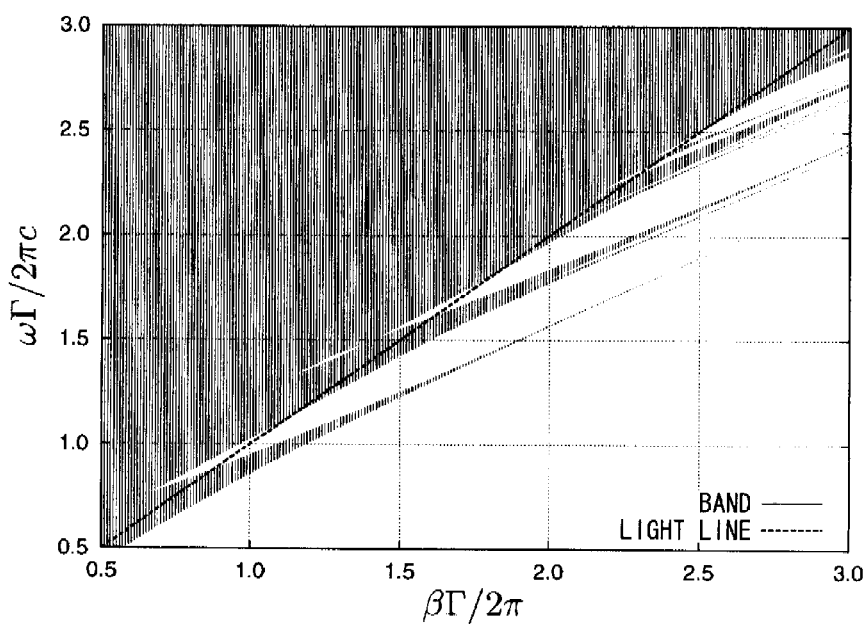
FIG. 10 is a graph showing the band structure of the extended triangular lattice with $d/\Lambda=1$ in Example 1-1.

FIG. 10 shows the band structure of the extended triangular lattice shown in FIG. 9. For the periodic structure of this example, the air hole diameter d was made equal to the pitch $\Lambda$, and the refractive index of silica, n, was taken as 1.45. The black parts are silica and the white parts are air holes in FIG. 9. The band structure was calculated using the Plane wave decomposition method (see S. G. Johnson and J. D. Joannopoulos, "Block-iterative frequency-domain methods for Maxwell's equations in plane wave basis," Opt. Express, vol. 8, no. 3, pp. 173-190, 2001).

In FIG. 10, $\beta$ is the wave number of the transmission direction (direction perpendicular to the periodic structure), $\Gamma=2\Lambda$ is the lattice constant of the extended triangular lattice, $\omega$ is the angular frequency, and c is the velocity of light. The light line expresses the dispersion curve when light is transmitted through a vacuum medium. The region enveloped by bands is the region wherein light cannot be transmitted in any direction in the cross section of the periodic structure, that is, it expresses the band gap. When this periodic structure is used in the fiber cladding, and air holes are used in the core, the region wherein light in the fiber core becomes the wave guide is adjacent to the light line, above which the band gap is present. In this case, the first wave guide region is present when $\Gamma/\lambda$ ($=\omega\Gamma/2\pi c$) is in a range of between 0.77 and 1.10 and the second wave guide region is present when the same ratio is in a range of between 1.54 and 1.80. Here, $\lambda$ is the wavelength of the light transmitted in the fiber.

Figure 11:
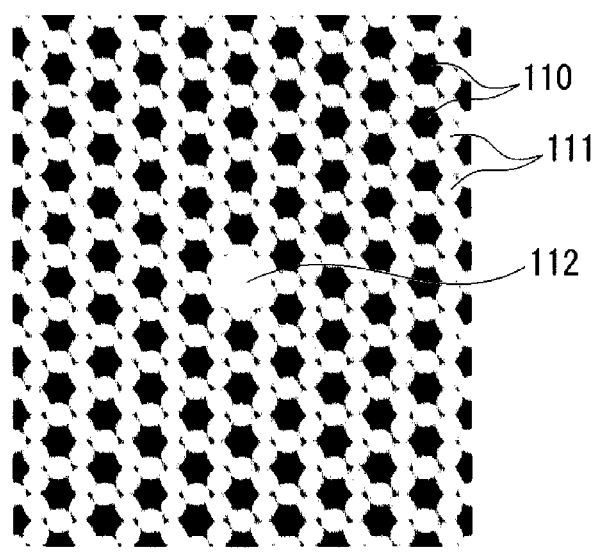
FIG. 11 is a cross section of a PBGF using an extended triangular lattice structure with $d/\Lambda=1$ in Example 1-1.

As shown in FIG. 11, the core mode dispersion was calculated for a PBGF produced using an extended triangular lattice structure with d/$\Lambda$=1 and eliminating the silica rod at the center of the extended triangular lattice and the six capillary tubes in one layer surrounding this silica rod. The PBGF of the present embodiment has an air hole core 112 formed by eliminating one silica rod and six capillary tubes in one layer surrounding it at the center of the extended triangular lattice.

Figure 12:
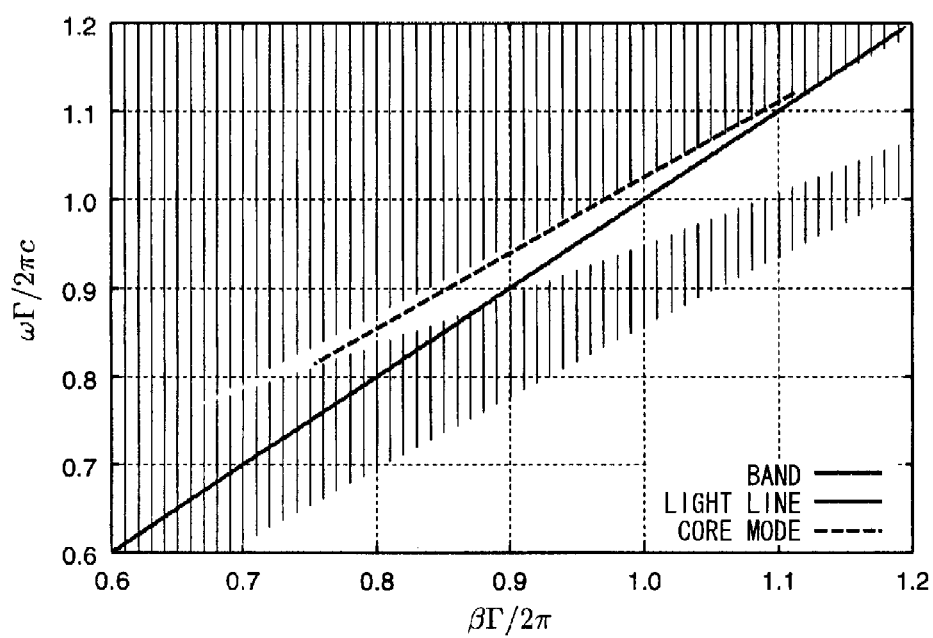
FIG. 12 is a graph showing the dispersion in the first band gap of the PBGF shown in FIG. 11.

FIG. 12 shows the dispersion of the first band gap. As shown in the figure, only the core mode is present in the band gap when $\Gamma/\lambda$=0.81 to 1.12, and the surface mode is absent. Also, the core mode in this case is a single mode (including a degenerative mode).

Figure 13:
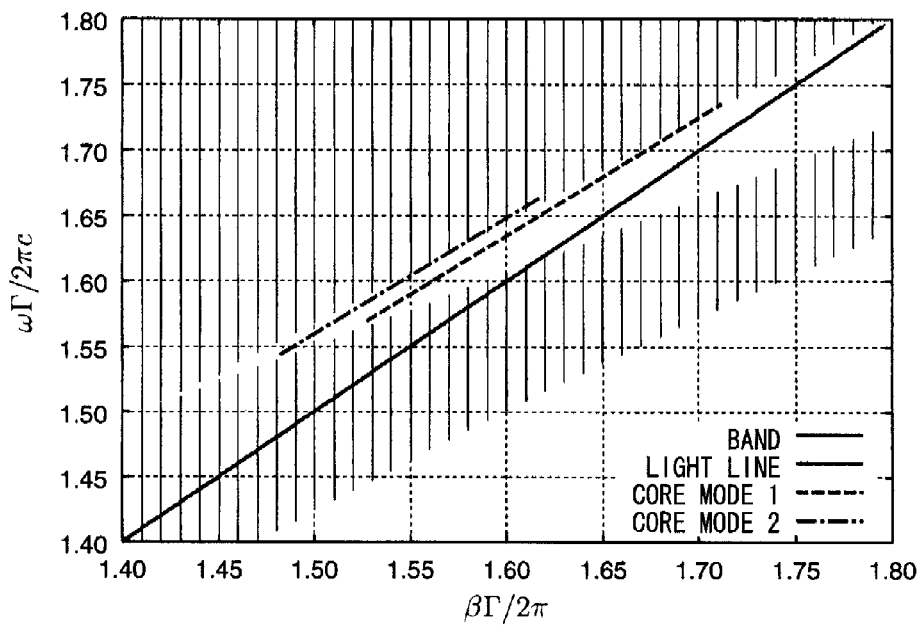
FIG. 13 is a graph showing the dispersion in the second band gap of the PBGF shown in FIG. 11.

FIG. 13 shows the dispersion of the second band gap. As shown in the figure, the core mode 1 is present when $\Gamma/\lambda$=1.57 to 1.73, and core mode 2 is present when $\Gamma/\lambda$=1.54 to 1.66, while no surface mode is present. However, the degenerative mode is included in each core mode.

EXAMPLE 1-2

Figure 14:
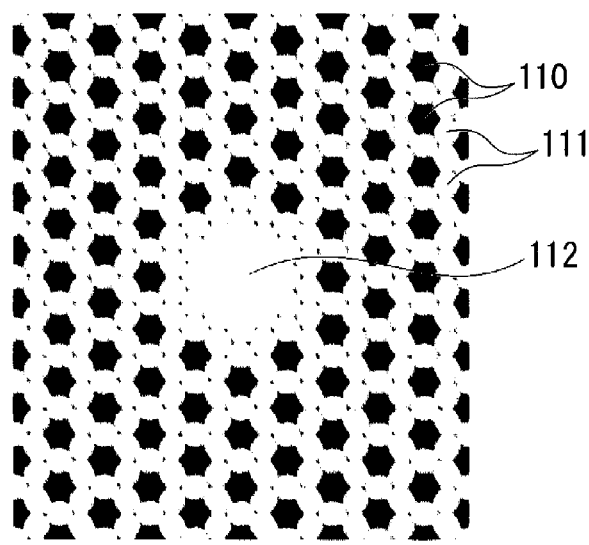
FIG. 14 is a cross section of a PBGF using an extended triangular lattice structure with $d/\Lambda=1$ in Example 1-2.
Figure 15:
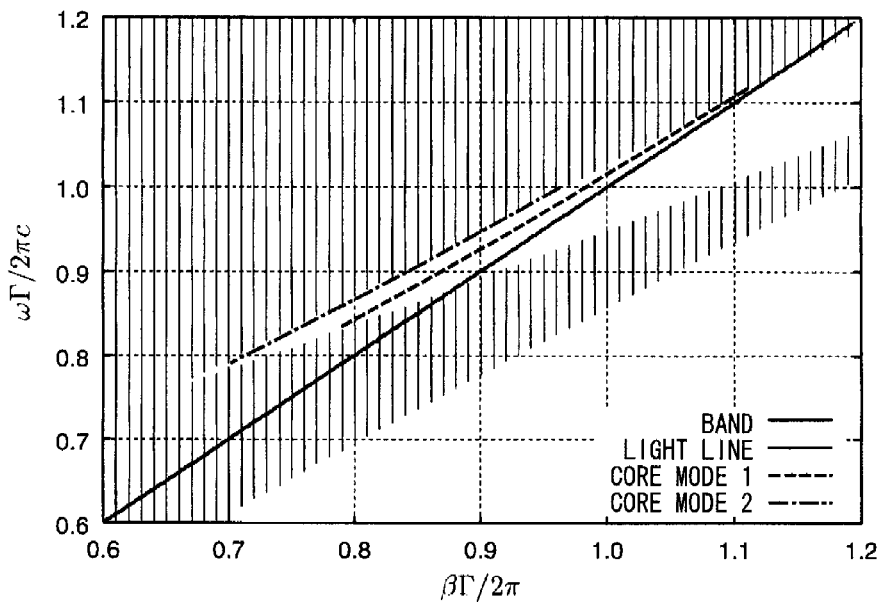
FIG. 15 is a graph showing the dispersion in the first band gap of the PBGF shown in FIG. 14.

As shown in FIG. 14, the core mode dispersion was calculated for a PBGF produced using an extended triangular lattice structure with d/$\Lambda$=1 and eliminating the silica rod at the center of the extended triangular lattice and the thirty-six capillary tubes and silica rods (30 capillary tubes and 6 silica rods) in three layers surrounding this silica rod. FIG. 15 shows the dispersion of the first band gap. As shown in the figure, the first core mode is present when $\Gamma/\lambda$=0.83 to 1.12, the second core mode is present when $\Gamma/\lambda$=0.79 to 1.99, while no surface mode is present. However, the degenerative mode is present in the core mode.

Figure 16:
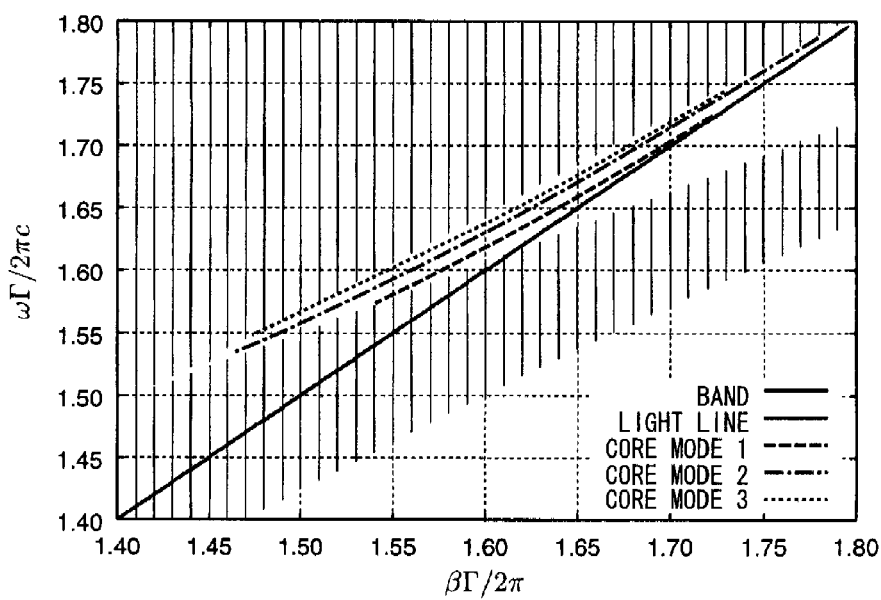
FIG. 16 is a graph showing the dispersion in the second band gap of the PBGF shown in FIG. 14.

FIG. 16 shows the dispersion of the second band gap. As shown in the figure, core mode 1 is present when $\Gamma/\lambda$=1.57 to 1.73, core mode 2 is present when $\Gamma/\lambda$=1.53 to 1.78, core mode 3 is present when $\Gamma/\lambda$=1.55 to 1.74, and no surface mode is present. However, the degenerative mode is present in the core mode.

EXAMPLE 1-3

Figure 17:
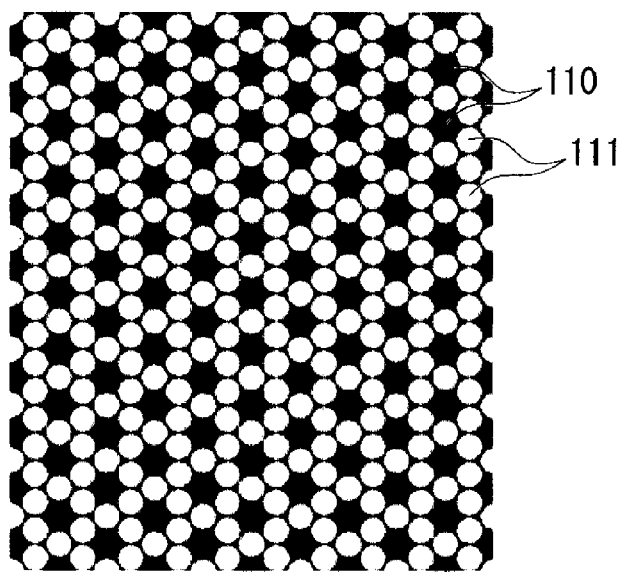
FIG. 17 is a cross section showing the extended triangular lattice structure with $d/\Lambda=0.94$ in Example 1-3.
Figure 18:
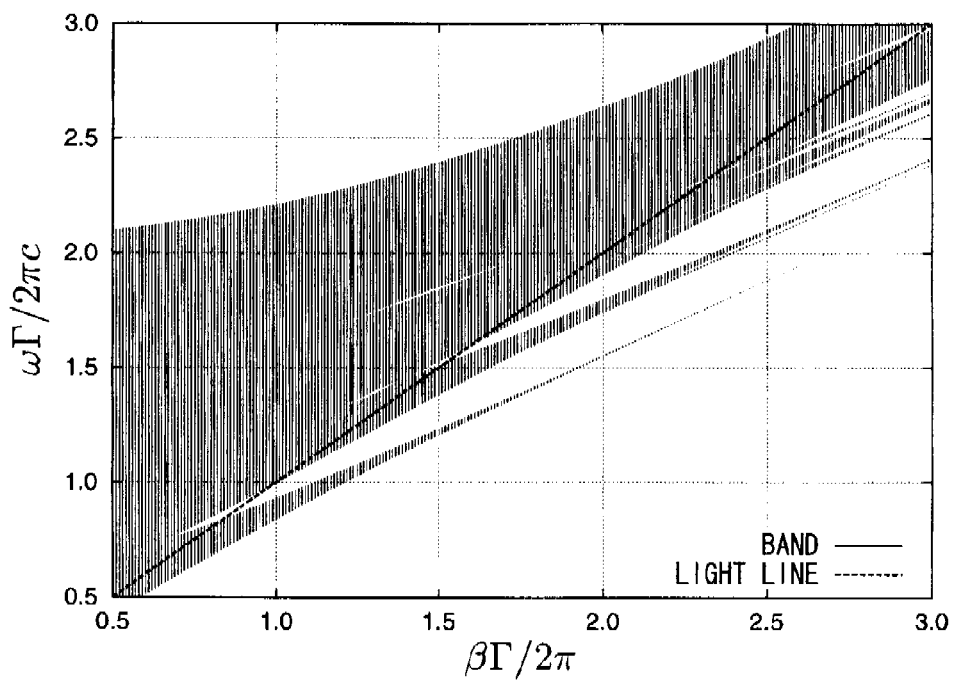
FIG. 18 is a graph showing the band structure of the extended triangular lattice with $d/\Lambda=0.94$ in Example 1-3.

FIG. 18 shows the band structure of the extended triangular lattice shown in FIG. 17. However, the periodic structure was assumed to have an air hole diameter d=0.94$\Lambda$. In this case, the first wave guide region is present when $\Gamma/\lambda$ is in a range of 0.76 to 0.98, and the second wave guide region is present when $\Gamma/\lambda$ is in a range of 1.49 to 1.57.

In this way, it can be seen that as the air hole diameter decreases, the band gap becomes narrower but it is present. Similar to Examples 1-1 and 1-2, by eliminating the silica rod at the center of the extended triangular lattice together with the six capillary tubes in one layer surrounding the silica rod, or by eliminating one silica rod together with the thirty-six capillary tubes and rods (30 capillary tubes and 6 silica rods) in three layers surrounding the silica rod, if an air hole core is formed and a PBGF is produced, then similar to the Examples 1-1 and 1-2, it was confirmed that only a core mode is present while no surface mode is generated.

Second Embodiment

The second exemplary embodiment of the present invention is described here referring to the drawings.

Figure 19:
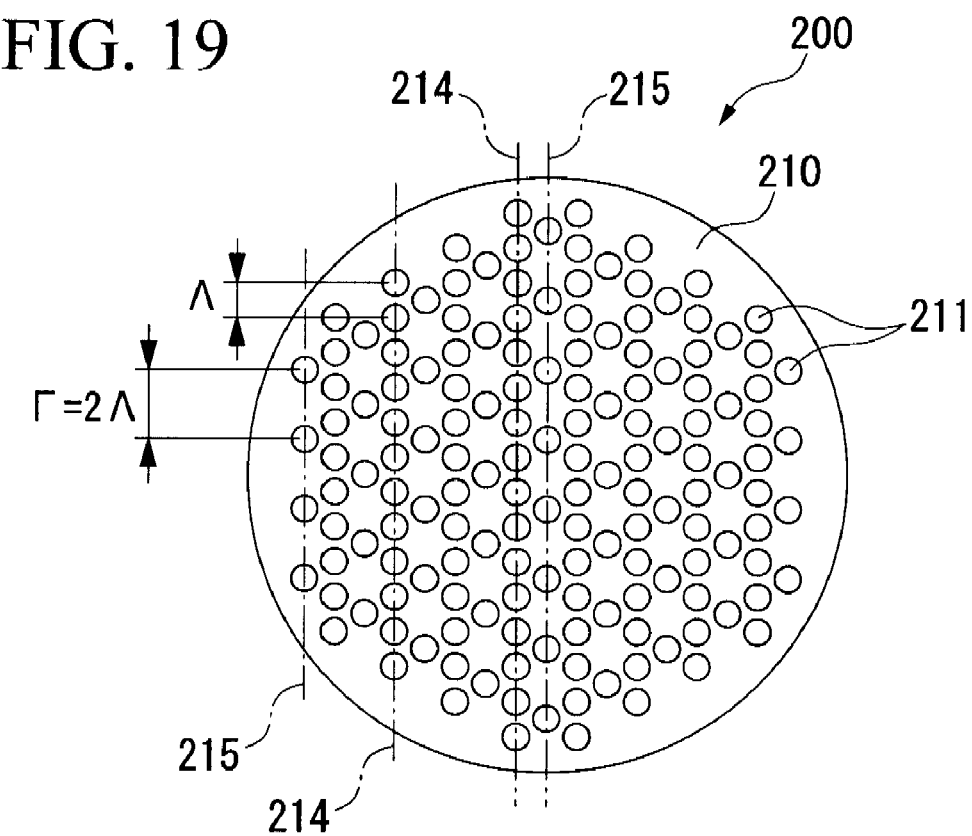
FIG. 19 is a cross section illustrating the air hole periodic structure of the extended triangular lattice used in the PBGF of the second embodiment of the present invention.

FIG. 19 shows an example of an air hole periodic structure in an extended triangular lattice configuration used in the cladding of a PBGF 200 of the present invention. In this figure, the reference numeral 210 indicates the silica portion, 211 indicates the air holes, 214 indicates the first rows of air holes, and 215 indicates the second rows of air holes.

This air hole periodic structure in an extended triangular lattice configuration is a periodic structure alternately arranged with first rows of air holes 214, each row 214 having multiple air holes 211 at first pitch $\Lambda$ in the cross section of the fiber, and multiple second rows of air holes 215, each second row 215 having multiple air holes 211 at the second pitch F, which is twice the first pitch $\Lambda$ ($\Gamma=2\Lambda$) such that the air holes 211 of the second rows 215 and the air holes of the first rows 214 form a triangular lattice.

Figure 20:
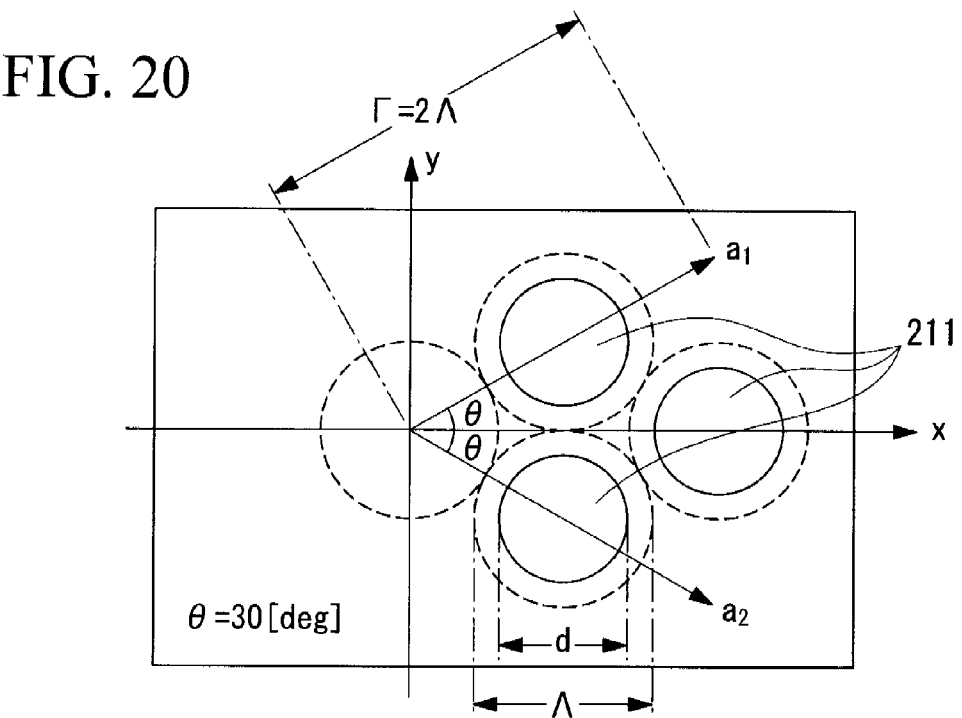
FIG. 20 is an extended cross section showing the unit cell of the extended triangular lattice of FIG. 19.

FIG. 20 shows the unit cell structure of this extended triangular lattice. The distance between the centers of adjacent air holes 211 (first pitch) in this unit cell is taken as $\Lambda$, and the diameter of the air holes 211 is taken as d.

The fundamental vectors $a_1$ and $a_2$ indicating the periodicity of the lattice are inclined at 30 degrees and –30 degrees with respect to the x axis respectively, while the second pitch $\Gamma$ is $2\Lambda$.

If this air hole periodic structure in an extended triangular lattice configuration is used in the cladding of a PBGF 200, and an appropriate core region is designed, a layer of air holes can be provided between the core and the cladding. The result is that the surface mode can be prevented, and a wide transmission bandwidth can be realized. An air hole periodic structure in an extended triangular lattice configuration can be created by combining capillary tubes and silica rods. Compared to creating a normal triangular lattice periodic structure by combining only capillary tubes, the capillary tube wall does not become extremely thin, and the shape of the air holes can be restricted to a circular shape; therefore, the compression of band gap due to deformation of air holes can be prevented.

Figure 21:
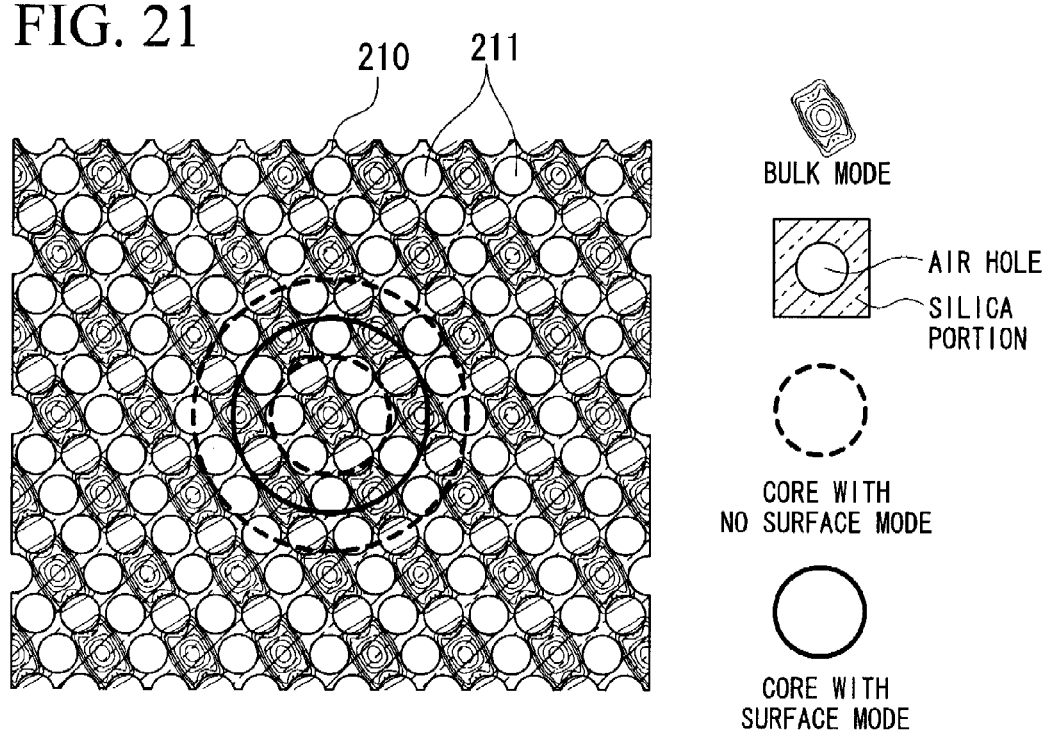
FIG. 21 is a cross section showing the relationship between core diameter and surface mode in the PBGF of the second embodiment of the present invention.

FIG. 21 is a cross section showing the relationship between core diameter and surface mode in the PBGF 200 of the present invention. In the air hole periodic structure in an extended triangular lattice configuration used in the PBGF 200 of the present invention, the bulk mode is localized in the silica portion 210 disposed in the silica rod. If air holes are provided in the triangular lattice configuration at a constant pitch in the silica portion at the center of this extended triangular lattice and the core is formed, the core edge can be formed without cutting across the bulk mode. Thus, a surface mode can be avoided.

The PBGF 200 of the present invention has an air hole periodic structure in an extended triangular lattice configuration, mentioned above, in the cladding, and also has a core 216 formed by multiple air holes 211 arranged at a constant pitch in a triangular lattice configuration. The material of the silica portion 210 other than the air holes in the PBGF of the present invention can be made the same over the entire fiber. For instance, pure silica ($SiO_2$) may be used, but silica glass including a dopant for adjusting the refractive index, such as fluorine or germanium dioxide may be alternately used.

Figure 22:
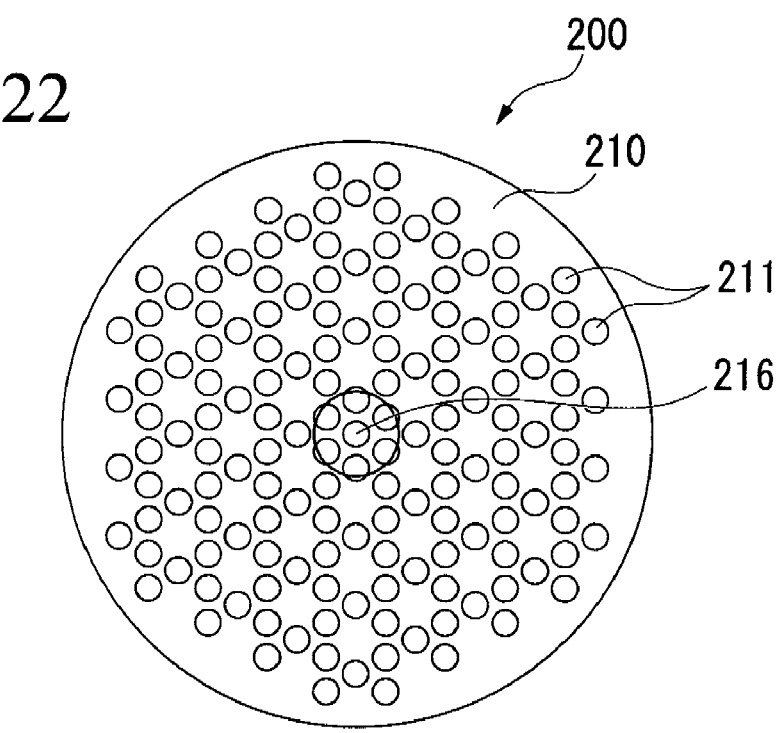
FIG. 22 is a cross section showing the first example of a PBGF of the second embodiment of the present invention.

FIG. 22 is a cross section illustrating the first example of a PBGF 200 of the present invention. The PBGF of the present example has an air hole periodic structure in an extended triangular lattice configuration, mentioned above, in the cladding, and also has a core 216 with a total of seven air holes 211, including the air hole 211 at the center of the fiber cross section and air holes 211 in the first layer (6 air holes), surrounding it.

Figure 23:
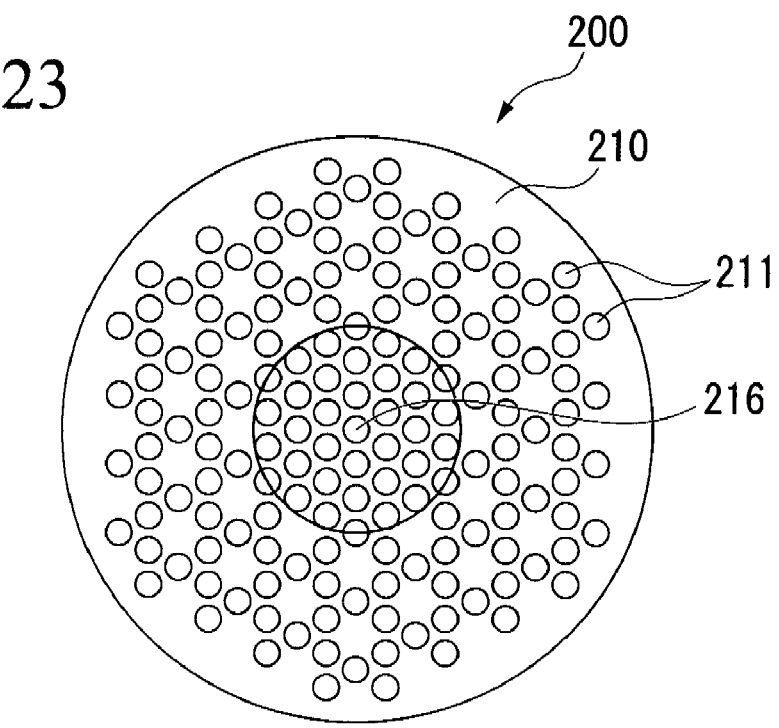
FIG. 23 is a cross section showing the second example of the PBGF of the second embodiment of the present invention.

FIG. 23 is a cross section illustrating the second example of a PBGF 200 of the present invention. The PBGF of the present example has an air hole periodic structure in an extended triangular lattice configuration, mentioned above, in the cladding, and also has a core 216 with a total of thirty-seven air holes 211, including the air hole 211 at the center of the fiber cross section and air holes 211 in the first layer (6 air holes), air holes 211 in the second layer (12 air holes), and air holes 211 in the third layer (18 air holes), surrounding the central air hole.

In these examples, the air holes 211 that form the PBGF have the same diameter in the cladding part as well as the core part, but this not a restriction, and the diameters of the air holes in the cladding part and the core part may be different. The diameter of the air holes may be adjusted by setting the wall thickness of the capillary tubes used in the production of the PBGF.

In an exemplary embodiment of the present invention, the diameter d of the air holes 211 of the PBGF 200 may satisfy the relationship $0.85\Lambda \leq d \leq \Lambda$ with respect to the first pitch $\Lambda$, and have a cross section of circular shape. If the diameter d is less than the range mentioned above, the band gap becomes too narrow; on the other hand, if it exceeds the range mentioned above, the lattice structure is difficult to retain. Moreover, the cross section shape of the air holes 211 need not necessarily be circular; it can be slightly modified and can be of hexagonal shape, or close to circular shape.

The air hole periodic structure of the extended triangular lattice configuration provided in the cladding may be provided in three or more layers outside the core 216. If the number of layers of extended triangular lattice provided in the cladding is 2 or less, the confinement of light may become inadequate and the loss may increase.

The PBGF 200 of the present invention may have a core mode in which 60% or more, 70% or more or 80% or more of a transmitting power is concentrated in the core region, and may have optical characteristics wherein the surface mode is absent substantially. If the percentage of the transmitting power of the core mode mentioned above is less than 60%, light will be transmitted into the silica, which is not preferable.

As shown in FIG. 22, a PBGF with comparatively small air hole core diameter can have optical characteristics wherein only a single core mode (where the number of modes in case of all degenerative modes is taken as 1) is present. This PBGF can be used as a single mode fiber.

On the other hand, as shown in FIG. 23, a PBGF with a large core diameter can be a multi-mode fiber that transmits multiple modes.

The PBGF of the second embodiment of the present invention may have optical characteristics wherein the core mode is present when a wavelength $\lambda$, transmitted in the fiber, satisfies a range of $0.7 \leqq \Gamma/\lambda \leqq 1.2$ (where $\Gamma=2\Lambda$, where $\Lambda$ is the first pitch). If $\Gamma/\lambda$ is less than 0.7, band gap will be no longer present, and light will not be transmitted. Moreover, if $\Gamma/\lambda$ exceeds 1.2, the band gap will be no longer present, and light will not be transmitted.

If the PBGF operates in a high-order band gap, the ratio $\Gamma/\lambda$ mentioned above may be in a range of $1.4 \leqq \Gamma/\lambda \leqq 1.8$. If the ratio $\Gamma/\lambda$ is less than 1.4, the PBGF is outside the high order band gap and does not operate. Also, if $\Gamma/\lambda$ exceeds 1.8, the PBGF is again outside the high order band gap, and it does not operate.

Next, as an example of the production method of the PBGF of the second embodiment of the present invention, the production of the PBGF of the second embodiment of the present invention shown in FIGS. 22 and 23 is explained here.

In this production method, first, silica capillary tubes and silica rods are arranged into first rows of air holes and second rows of air holes. In each first row, a number of capillary tubes are arranged at a first pitch, and in each second row, capillary tubes and silica rods are alternately arranged. Thus, the capillary tube arrangement of the cross section forms an extended triangular lattice. An air hole core region with silica rods containing capillary tube bundles is made by eliminating the central silica rods, or the central silica rod together with the capillary tubes and silica rods in one or more layers surrounding the central silica rod. The silica capillary tubes used in the production method of the present invention may be of annular cross section and the silica rods may be of circular cross section with diameters equal to that of the capillary tubes.

As shown in FIG. 22, in the production of a PBGF with a core 216 having a total of seven air holes in a triangular lattice configuration, including one air hole at the center of fiber cross section surrounded by six air holes in one layer, only one silica rod at the center of the capillary tube bundle with silica rods is replaced by capillary tubes to form the core region.

As shown in FIG. 23, in the production of a PBGF with a core 216 having a total of thirty-seven air holes in a triangular lattice configuration, including one air hole at the center of fiber cross section surrounded by the first layer (six air holes), the second layer (12 air holes) and the third layer (18 air holes), only one silica rod at the center of the capillary tube bundle with silica rods and one layer of silica rods outside it are replaced by capillary tubes to form the core region.

Next, the capillary tube bundle containing silica rods is heated and integrated to produce the preform for fiber spinning. This heating and integrating process can be implemented using the same equipment and method as the heating and integrating process in the conventional method of production of a PBGF wherein capillary tube bundles were used. The capillary tube bundle containing silica rods mentioned above may be taken as the preform for fiber spinning after inserting it in an air hole of a silica tube and integrating it. When the capillary tube bundle containing silica rods is integrated with the bundle while they are inserted in the hole of the silica tube, and if the pressure and gas composition in the silica tube is appropriately adjusted, the capillary tube bundle may be integrated with the air hole maintained in a circular shape without deformation.

Next, by spinning the manufactured preform for fiber spinning as mentioned above, the PBGF shown in FIG. 22 or FIG. 23 can be obtained. This spinning process can be implemented using the same equipment and method used in conventional spinning processes in the production of conventional PBGFs and other various kinds of silica glass-based fibers.

The PBGF in the present example, is an air hole periodic structure in an extended triangular lattice configuration in the cladding. Thus, a core made of air holes in a triangular lattice configuration can be realized without the edge cutting across the bulk mode, optical characteristics wherein only the core mode is present without generating a surface mode can be obtained, a wide wave guide bandwidth can be obtained, and transmission loss can be reduced.

Moreover, since the core is disposed with a multiple air holes triangular lattice configuration in the silica portion, compared to the PBGF with a conventional air hole core wherein the silica portions between the air holes of the core act as reinforcing material, the mechanical strength of the fiber can be increased.

The production method of a PBGF according to the present example can be made the same as the conventional method of using capillary tubes, except for replacing some of the capillary tubes with silica rods and combining them, and a PBGF with an air hole periodic structure in an extended triangular lattice configuration can be easily produced. Thus, a PBGF with better optical characteristics than the conventional PBGF can be produced more easily and more economically by using methods similar to those used for a conventional PBGF.

EXAMPLE 2-1

Figure 24:
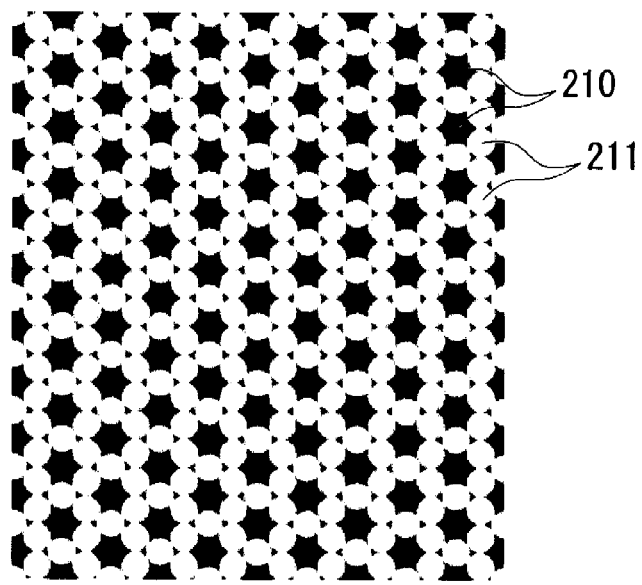
FIG. 24 is a cross section showing the extended triangular lattice structure with $d/\Lambda=1$ in Example 2-1.
Figure 25:
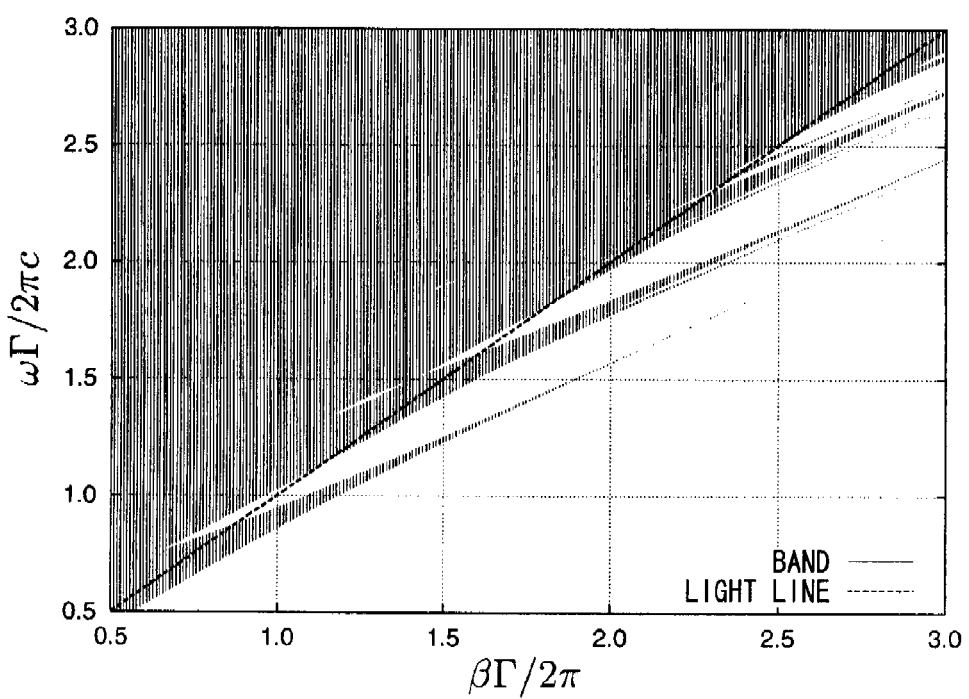
FIG. 25 is a graph showing the band structure of the extended triangular lattice with d/Λ=1 in Example 2-1.

FIG. 24 shows the band structure of the extended triangular lattice shown in FIG. 25. For the periodic structure of this example, the air hole diameter d was made equal to the pitch $\Lambda$, and the refractive index of silica, n, was taken as 1.45. The black parts are silica and the white parts are air holes in FIG. 24. The band structure was calculated using the Plane wave decomposition method (see S. G. Johnson and J. D. Joannopoulos, "Block-iterative frequency-domain methods for Maxwell's equations in plane wave basis," Opt. Express, vol. 8, no. 3, pp. 173-190, 2001).

In FIG. 25, $\beta$ is the wave number of the transmission direction (direction perpendicular to the periodic structure), $\Gamma=2\Lambda$ is the lattice constant of the extended triangular lattice, $\omega$ is the angular frequency, and c is the velocity of light. The light line expresses the dispersion curve when light is transmitted through a vacuum medium. The region enveloped by bands is the region wherein light cannot be transmitted in any direction in the cross section of the periodic structure, that is, it expresses the band gap. When this periodic structure is used in the fiber cladding, and air holes are used in the core, the region wherein light in the fiber core becomes the wave guide is adjacent to the light line, above which the band gap is present. In this case, $\Gamma/\lambda$ ($=\omega\Gamma/2\pi c$) is in a range of between 0.77 and 1.10 and the first wave guide region is present; and the same ratio is in a range of between 1.54 and 1.80 and the second wave guide region is present. Here, $\lambda$ is the wavelength.

Figure 26:
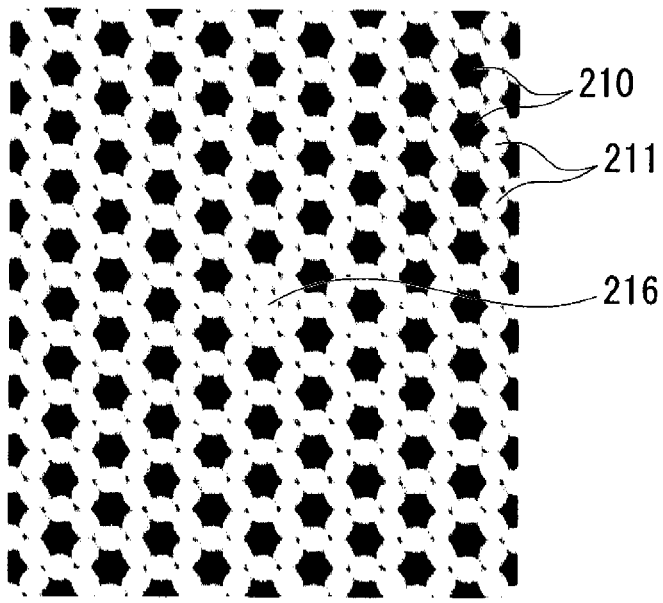
FIG. 26 is a cross section of the PBGF using an extended triangular lattice structure with d/Λ=1 in Example 2-1.

As shown in FIG. 26, the core mode dispersion was calculated for a PBGF produced using an extended triangular lattice structure with $d/\Lambda=1$ and by replacing only the silica rod at the center of the extended triangular lattice by capillary tubes. The PBGF of the present embodiment has a core (capillary core) wherein a total of seven air holes, including the air hole at the center of the extended triangular lattice and the first layer (six air holes) surrounding it, form the normal triangular lattice periodic structure.

Figure 27:
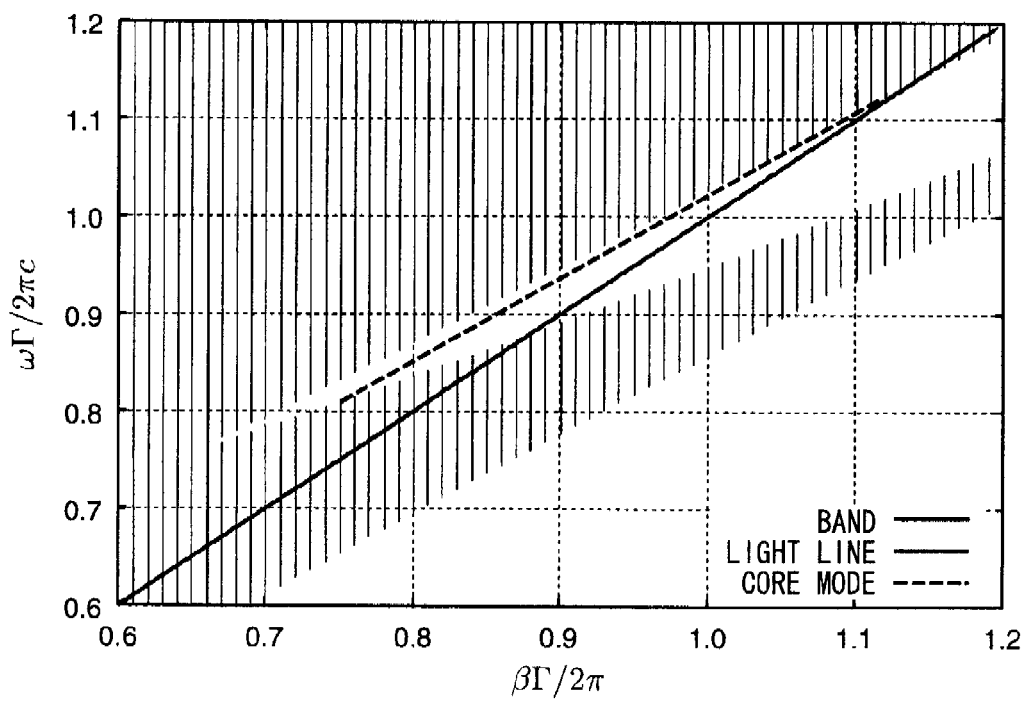
FIG. 27 is a graph showing the dispersion in the first band gap of the PBGF shown in FIG. 26.

FIG. 27 shows the dispersion of the first band gap. As shown in the figure, only the core mode is present in the band gap when Γ/λ=0.81 to 1.12, and the surface mode is absent. Also, the core mode in this case is a single mode (including a degenerative mode).

Figure 28:
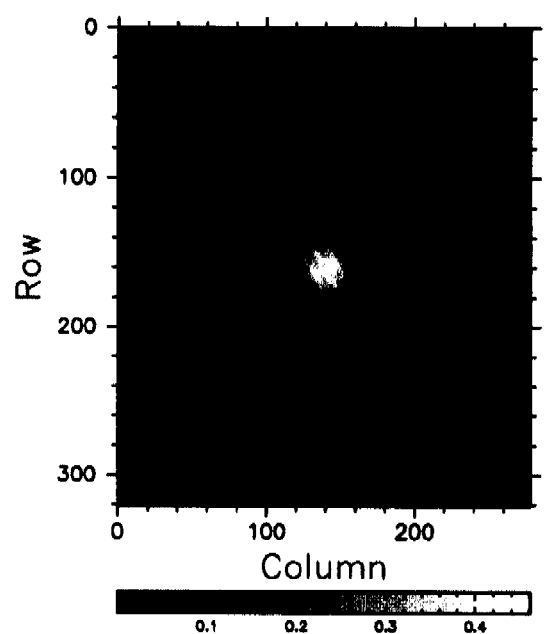
FIG. 28 is a figure showing the power distribution of the core mode of the first band gap of the PBGF shown in FIG. 26.

FIG. 28 shows the typical power distribution at this stage.

Figure 29:
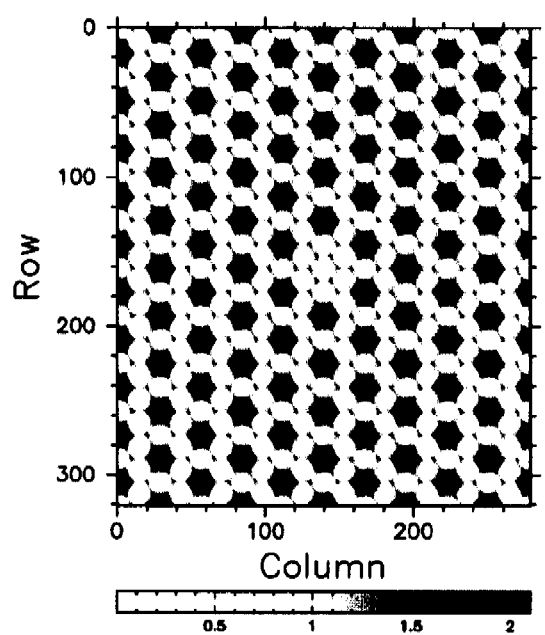
FIG. 29 shows the permittivity distribution of the PBGF shown in FIG. 26.

FIG. 29 shows the permittivity of the fiber drawn to the same scale.

As shown in the figures, the power of the core mode in the PBGF of the present embodiment is distributed only slightly over the silica rod just near the core, while most of it is distributed within the core.

Figure 30:
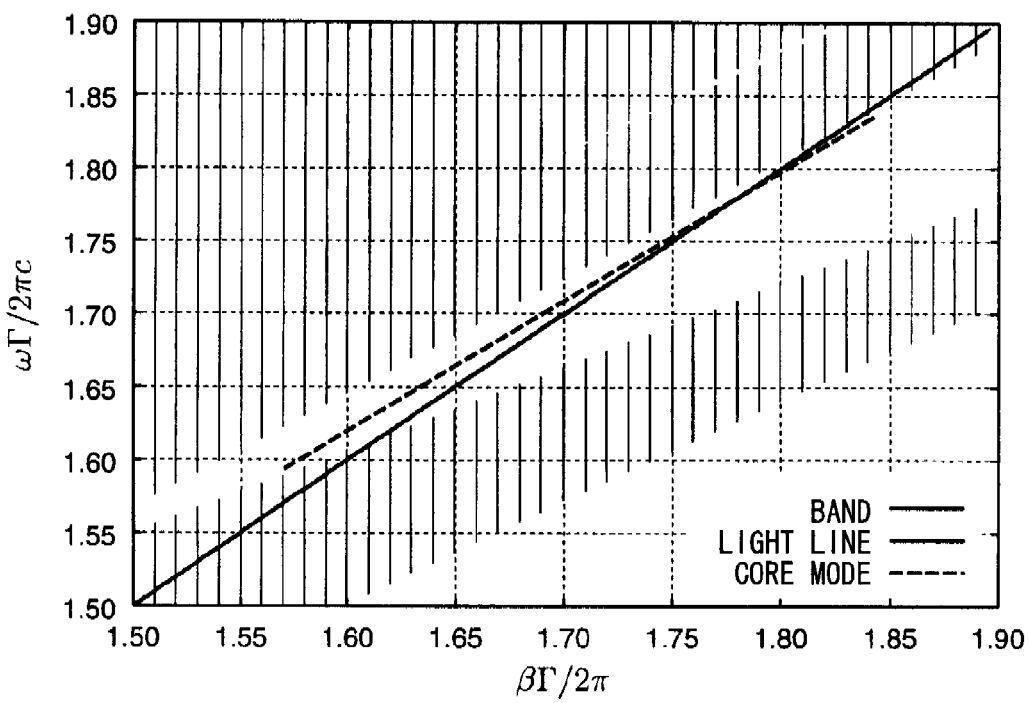
FIG. 30 is a graph showing the dispersion in the second band gap of the PBGF shown in FIG. 26.

FIG. 30 shows the dispersion of the second band gap in the PBGF of the present embodiment. As shown in the figure, the core mode is present but the surface mode is absent when Γ/λ=1.59 to 1.83. The core mode in this case is also a single mode (including degenerative mode). The dispersion of the core mode intersects the light line, but this is because a slight amount of silica remains in the core.

Figure 31:
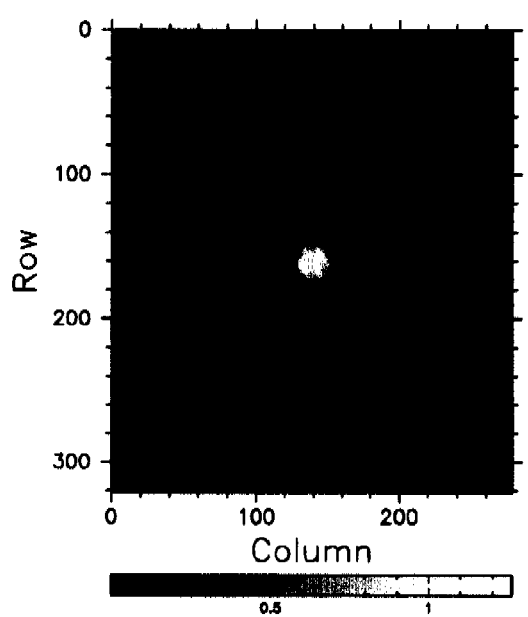
FIG. 31 is a figure showing the power distribution of a core mode 1 of the second band gap of the PBGF shown in FIG. 26.

FIG. 31 shows the typical power distribution of core mode at this stage. As shown in the figure, the power of the core mode is distributed only slightly over the silica rod just near the core, while most of it is distributed within the core.

EXAMPLE 2-2

Figure 32:
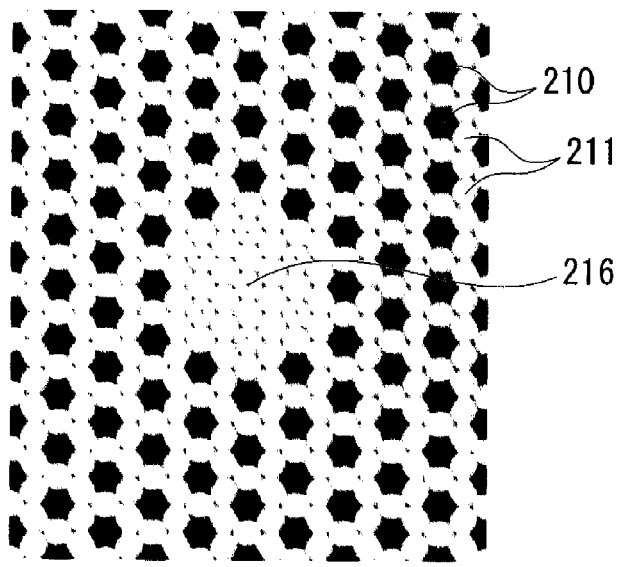
FIG. 32 is a cross section of the PBGF using an extended triangular lattice structure with d/Λ=1 in Example 2-2.

As shown in FIG. 32, the core mode dispersion was calculated for a PBGF produced using an extended triangular lattice structure with d/Λ=1 and by replacing the silica rod at the center of the extended triangular lattice and the silica rods of the outer layers with capillary tubes. The PBGF of the present embodiment has a core (capillary core) wherein a total of thirty-seven air holes, including the air hole at the center of the extended triangular lattice, and the first layer (six air holes), the second layer (12 air holes) and the third layer (18 air holes) surrounding it, form the normal triangular lattice periodic structure.

Figure 33:
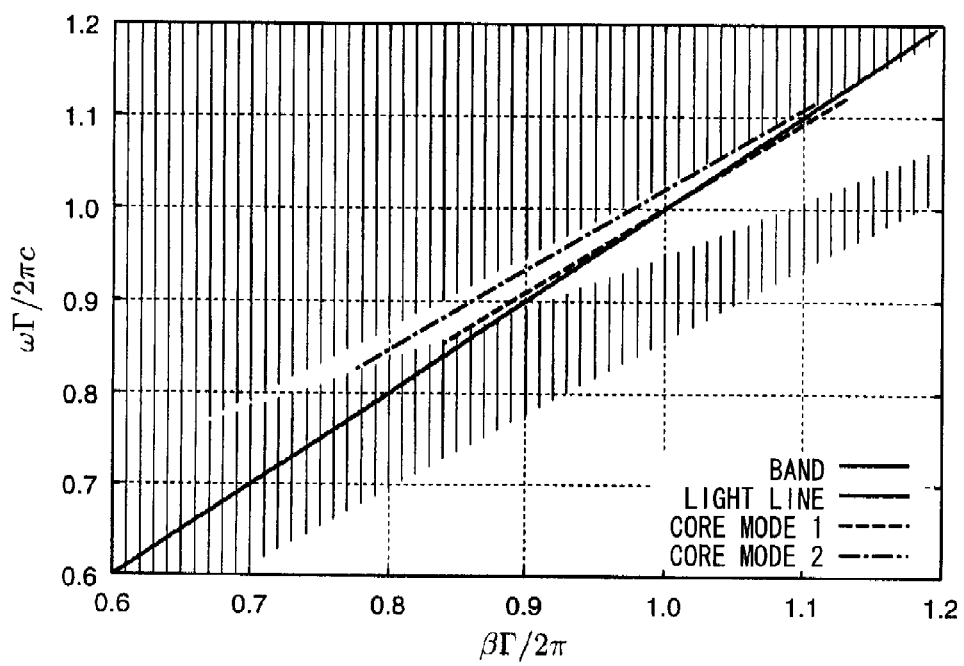
FIG. 33 is a graph showing the dispersion in the first band gap of the PBGF shown in FIG. 32.

FIG. 33 shows the dispersion of the first band gap. As shown in the figure, a core mode 1 is present when Γ/λ=0.86 to 1.12, a core mode 2 is present when Γ/λ=0.82 to 1.11, but a surface mode is absent. However, the degenerative mode is included in each core mode.

Figure 34:
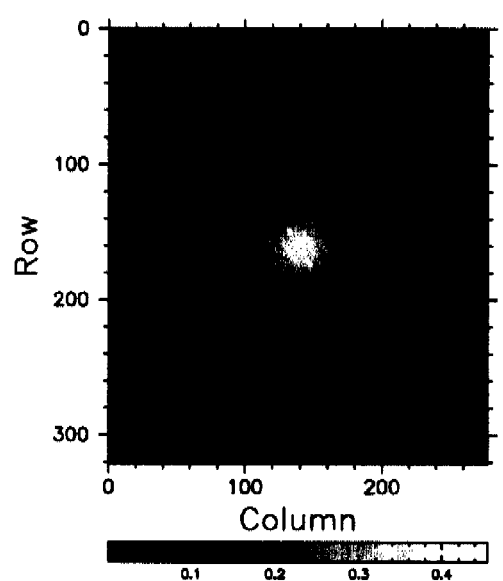
FIG. 34 is a figure showing the power distribution of a core mode 1 of the first band gap of the PBGF shown in FIG. 32.
Figure 35:
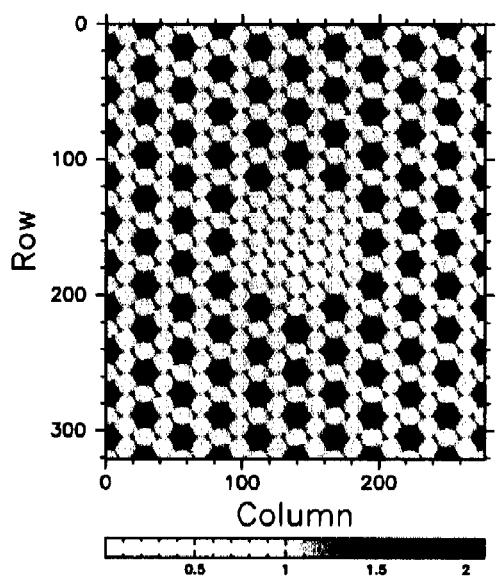
FIG. 35 shows the permittivity distribution of the PBGF shown in FIG. 32.

FIG. 34 shows the typical power distribution of core mode 1 at this stage. FIG. 35 shows the permittivity of the fiber drawn to the same scale. As shown in the figure, the power of the core mode 1 is distributed only slightly over the silica rod just near the core, while most of it is distributed within the core.

Figure 36:
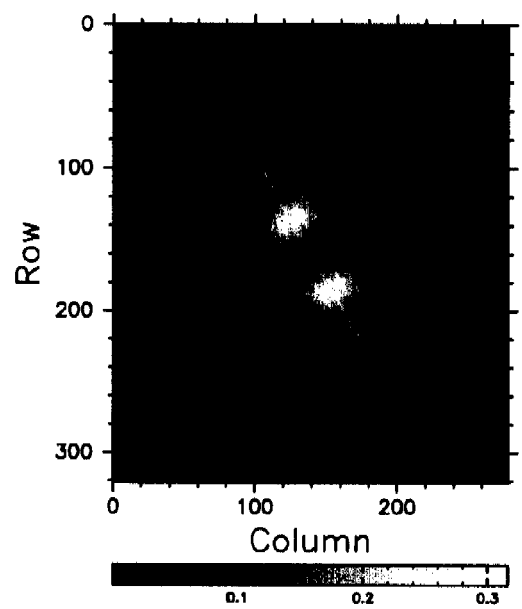
FIG. 36 is a figure showing the power distribution of a core mode 2 of the first band gap of the PBGF shown in FIG. 32.

FIG. 36 shows the typical power distribution of the core mode 2 in this case.

Figure 37:
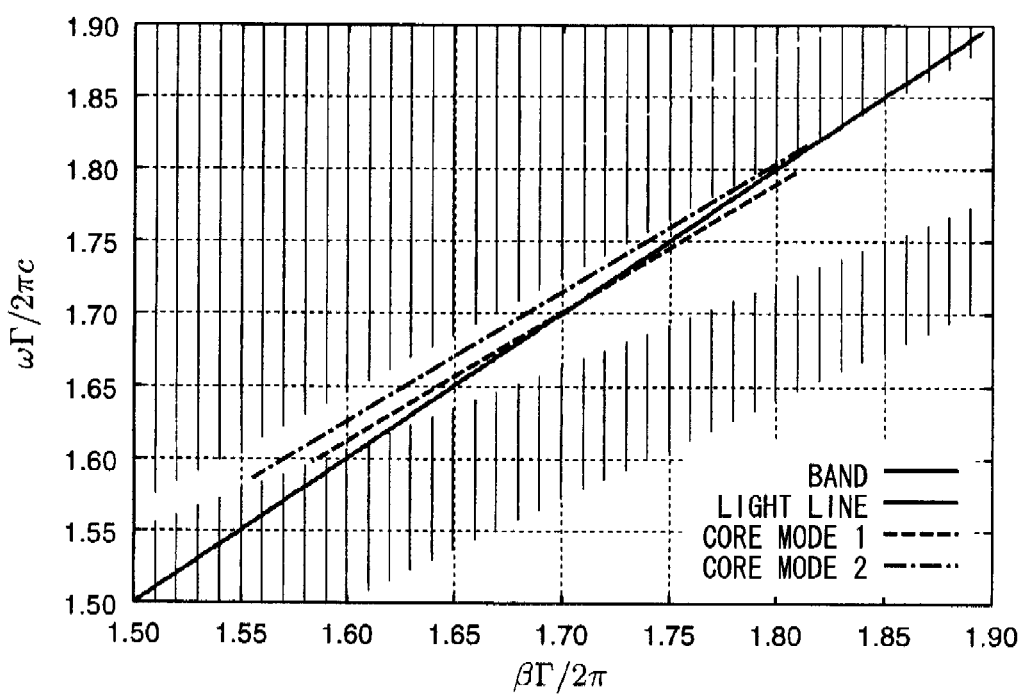
FIG. 37 is a graph showing the dispersion in the second band gap of the PBGF shown in FIG. 32.

FIG. 37 shows the dispersion of the second band gap. As shown in the figure, the core mode 1 is present when Γ/λ=1.60 to 1.79, the core mode 2 is present when Γ/λ=1.58 to 1.82, but a surface mode is absent. However, the degenerative mode is included in each core mode.

Figure 38:
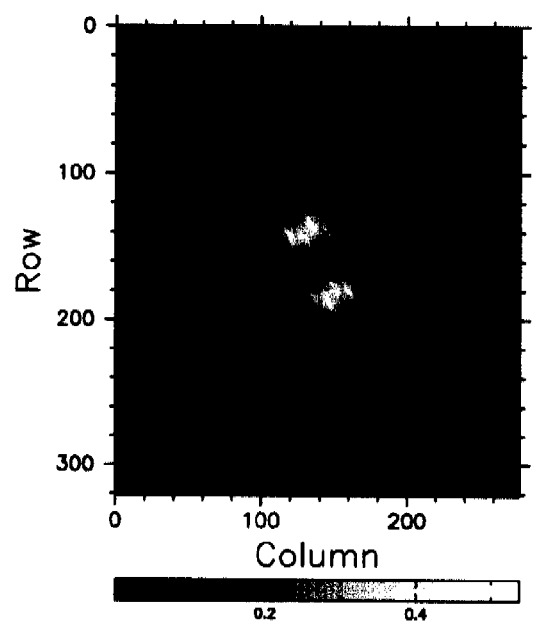
FIG. 38 is a figure showing the power distribution of a core mode 1 of the second band gap of the PBGF shown in FIG. 32.
Figure 39:
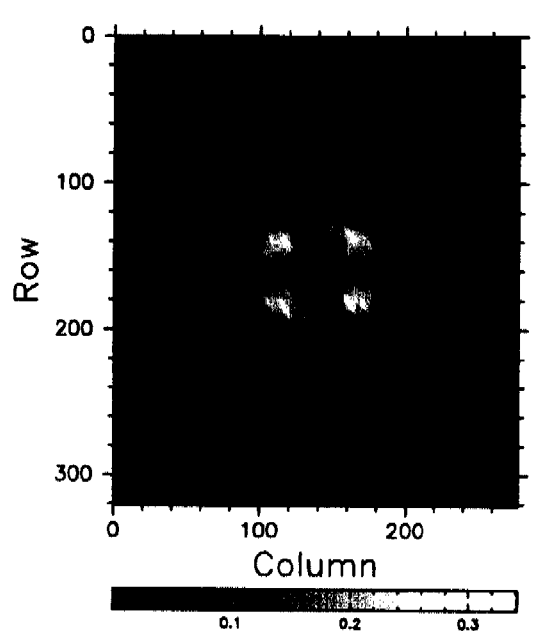
FIG. 39 is a figure showing the power distribution of a core mode 2 of the second band gap of the PBGF shown in FIG. 32.

FIG. 38 and FIG. 39 show the typical power distributions of the core mode 1 and the core mode 2 at this stage respectively.

EXAMPLE 2-3

Figure 40:
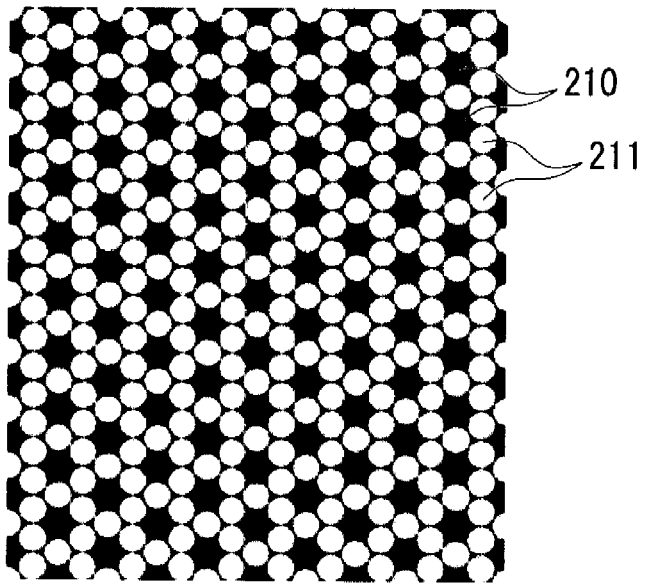
FIG. 40 is a cross section showing an extended triangular lattice structure with d/Λ=0.94 in Example 2-3.
Figure 41:
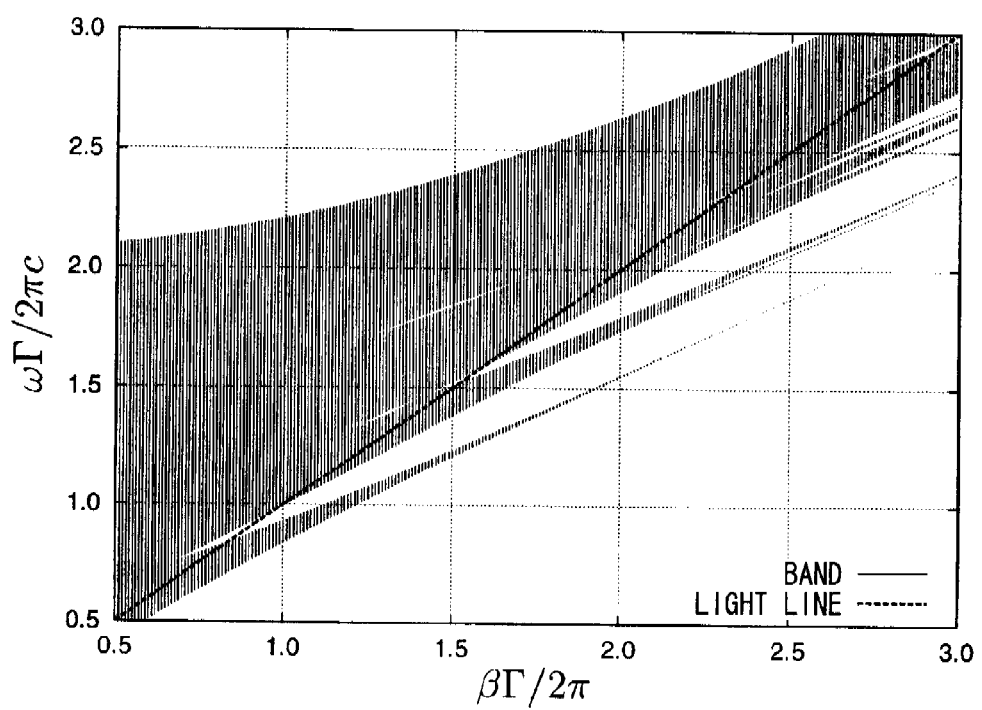
FIG. 41 is a graph showing the band structure of the extended triangular lattice with d/Λ=0.94 in Example 2-3.

FIG. 40 shows the band structure of the extended triangular lattice shown in FIG. 40. However, the air hole diameter d was taken as 0.94Λ for the periodic structure of this example. In this case, the first wave guide region is present in a range of Γ/λ=0.76 to 0.98, and the second wave guide region is present in a range of Γ/λ=1.49 to 1.58.

In this way, it can be seen that as the air hole diameter decreases, the band gap becomes narrower but it is present. Similar to Examples 2-1 and 2-2, it was confirmed that only a core mode was present and a surface mode was not generated.

Third Embodiment

The third exemplary embodiment of the present invention is described here referring to the drawings.

Figure 42:
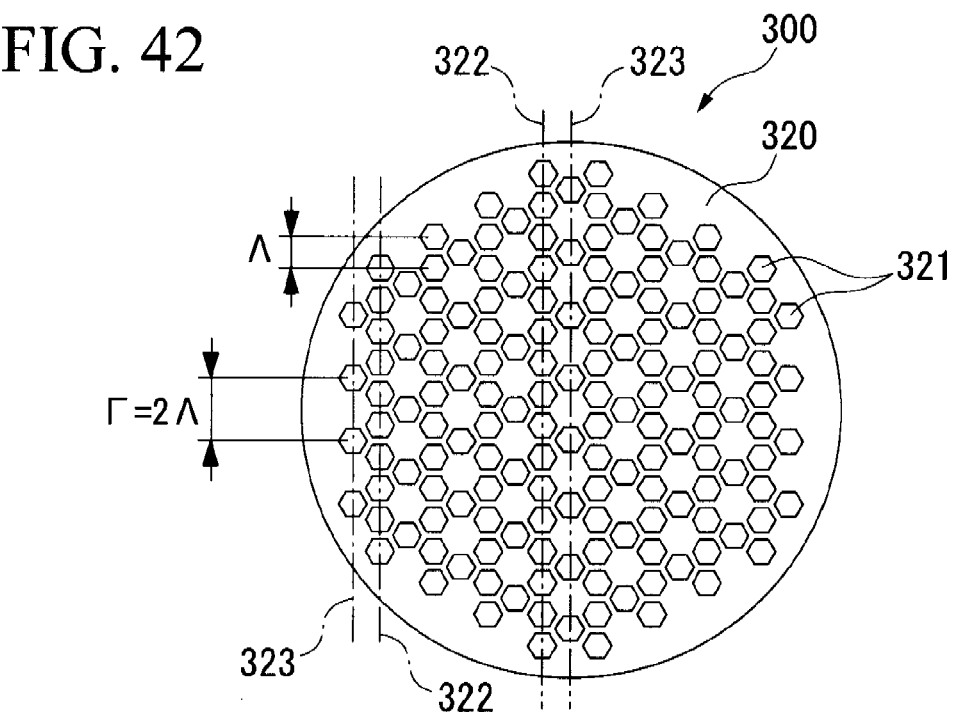
FIG. 42 is a cross section illustrating the air hole periodic structure of an extended triangular lattice used in the PBGF of the third embodiment of the present invention.

FIG. 42 shows an example of the air hole periodic structure in an extended triangular lattice configuration used in the cladding of a PBGF 300 of the third embodiment of the present invention. In this figure, the reference numeral 320 indicates the silica portion, 321 indicates the hexagonal air holes, 322 indicates the first rows of air holes, and 323 indicates the second rows of air holes.

This air hole periodic structure in an extended triangular lattice configuration is a periodic structure (hereinafter referred to as "hexagonal air hole extended triangular lattice" or "hexagonal air hole extended triangular lattice structure") alternately arranged with first rows of air holes 322 each having multiple hexagonal air holes 321 at first pitch Λ in the cross section of the fiber through a partition wall 325, and multiple second rows of air holes 323 each having multiple hexagonal air holes 321 at the second pitch Γ, which is twice the first pitch Λ (Γ=2Λ) through hexagonally-shaped silica portion 320, such that the air holes 321 of the second rows 323 and the air holes 321 of the first rows 322 form a triangular lattice.

Figure 43:
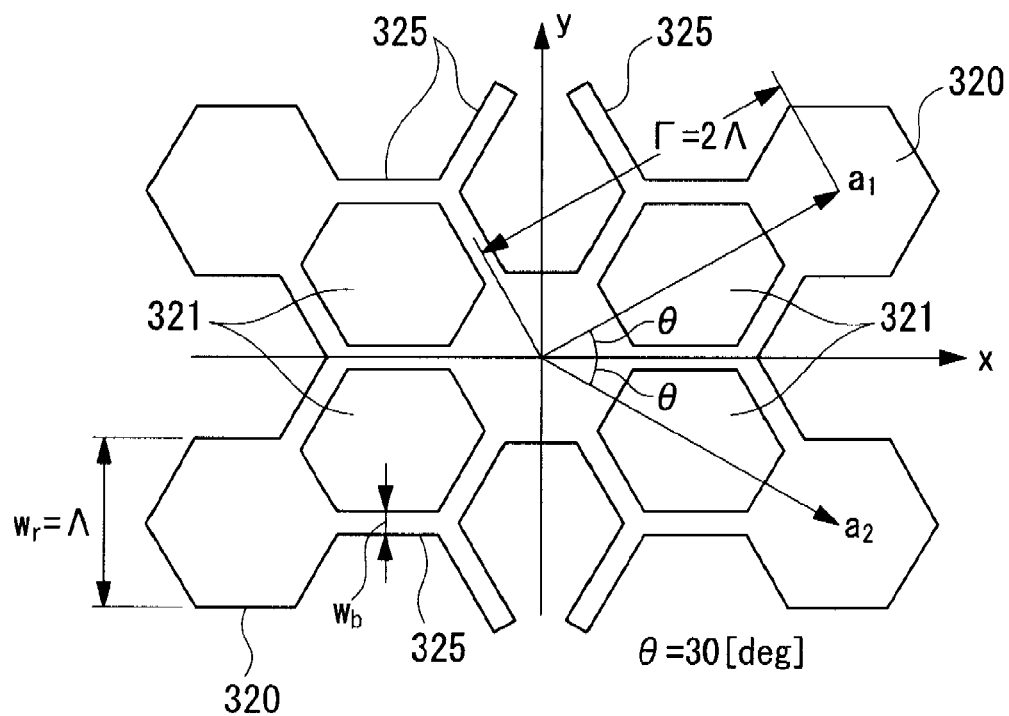
FIG. 43 is an extended cross section showing the unit cell of the extended triangular lattice of FIG. 42.

FIG. 43 shows the unit cell structure of this hexagonal air hole extended triangular lattice. In this unit cell, the distance between the centers of adjacent air holes 321 (first pitch) is taken as Λ, and the length $\omega_r$ between the two sides facing each other of the silica portion 320 and the first pitch Λ are taken as equal ($\omega_r$=Λ). The fundamental vectors $a_1$ and $a_2$ indicating the periodicity of the lattice are inclined at 30 degrees and −30 degrees with respect to the x axis respectively, while the second pitch Γ is 2Λ.

If this hexagonal air hole extended triangular lattice structure is used in the cladding of the PBGF 300, and if the core region is appropriately designed, a layer of air holes can be provided between the core and the cladding. The result is that the surface mode can be prevented, and a wide transmission bandwidth can be realized (refer to H. K. Kim, J. Shin, S. Fan, M. J. F. Digonnet, and G. S. Kino, "Designing air-core photonic-bandgap fibers free of surface modes," IEEE J. Quant. Electron., vol. 40, no. 5, pp. 551-556, 2004).

Figure 44:
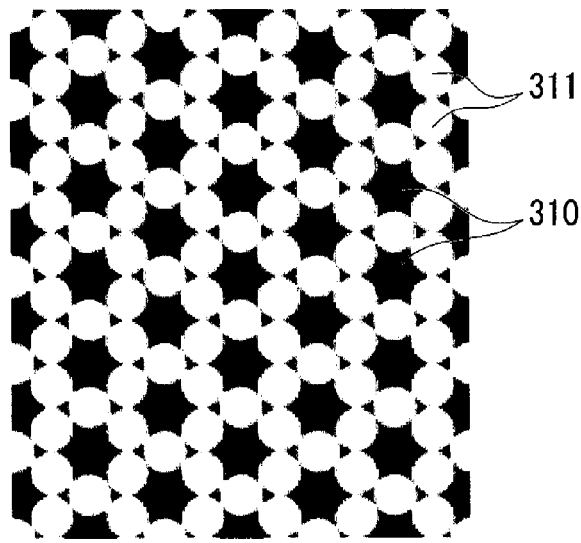
FIG. 44 is a cross section of the circular air hole extended triangular lattice structure given as a reference example.

Moreover, if a hexagonal air hole extended triangular lattice structure is adopted in combination with the hexagonally-shaped silica portion 320 and the hexagonal air holes 321 in the present invention, optical characteristics can be obtained that are different from those of the air hole periodic structure in an extended triangular lattice configuration (hereinafter referred to as "circular air hole extended triangular lattice structure") using the circular air holes 310 as shown in FIG. 44.

Figure 45:
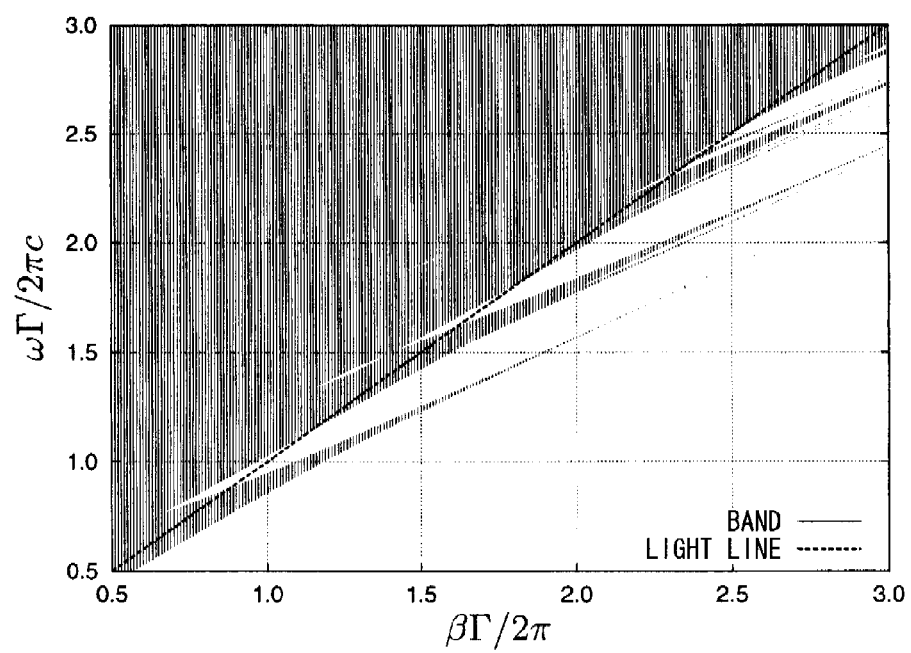
FIG. 45 is a graph showing the band structure in the circular air hole extended triangular lattice structure of FIG. 44.

FIG. 44 illustrates the circular air hole extended triangular lattice structure, while FIG. 45 is a graph showing the band structure of the circular air hole extended triangular lattice. The periodic structure shown in FIG. 44 has an air hole diameter d equal to the first pitch Λ, and the it has the least silica portion 310 in the circular air hole extended triangular lattice structure. In FIG. 44, the black parts are silica portions 310 while the white circles are the air holes 311. The band structure of FIG. 45 was calculated using the Plane wave decomposition method mentioned in "Designing air-core photonic-bandgap fibers free of surface modes," IEEE J. Quant. Electron., vol. 40, no. 5, pp. 551-556, 2004.

In FIG. 45, β is the wave number of the transmission direction (direction perpendicular to the periodic structure), Γ=2Λ is the lattice constant of the extended triangular lattice, ω is the angular frequency, and c is the velocity of light. The light line expresses the dispersion curve when light is transmitted through a vacuum medium. The region enveloped by bands is the region wherein light cannot be transmitted in any direction in the cross section of the periodic structure, that is, it expresses the band gap. When this periodic structure is used in the fiber cladding and air hole used in the core, the region wherein light in the fiber core becomes the wave guide is adjacent to the light line, above which the band gap is present. In this case, Γ/λ (=ωΓ/2πc) is in a range of between 0.77 and 1.10 and the first wave guide region is present; and the same ratio is in a range of between 1.54 and 1.80 and the second wave guide region is present. Here, λ is the wavelength of light transmitted in the fiber.

Figure 46:
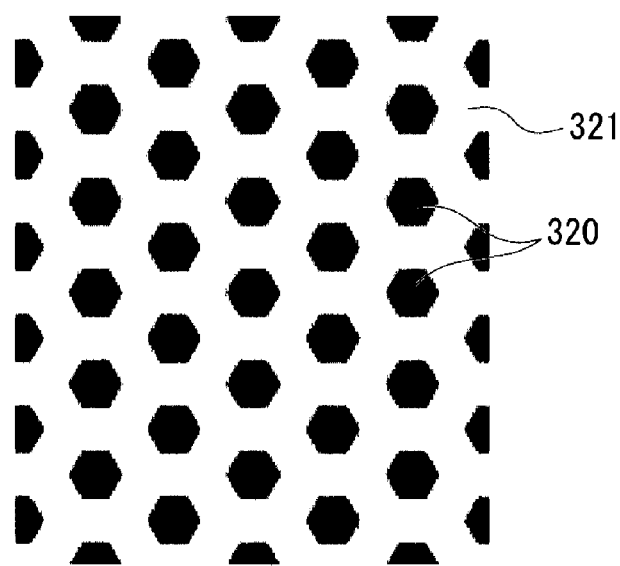
FIG. 46 is a cross section showing the hexagonal air hole extended triangular lattice structure with $\omega_b$=0 as the first example of the hexagonal air hole extended triangular lattice structure used in the PBGF of the third embodiment of the present invention.
Figure 47:
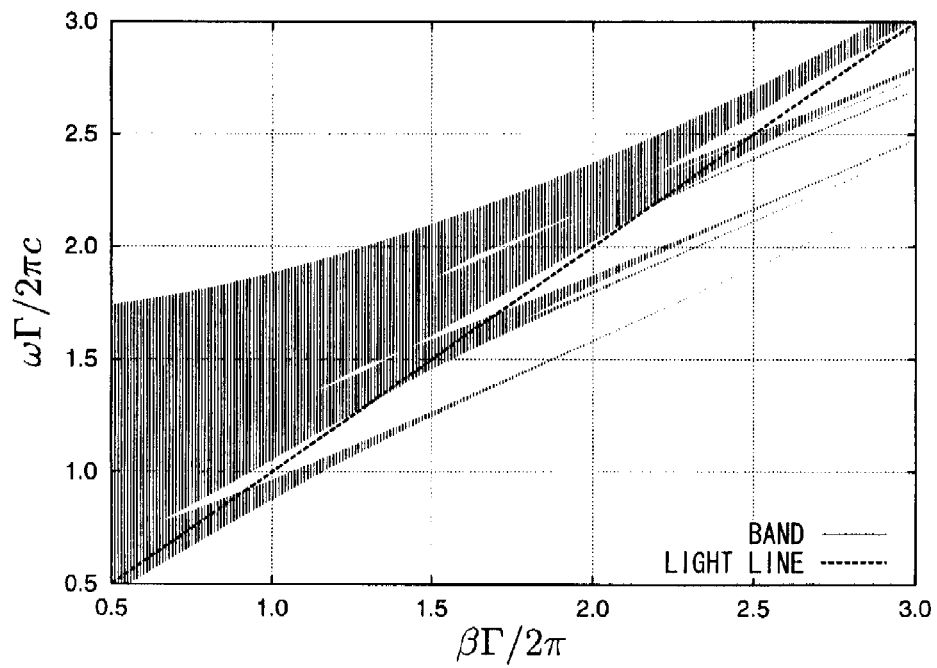
FIG. 47 is a graph showing the band structure of the hexagonal air hole extended triangular lattice of FIG. 46.

On the other hand, FIG. 47 shows the band structure of a hexagonal air hole extended triangular lattice structure related to the third embodiment of the present invention shown in FIG. 46. The hexagonal air hole extended triangular lattice structure shown in FIG. 46 is a periodic structure wherein hexagonally-shaped multiple silica portions 320 are arranged in a triangular lattice configuration at a constant pitch Γ in the cross section of the fiber, air holes 321 are disposed between the silica portions 320, and $\omega_r$, the length between the two sides facing each other of the silica portion, and Λ, the length of half the pitch Λ are equal. That is to say, the hexagonal air hole extended triangular lattice structure shown in FIG. 46 is an example of a hexagonal air hole extended triangular lattice structure when the thickness $\omega_b$ of partition wall 325 is 0 in the hexagonal air hole extended triangular lattice structure shown in FIG. 4 and FIG. 43. However, to maintain the silica portion 320 in practice, the intermittent partition wall not shown in the figures, joints, and so on, may be present.

In this case, as shown in FIG. 47, the first wave guide region is present in a range of Γ/λ=0.82 to 1.30, the second wave guide region is present in the range 1.58 to 2.13, and the third wave guide region is present in a range of 2.83 to 3.00. Compared to the circular air hole extended triangular lattice structure shown in FIG. 44, it can be seen that a wide band gap is present.

Figure 48:
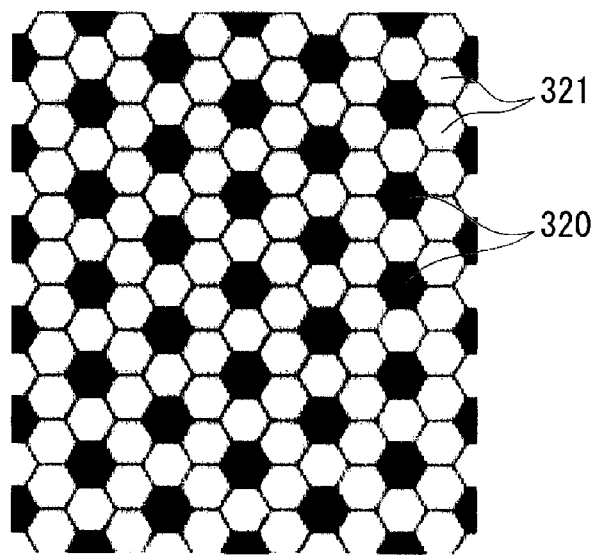
FIG. 48 is a cross section showing the hexagonal air hole extended triangular lattice structure with $\omega_b/\Lambda$=0.06 as the second example of the hexagonal air hole extended triangular lattice structure used in the PBGF of the third embodiment of the present invention.
Figure 49:
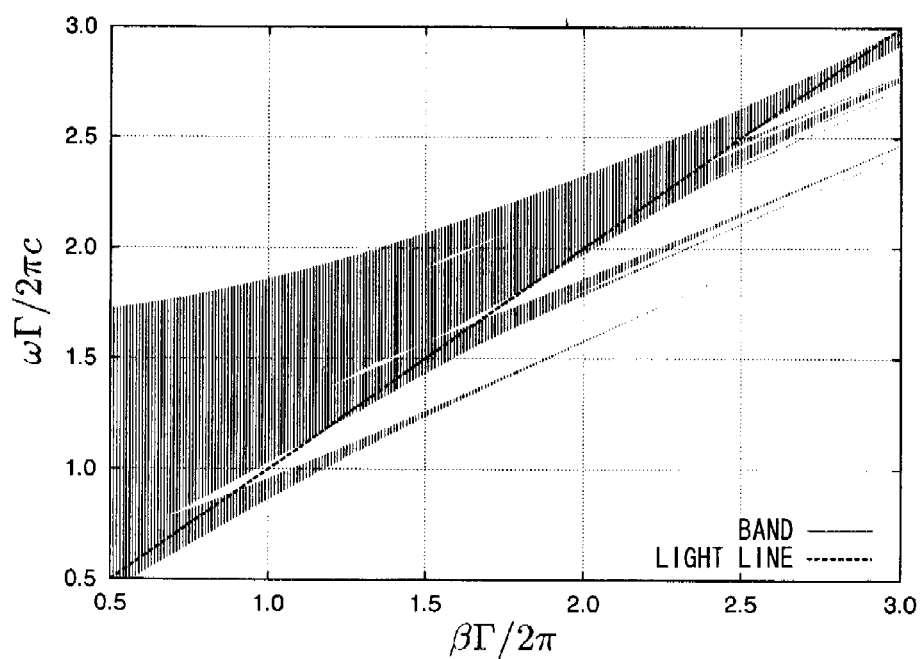
FIG. 49 is a graph showing the band structure of the hexagonal air hole extended triangular lattice of the third embodiment of FIG. 48.

Also, FIG. 48 shows an example of a hexagonal air hole extended triangular lattice structure wherein the ratio of $\omega_b$ of the thickness of partition wall 325 is 0.06 ($\omega_b/\Lambda$=0.06) with respect to the first pitch Λ, while FIG. 49 is a graph showing its band structure. In this case, the first wave guide region is present in a range of Γ/λ=0.79 to 1.13, the second wave guide region is present in the range 1.60 to 1.83, and a band gap equivalent to that of the circular air hole extended triangular lattice structure shown in FIG. 44 with d/Λ=1 is present.

The PBGF of the third embodiment of the present invention has the hexagonal air hole extended triangular lattice structure mentioned above in the cladding, and also has the core 324 containing an air hole core at the center, and multiple hexagonal air holes arranged in a triangular lattice configuration. The material of the silica portion 320, other than the air holes, in the PBGF of the present invention can be made the same over the entire fiber. For instance, pure silica ($SiO_2$) may be used, but silica glass including a dopant for adjusting the refractive index, such as fluorine or germanium dioxide may alternately be used.

In an exemplary embodiment of the present invention, the diameter D of the core 324 may have the following relationships: $0.7\Lambda \leq D \leq 3.3\Lambda$, $4.7\Lambda \leq D \leq 7.3\Lambda$, or $8.7\Lambda \leq D \leq 11.3\Lambda$ with respect to the pitch Λ. By setting the diameter D of the core 324 within the range mentioned above, a PBGF with no surface mode can be offered.

As shown in FIG. 48, if a silica partitioning wall 325 surrounding the air hole is present, then the $\omega_b$, thickness of the partition wall 325 may be in the range $0.005\Lambda \leq \omega_b \leq 0.2\Lambda$ with respect to the first pitch Λ. If the thickness of the partition wall 325 is below the range mentioned above, then it becomes difficult to maintain the air hole structure.

Also, if the thickness of the partition wall exceeds the range mentioned above, the band gap becomes narrower.

The hexagonal air hole extended triangular lattice structure provided in the cladding may be provided in three or more layers outside the core 324. If the number of layers of the hexagonal air hole extended triangular lattice provided in the cladding is 2 or less, the confinement of light may become inadequate and the loss may increase.

The PBGF of the present invention may have a core mode in which 60% or more, 70% or more or 80% or more of a transmitting power is concentrated in the core region, and may have optical characteristics wherein the surface mode is absent substantially. If the percentage of transmitting power of the core mode mentioned above is less than 60%, light will be transmitted into the silica, which is not preferable.

The PBGF of the third embodiment of the present invention, may have optical characteristics wherein the core mode is present within a range in which a wavelength λ, transmitted in the fiber, satisfies of $0.6 \leq \Gamma/\lambda \leq 1.5$. If Γ/λ is less than 0.6, band gap will be no longer present, and light will not be transmitted. Moreover, if Γ/λ exceeds 1.5, the band gap will be no longer present, and light will not be transmitted.

If PBGF operates in a high order band gap, then the ratio Γ/λ may be in the range $1.4 \leq \Gamma/\lambda \leq 2.3$. If the ratio Γ/λ is less than 1.4, the PBGF is outside the high order band gap and does not operate. Also, if Γ/λ exceeds 2.3, the PBGF is again outside the high order band gap, and it does not operate.

Furthermore, the PBGF may have optical characteristics wherein the core mode is present when the wavelength λ, transmitted in the fiber, satisfies a range of $2.2 \leq \Gamma/\lambda \leq 3.2$.

Figure 50:
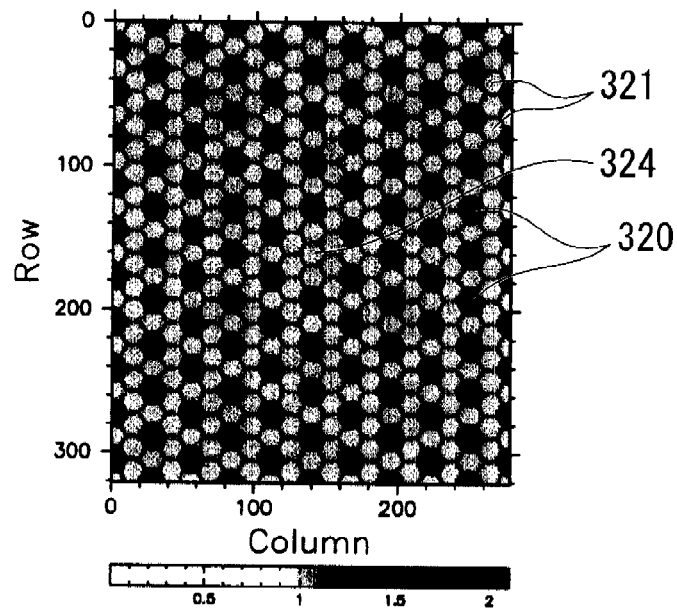
FIG. 50 is a cross section of PBGF using a hexagonal air hole extended triangular lattice structure with $\omega_b/\Lambda$=0.06 produced in Example 3-1.

Next, an example of the production method of a PBGF of the third embodiment of the present invention is described here. In this example, the PBGF shown in FIG. 50 provided with the core 324 (capillary core) wherein the central silica portion 320 has been replaced by the air hole 321 and wherein the cladding has the hexagonal air hole extended triangular lattice structure shown in FIG. 48, is described.

In this production method, first, silica capillary tubes and silica rods are arranged into first rows of air holes and second rows of air holes. In each first row multiple capillary tubes are arranged, and in each second row capillary tubes and silica rods are alternately arranged. Thus, the capillary tube arrangement of the cross section forms an extended triangular lattice. A capillary tube bundle containing silica rods is made with the capillary core region having central silica rods replaced by capillary tubes. The capillary tubes used in the production method of the present invention may have annular cross sections and the silica rods may have circular cross sections with diameters equal to that of the capillary tubes.

The production method of the PBGF of the third embodiment of the present invention is not restricted to the example of the method of formation of core region mentioned above and the core structure of the PBGF to be produced may be changed appropriately. For instance, in the production of the PBGF shown in FIG. 56, a large capillary tube region with diameter D is formed by replacing the silica rod at the center of the hexagonal air hole extended triangular lattice structure and the six silica rods surrounding it by capillary tubes. Also, when forming the air hole core, either the silica rod at the center of the hexagonal air hole extended triangular lattice structure can be eliminated, or the central silica rod, and the capillary tubes and silica rods in no less than one layer and no more than five layers surrounding the central silica rod may be eliminated to form the air hole core.

Next, the capillary tube bundle containing silica rods is heated and integrated to produce the preform for fiber spinning. This heating and integrating process can be implemented using the same apparatus and methods as the heating and integrating process in the conventional method of production of a PBGF wherein capillary tube bundles are used.

The capillary tube bundle containing silica rods mentioned above may be taken as the preform for fiber spinning after inserting it in an air hole of a silica tube and integrating it. When the capillary tube bundle containing silica rods is integrated with the bundle inserted in the silica tube as-is, the pressure and gas composition within the capillary tubes spaces and the spaces surrounding the capillary tubes can be separately adjusted, the pressure within the capillary tubes can be maintained at a higher level than the pressure in the spaces surrounding the capillary tubes, and the spaces between the capillary tubes or the space betweens the capillary tubes and the silica rods can be filled up. By increasing the pressure within the capillary tubes spaces during this integration, the cross section shape of the capillary tubes' air holes can be brought close to the hexagonal shape.

When the capillary tube bundle containing silica rods in the air holes of the silica tubes is integrated after insertion, only the spaces within the capillary tubes in the capillary tube bundle containing the inserted silica rods may be maintained at a pressure equal to or greater than the atmospheric pressure, and the spaces other than the spaces within the capillary tubes may be maintained at a reduced pressure condition before performing the integration mentioned above.

By spinning the preform for fiber spinning produced as mentioned above, the PBGF shown in FIG. 50 can be obtained. This spinning process may be implemented after maintaining the pressure within the capillary tubes at a higher level than the pressure in the spaces surrounding the capillary tubes, and with a balanced pressure maintained in the spaces of capillary tube air holes. With this pressure adjustment, the capillary tube air holes become hexagonal in cross section, and the cross sections of the silica rods become hexagonal.

The PBGF according to this example has a hexagonal air hole extended triangular lattice structure in the cladding. Thus, if a core is formed at its center, an air hole core or a capillary core can be configured without the core edge cutting across the bulk mode, and optical characteristics can be obtained wherein only the core mode is present and no surface mode is generated; moreover, a wide wave guide bandwidth can be obtained, and the transmission loss can be reduced.

The production method of a PBGF according to the present example can be made the same as the conventional method of using capillary tubes, except for replacing some of the capillary tubes with silica rods and combining them, and a PBGF with an air hole periodic structure in an extended triangular lattice configuration can be easily produced. Thus, a PBGF with better optical characteristics than the conventional PBGF can be produced more easily and more economically by using methods similar to the conventional PBGF.

EXAMPLE 3-1

Figure 51:
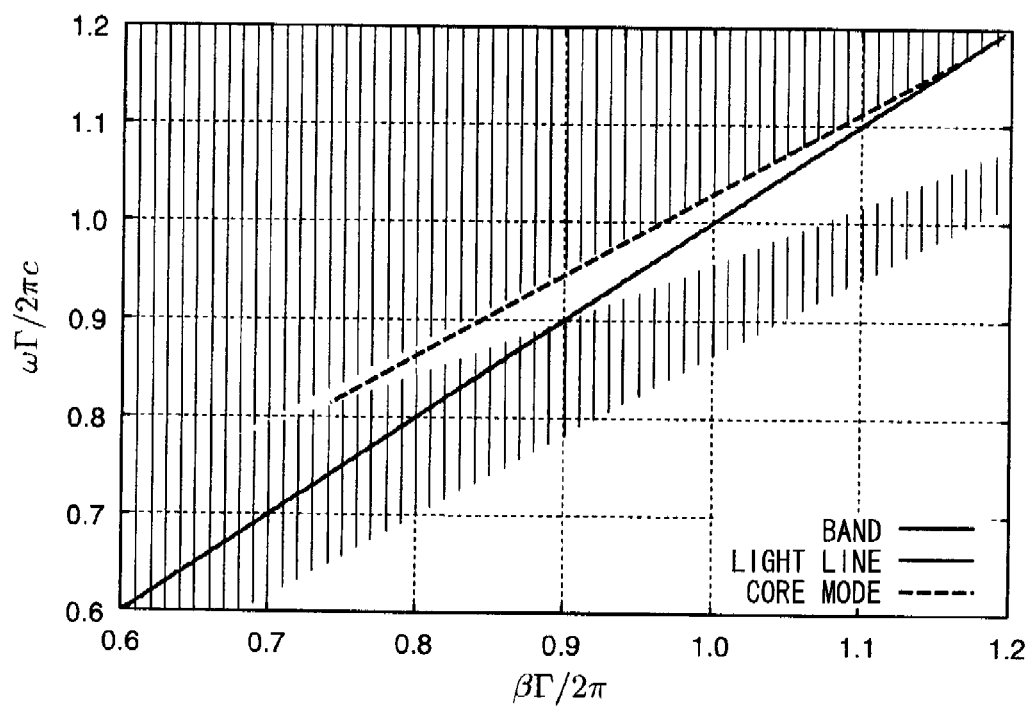
FIG. 51 is a graph showing the dispersion in the first band gap of a PBGF of Example 3-1.

As shown in FIG. 50, a PBGF was produced with a cladding containing a hexagonal air hole extended triangular lattice structure wherein the ratio of thickness $\omega_b$ of the partition wall 325 was 0.06 ($\omega_b/\Lambda=0.06$) with respect to the first pitch $\Lambda$, and having a core 324 (capillary core) wherein the central silica portion 320 was replaced by the air hole 321, and the dispersion of the core mode was studied. FIG. 51 is a graph showing the dispersion in the first band gap of this PBGF. In FIG. 51, $\beta$ is the wave number of the transmission direction (direction perpendicular to the periodic structure), $\Gamma=2\Lambda$ is the lattice constant of the extended triangular lattice, to is the angular frequency, and c is the velocity of light. The light line expresses the dispersion curve when light is transmitted through a vacuum medium. The region enveloped by bands is the region wherein light cannot be transmitted in any direction in the cross section of the periodic structure, that is, it expresses the band gap. As shown in FIG. 51, only the core mode is present and the surface mode is absent in the band gap of $\Gamma/\lambda$ ($=\omega\Gamma/2\pi c$)=0.82 to 1.16.

Figure 52:
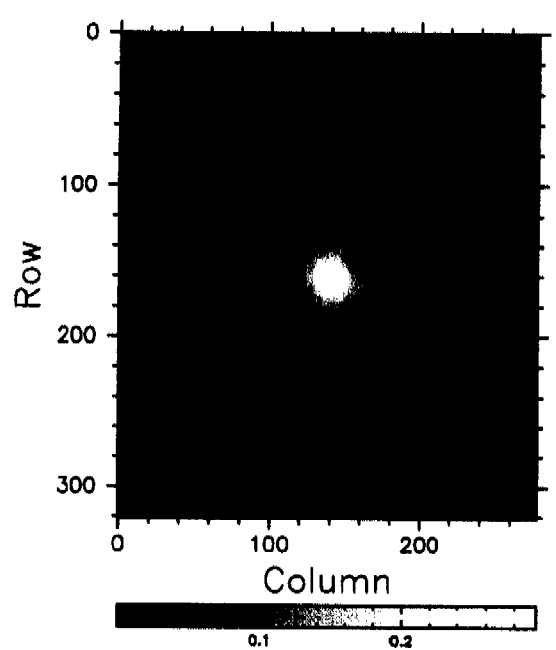
FIG. 52 is a figure showing the power distribution of the core mode of the first band gap of the PBGF of Example 3-1.
Figure 53:
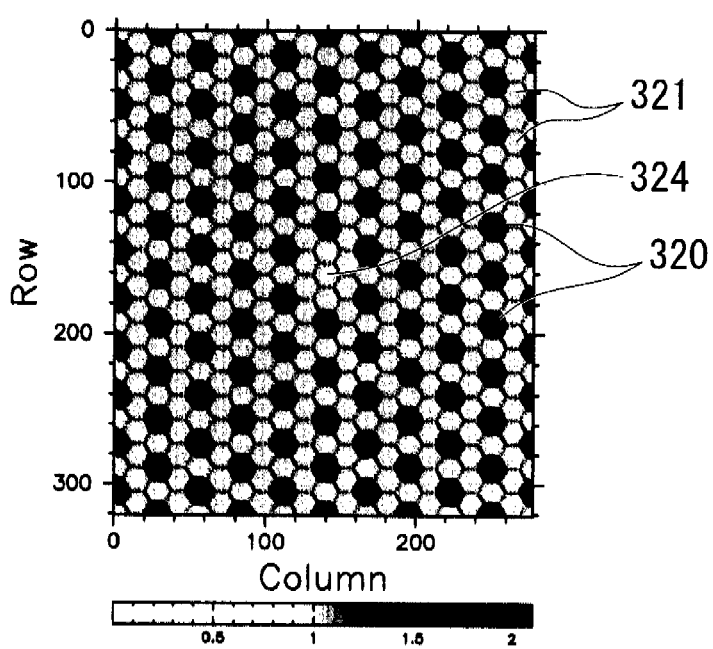
FIG. 53 shows the permittivity distribution of the PBGF of Example 3-1.

FIG. 52 shows the typical power distribution of core mode at this stage. FIG. 53 is the permittivity of the fiber shown in the same scale as FIG. 50. As shown in the figure, the power of the core mode is distributed only slightly over the silica portion 320 just near the core, while most of it is distributed within the core 324.

Figure 54:
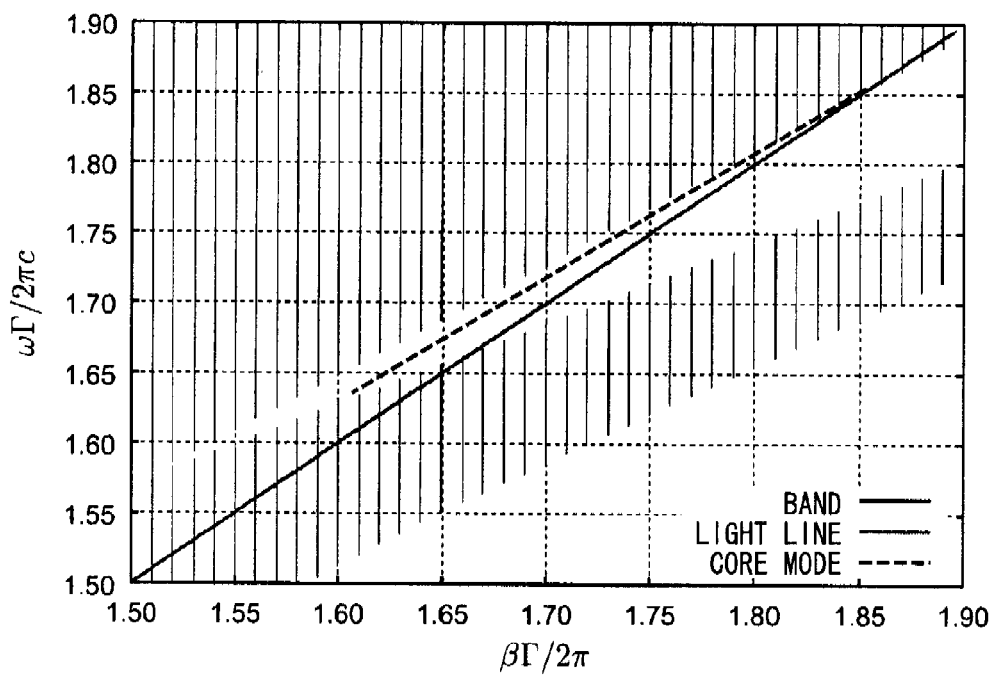
FIG. 54 is a graph showing the dispersion in the second band gap of the PBGF of Example 3-1.

FIG. 54 is a graph showing the dispersion of the second band gap in the PBGF of the present embodiment. As shown in the figure, the core mode is present but the surface mode is absent in $\Gamma/\lambda=1.64$ to 1.85. The core mode in this case is also a single mode (including degenerative mode).

Figure 55:
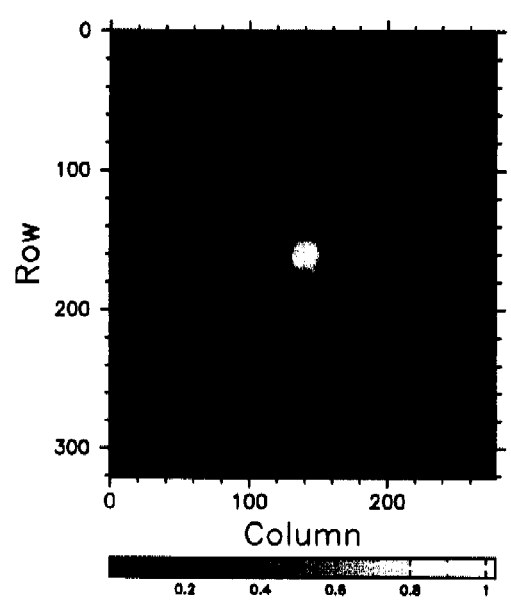
FIG. 55 is a figure showing the power distribution of the core mode of the second band gap of the PBGF of Example 3-1.

FIG. 55 shows the typical power distribution of core mode at this stage. As shown in the figure, substantially the entire power of the core mode is distributed within the core 324.

EXAMPLE 3-2

Figure 56:
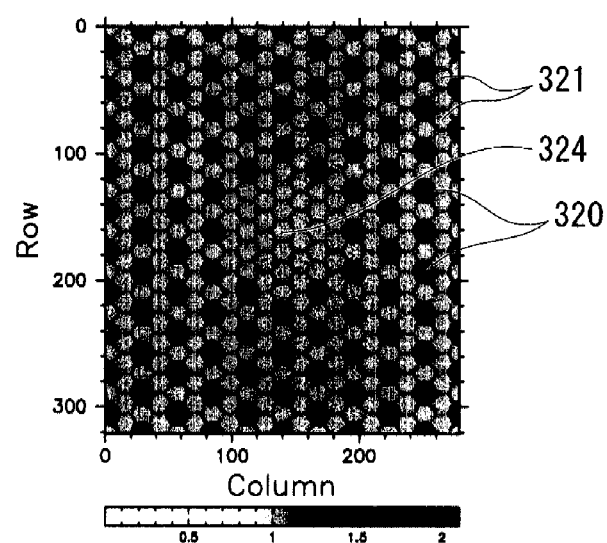
FIG. 56 is a cross section of the PBGF using a hexagonal air hole extended triangular lattice structure with $\omega_b/\Lambda$=0.06 produced in Example 3-2.
Figure 57:
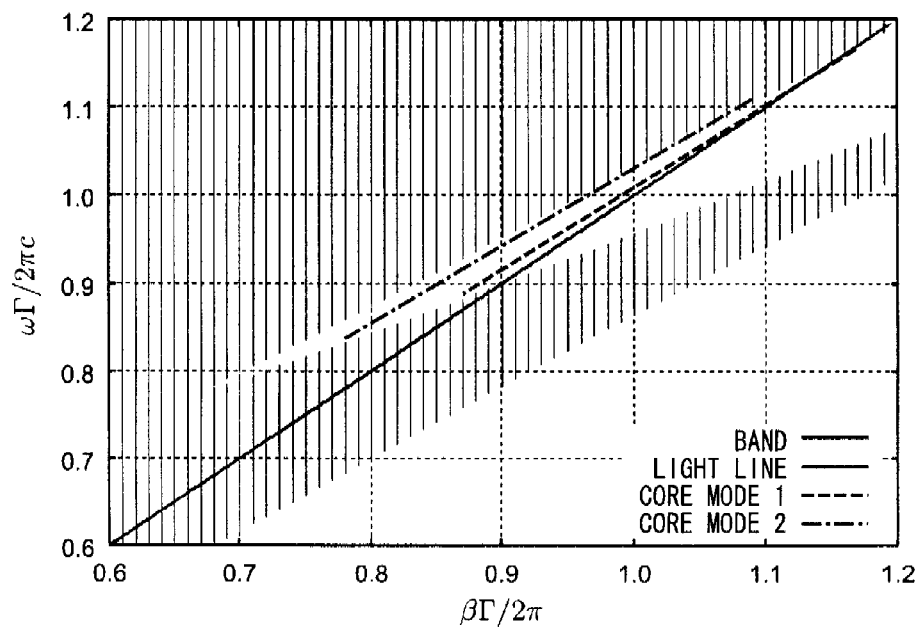
FIG. 57 is a graph showing the dispersion in the first band gap of the PBGF of Example 3-2.

As shown in FIG. 56, a PBGF was produced with a cladding containing a hexagonal air hole extended triangular lattice structure wherein the ratio of a thickness $\omega_b$ of the partition wall 325 was 0.06 ($\omega_b/\Lambda=0.06$) with respect to the first pitch $\Lambda$, and having a core 324 (capillary core) wherein the central silica rod and the six silica portions 320 in one layer outside the central rod were replaced by the air hole 321, and the dispersion of the core mode was studied. FIG. 57 is a graph showing the dispersion in the first band gap of this PBGF. As shown in the figure, a core mode 1 is present when $\Gamma/\lambda=0.84$ to 1.11, a core mode 2 is present for $\Gamma/\lambda=0.89$ to 1.16, and the surface mode is absent. However, the degenerative mode is included in each core mode.

Figure 58:
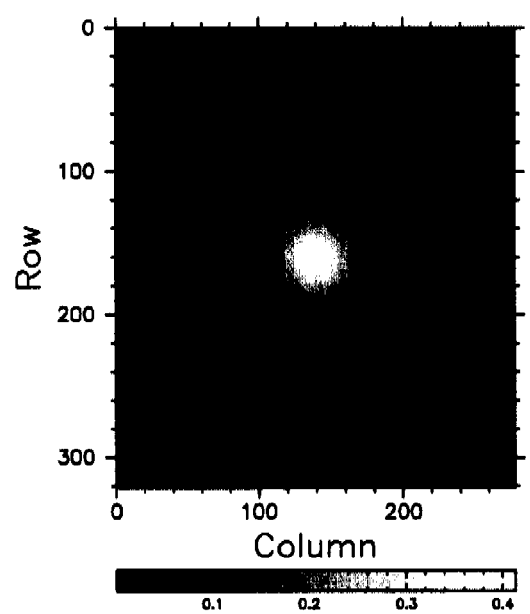
FIG. 58 is a figure showing the power distribution of core mode 1 of the first band gap of the PBGF of Example 3-2.
Figure 59:
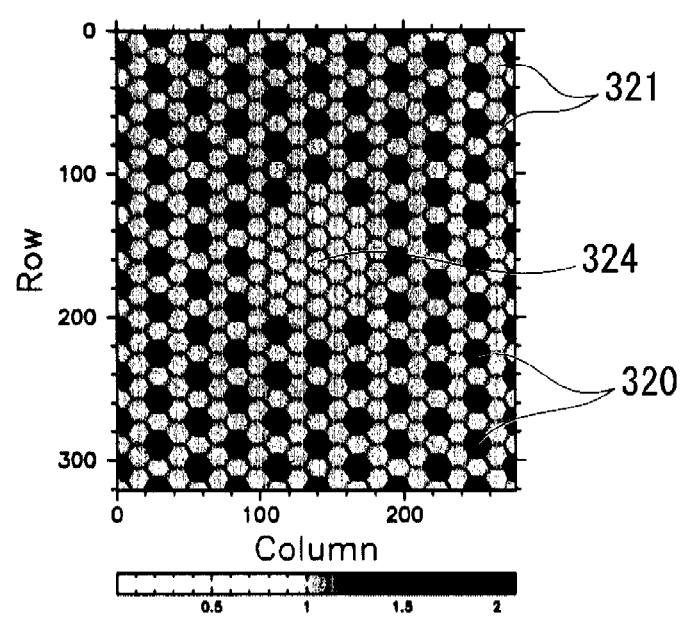
FIG. 59 shows the permittivity distribution of the PBGF of Example 3-2.

FIG. 58 shows the typical power distribution of the core mode at this stage. FIG. 59 is the permittivity of the fiber shown in the same scale as FIG. 56. As shown in the figure, substantially the entire power of the core mode is distributed within the core 324.

Figure 60:
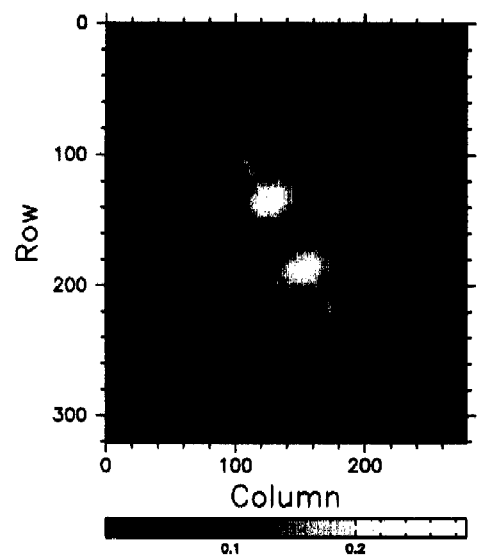
FIG. 60 is a figure showing the power distribution of core mode 2 of the first band gap of the PBGF of Example 3-2.

FIG. 60 shows the power distribution of the core mode 2 of the same fiber.

Figure 61:
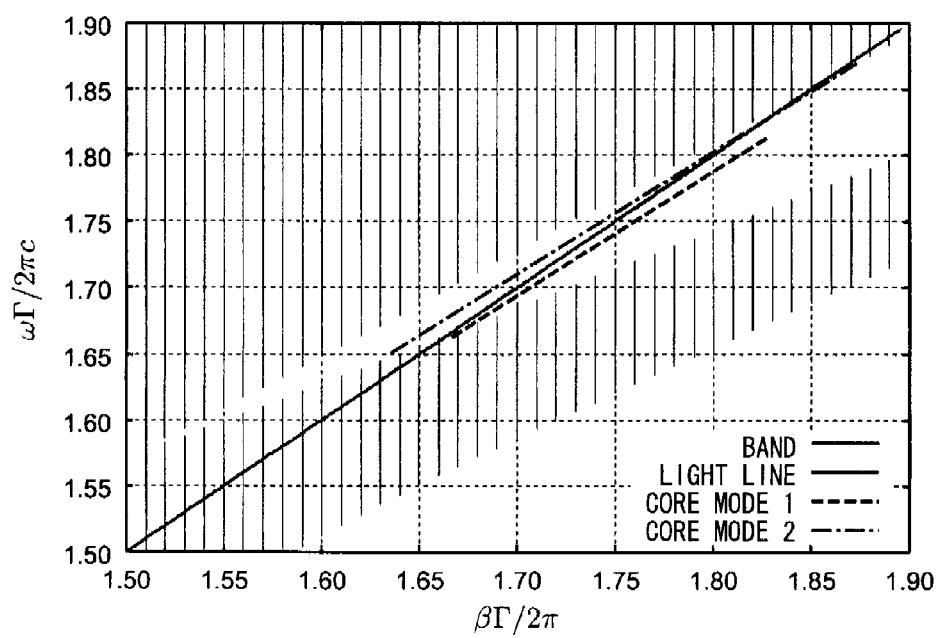
FIG. 61 is a graph showing the dispersion in the second band gap of the PBGF of Example 3-2.

FIG. 61 is a graph showing the dispersion of the second band gap in the PBGF of the present embodiment. As shown in the figure, a core mode 1 is present when $\Gamma/\lambda=1.66$ to 1.82, a core mode 2 is present when $\Gamma/\lambda=1.65$ to 1.87, but the surface mode is absent. However, the degenerative mode is included in each core mode. The dispersion of the core modes is present in the region below the light line also because a small amount of silica remains as partition wall in the core 324.

Figure 62:
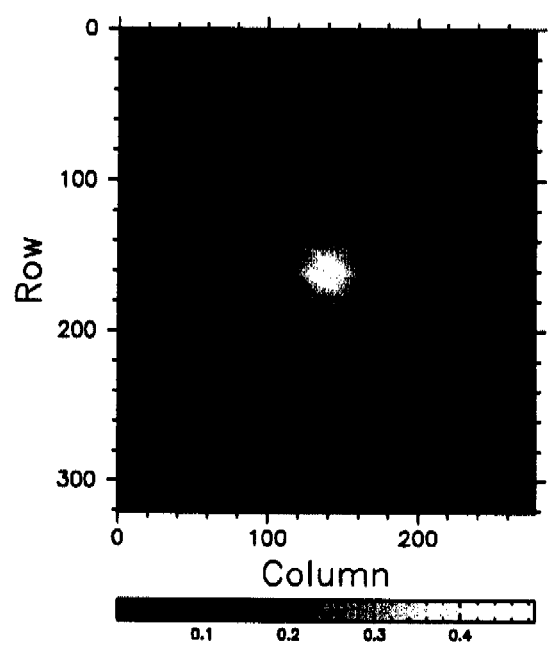
FIG. 62 is a figure showing the power distribution of core mode 1 of the second band gap of the PBGF of the third embodiment.
Figure 63:
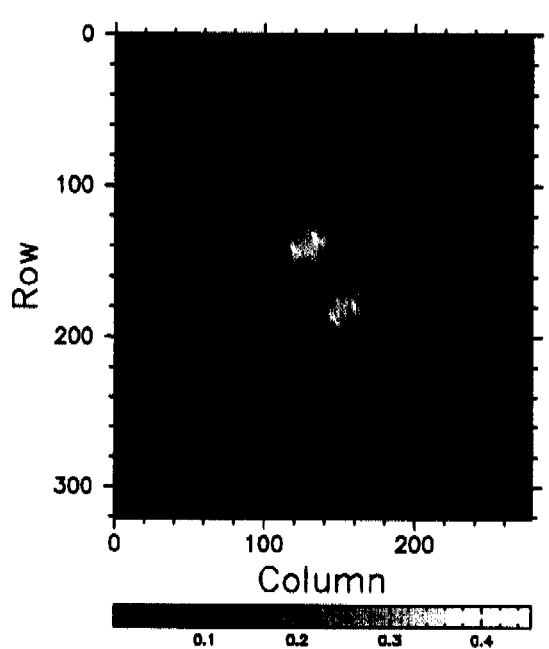
FIG. 63 is a figure showing the power distribution of core mode 2 of the second band gap of the PBGF of the third embodiment.

FIG. 62 shows the typical power distribution of the core mode 1 at this stage. FIG. 63 shows the typical power distribution of the core mode 2 in this case.

EXAMPLE 3-3

Figure 64:
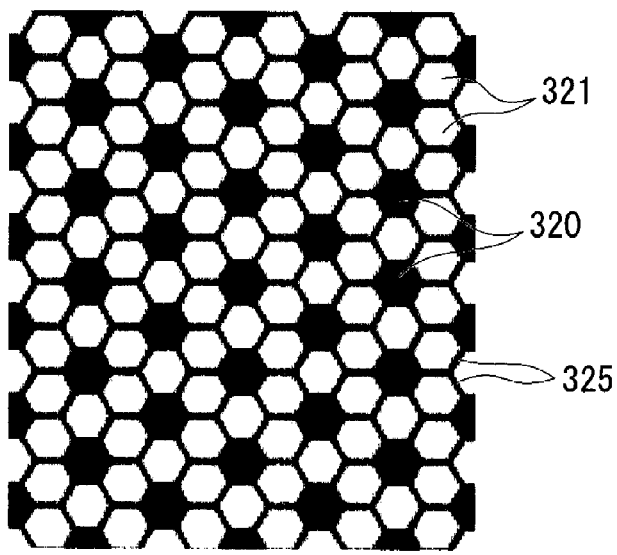
FIG. 64 is a cross section showing the hexagonal air hole extended triangular lattice structure with $\omega_b/\Lambda$=0.12 produced in Example 3-3.
Figure 65:
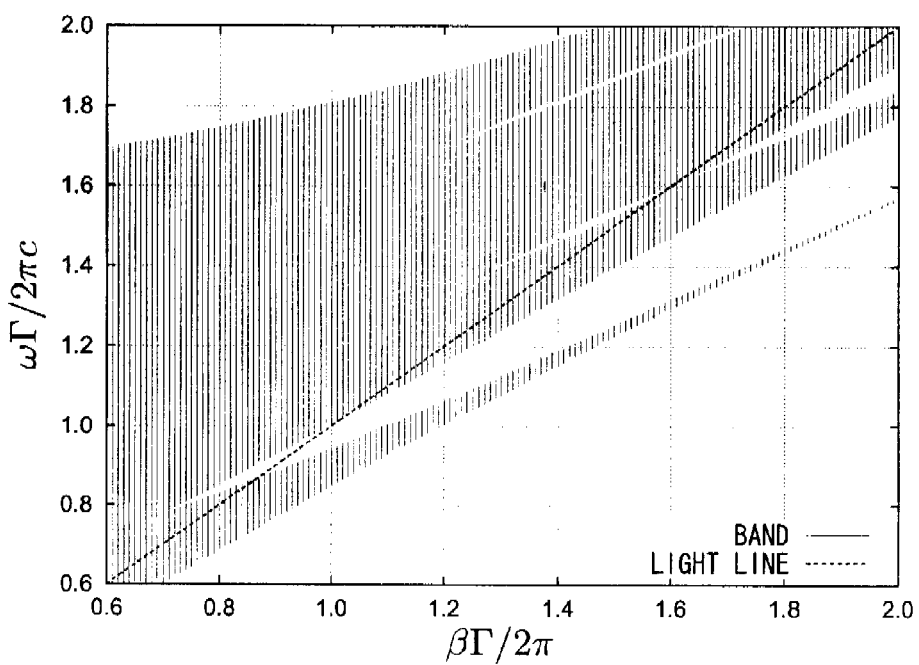
FIG. 65 is a graph showing the band structure of the hexagonal air hole extended triangular lattice structure of Example 3-3.

FIG. 65 shows the band structure of hexagonal air hole extended triangular lattice structure wherein the ratio of a thickness $\omega_b$ of the partition wall 325 with respect to the first pitch Λ is 0.12 ($\omega_b/\Lambda=0.12$), as shown in FIG. 64.

In this case, the wave guide region is present in a range of Γ/λ=0.81 to 1.00.

In this way, it can be seen that as the thickness of the partition wall 325 increases, the band gap becomes narrower but it is present. It has been verified that similar to Examples 3-1 and 3-2, if the capillary core is formed and a PBGF is produced, only the core mode is present and the surface mode is not generated, similar to the Examples 3-1 and 3-2.

Fourth Embodiment

The fourth embodiment of the present invention is described here referring to the drawings.

FIG. 66 shows an example of the air hole periodic structure in an extended triangular lattice configuration used in the cladding of the PBGF of the fourth embodiment of the present invention. In this figure, the reference numeral 420 indicates the silica portion, 421 indicates the hexagonal air holes, 422 indicates the first rows of air holes, 423 indicates the second rows of air holes, and 425 indicates the partition walls.

Figure 66A:
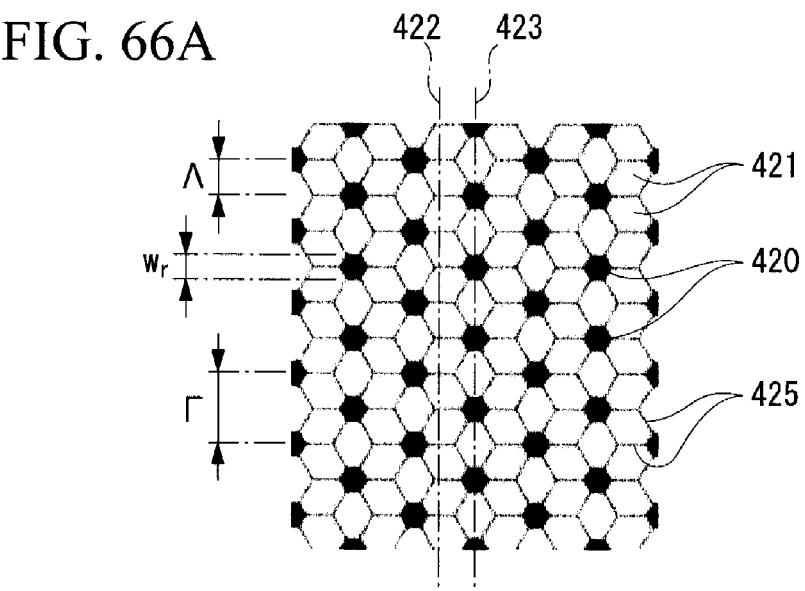
FIGS. 66A and B are cross sections showing the hexagonal air hole extended triangular lattice structure used in the PBGF of the fourth embodiment of the present invention.

This air hole periodic structure in an extended triangular lattice configuration is a periodic structure (hereinafter referred to as "hexagonal air hole extended triangular lattice" or "hexagonal air hole extended triangular lattice structure") alternately arranged with first rows of air holes 422 each having a row of multiple hexagonal air holes 321 at first pitch Λ in the cross section of the fiber through partition walls 425, and multiple second rows of air holes 423 each having multiple hexagonal air holes 421 at the second pitch Γ, which is twice the first pitch Λ (Γ=2Λ) through hexagonally-shaped silica portions 420 as shown in FIG. 66A. As shown in this example, the hexagonal air holes 421 are not equilateral hexagonal air holes; the two sides touching the silica portion 420 are shorter than the other two sides, and the hexagonal forms touching the silica portions have a length between the two sides touching the silica portion 420 that is greater than the length (Λ) between the other two sides.

Figure 66B:
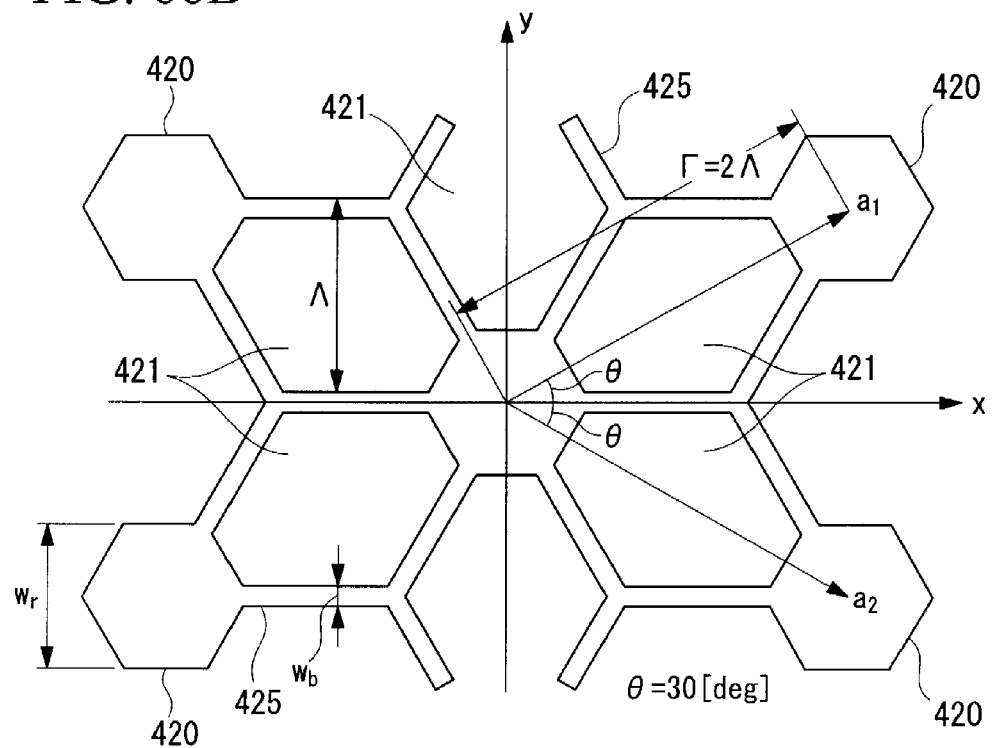

FIG. 66B shows the unit cell structure of this hexagonal air hole extended triangular lattice. The length $\omega_r$ between the two sides facing each other of the silica portions 420 in this unit cell is smaller than the first pitch Λ ($\omega_r<\Lambda$). The fundamental vectors $a_1$ and $a_2$ indicating the periodicity of the lattice are inclined at 30 degrees and −30 degrees with respect to the x axis respectively, while the second pitch Γ is 2Λ.

The silica portions 420 in the fourth embodiment of the present invention may be smaller than the air holes 421 including the partition walls 425. The length $\omega_r$ between the two sides facing each other of the silica portions 420 and the first pitch Λ may satisfy the relationship $0.4\Lambda \leq \omega_r \leq \Lambda$, and may further satisfy the relationship $0.5\Lambda \leq \omega_r \leq \Lambda$.

If this air hole periodic structure in an extended triangular lattice configuration is used in the cladding of the PBGF, and an appropriate core region is designed, a layer of air holes can be provided between the core and the cladding. The result is that the surface mode can be prevented, and a wide transmission bandwidth can be realized s (refer to H. K. Kim, J. Shin, S. Fan, M. J. F. Digonnet, and G. S. Kino, "Designing air-core photonic-bandgap fibers free of surface modes," IEEE J. Quant. Electron., vol. 40, no. 5, pp. 551-556, 2004).

Moreover, if the silica portions 420 in the hexagonal air hole extended triangular lattice of the present example is made smaller than the air holes 421, that is, if the relationship $\omega_r<\Lambda$ is maintained, then optical characteristics different from those of hexagonal air hole extended triangular lattice with $\omega_r=\Lambda$ can be obtained.

Figure 67:
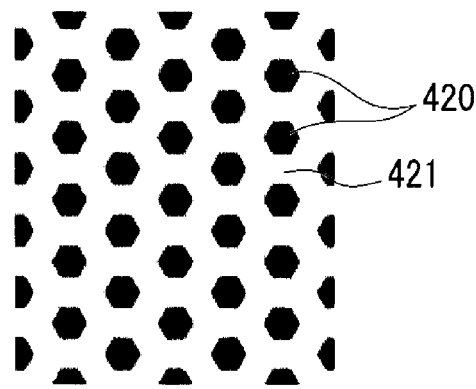
FIG. 67 is a cross section illustrating the hexagonal air hole extended triangular lattice structure with $\omega_r/\Lambda$=1, $\omega_b/\Lambda$=0 taken as reference example.
Figure 68:
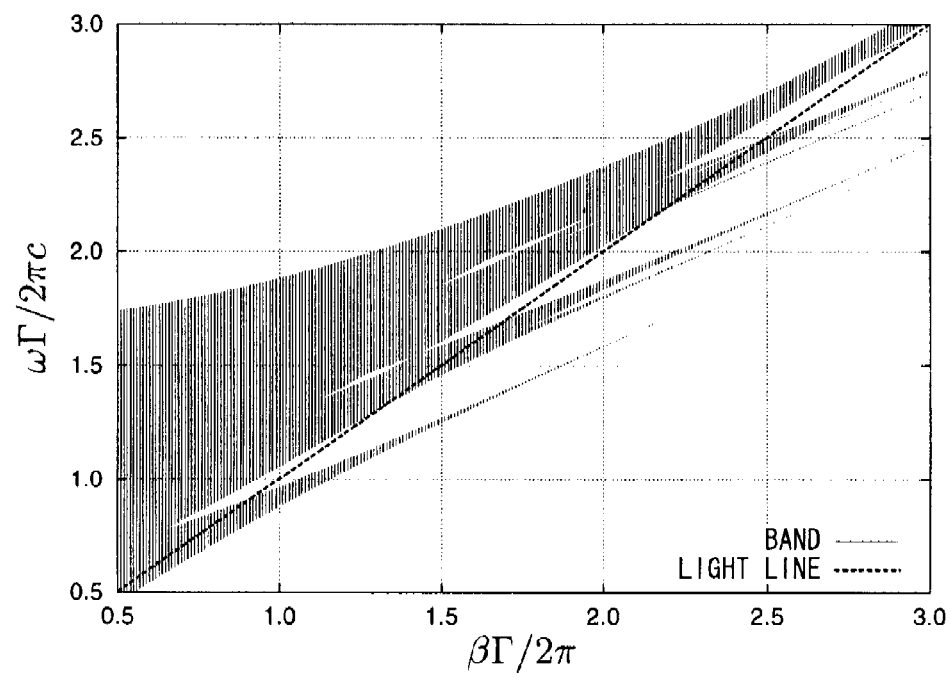
FIG. 68 is a graph showing the band structure in the hexagonal air hole extended triangular lattice structure of FIG. 67.

FIG. 67 is given here as a reference example showing the hexagonal air hole extended triangular lattice structure with $\omega_r=\Lambda$, while FIG. 68 is a graph showing the band structure. However, FIG. 67 shows a hexagonal air hole extended triangular lattice structure wherein $\omega_r=\Lambda$ and the partition wall thickness $\omega_b=0$. The black part of the hexagonal shape is the silica portion 420, while the white part is the air holes 421 in FIG. 67. The band structure of FIG. 68 was calculated by the Plane wave decomposition method described in "Block-iterative frequency-domain methods for Maxwell's equations in plane wave basis," Opt. Express, vol. 8, no. 3, pp. 173-190, 2001 by S. G. Johnson and J. D. Joannopoulos. In FIG. 68, β is the wave number of the transmission direction (direction perpendicular to the periodic structure), Γ=2Λ is the lattice constant of the extended triangular lattice, ω is the angular frequency, and c is the velocity of light. The light line expresses the dispersion curve when light is transmitted through a vacuum medium. The region enveloped by bands is the region wherein light cannot be transmitted in any direction in the cross section of the periodic structure, that is, it expresses the band gap. When this periodic structure is used in the fiber cladding and an air hole is used in the core, the region wherein light in the fiber core becomes the wave guide is adjacent to the light line, above which the band gap is present. In this case, the first wave guide region is present in the range Γ/λ ($=\omega\Gamma/2\pi c$)=0.82 to 1.30, while the second wave guide region is present in the range 1.58 to 2.13.

Here, λ is the wavelength of light transmitted in the fiber.

Figure 69:
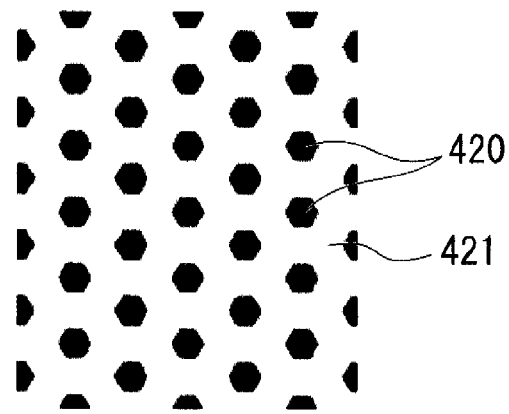
FIG. 69 shows a cross section of a hexagonal air hole extended triangular lattice structure with $\omega_r/\Lambda$=0.9, $\omega_b/\Lambda$=0, used in the PBGF of the fourth embodiment of the present invention.
Figure 70:
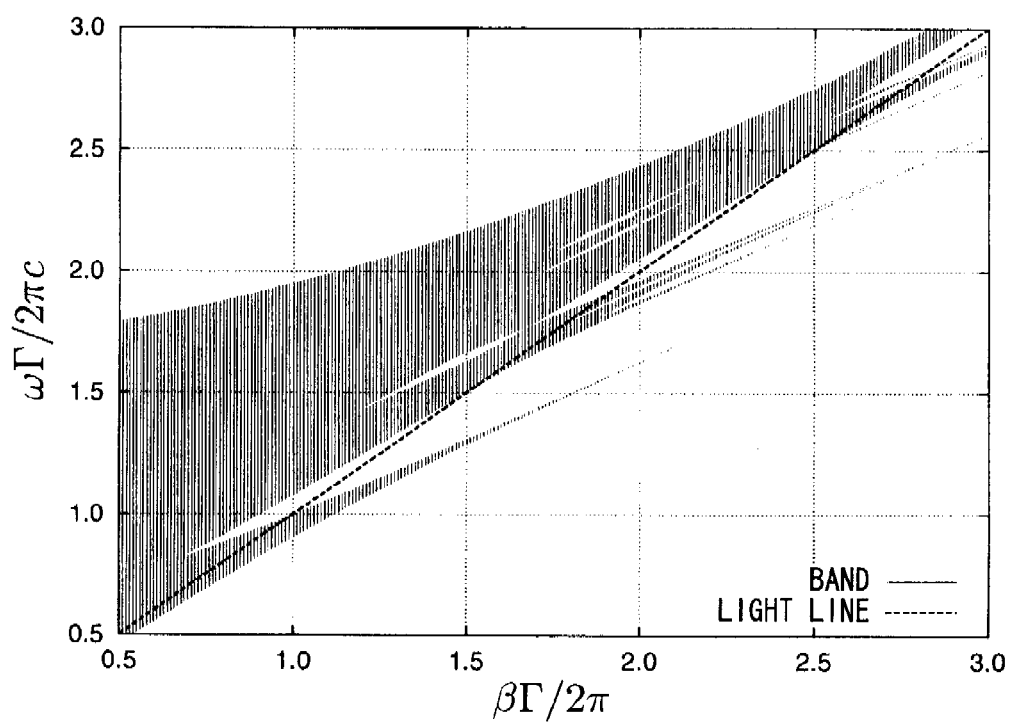
FIG. 70 is a graph showing the band structure of hexagonal air hole extended triangular lattice of FIG. 69.

On the other hand, FIG. 70 shows the band structure of hexagonal air hole extended triangular lattice structure related to the fourth embodiment of the present invention shown in FIG. 69. FIG. 69 shows the hexagonal air hole extended triangular lattice structure wherein multiple hexagonally-shaped silica portions 420 are arranged in triangular lattice configuration at constant pitch Γ in the cross section of the fiber, air holes 421 are provided between the silica portions 420, the length $\omega_r$ between the two sides facing each other of the silica portions 420 is made smaller than half the length Λ of pitch Γ ($\omega_r/\Lambda=0.9$), and the wall thickness $\omega_b$ is 0. However, to maintain the silica portions 420 in practice, intermittent partition walls not shown in the figures, may be present.

In this case, the first wave guide region is present in a range of Γ/λ between 0.85 and 1.45 and the second wave guide region is present in the range between 1.82 and 2.38. Compared to the band structure of hexagonal air hole extended triangular lattice structure wherein $\omega_r=\Lambda$ ($\omega_r/\Lambda=1$), the hexagonal air hole extended triangular lattice structure of the present example has a wider band gap, and moreover, the position of the band gap is higher. This suggests that the fiber dimensions required for realizing the same wavelength pass band are large, and this is advantageous from the production aspects.

Figure 71:
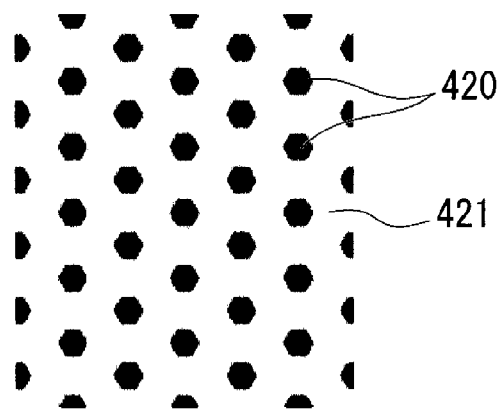
FIG. 71 is a cross section showing the hexagonal air hole extended triangular lattice structure with $\omega_r/\Lambda$=0.8, $\omega_b/\Lambda$=0 used in the PBGF of the fourth embodiment of the present invention.
Figure 72:
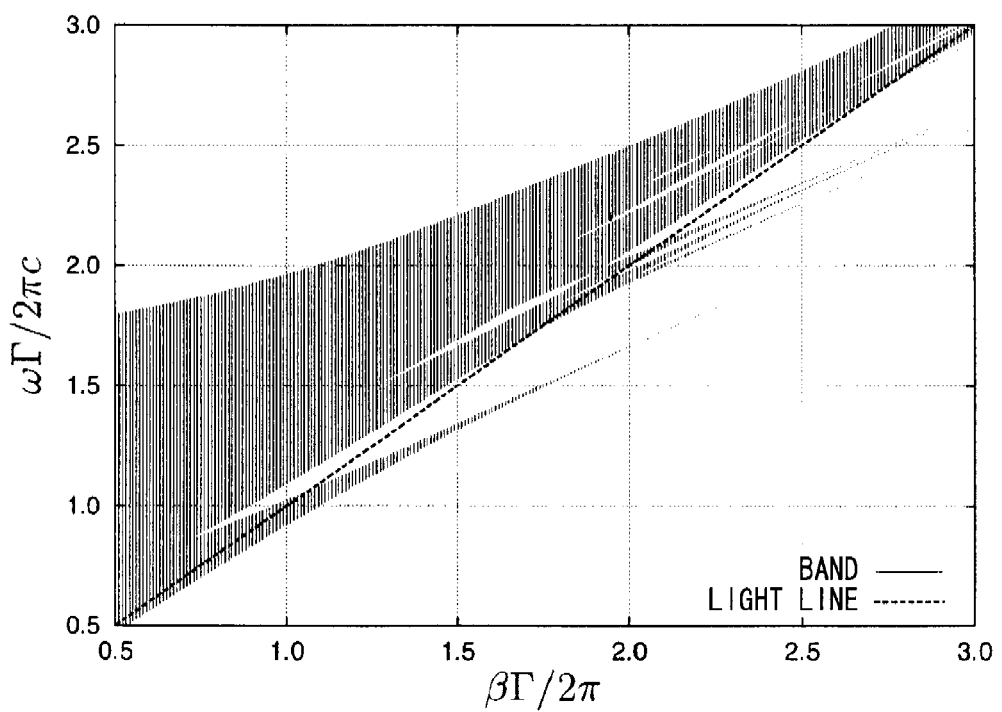
FIG. 72 is a graph showing the band structure of the hexagonal air hole extended triangular lattice of FIG. 71.

Also, FIG. 72 shows the band structure of the hexagonal air hole extended triangular lattice structure related to the fourth embodiment of the present invention shown in FIG. 71. The present example shows the hexagonal air hole extended triangular lattice structure with $\omega_r/\Lambda=0.8$, and $\omega_b=0$. In this case, the first wave guide region is present in a range of Γ/λ between 0.90 and 1.65, and the second wave guide region is present in the range between 2.02 and 2.62, as shown in FIG. 72. Compared to the band structure of hexagonal air hole extended triangular lattice structure wherein $\omega_r/\Lambda=1$, the fiber of the present example has a wider band gap, and moreover, the position of the band gap is higher.

The same trend is observed in actual fibers wherein partition wall 425 surrounding the air holes 421 is present.

Figure 73:
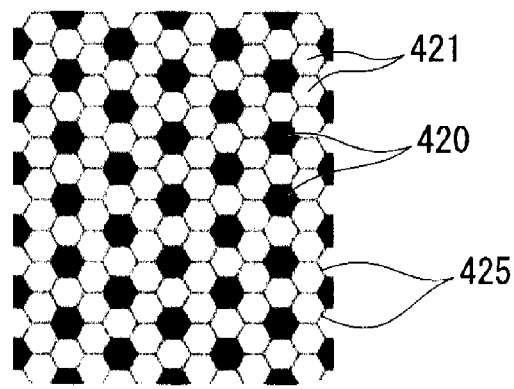
FIG. 73 is a cross section illustrating the hexagonal air hole extended triangular lattice structure with $\omega_r/\Lambda$=1, $\omega_b/\Lambda$=0.06 taken as reference examples.
Figure 74:
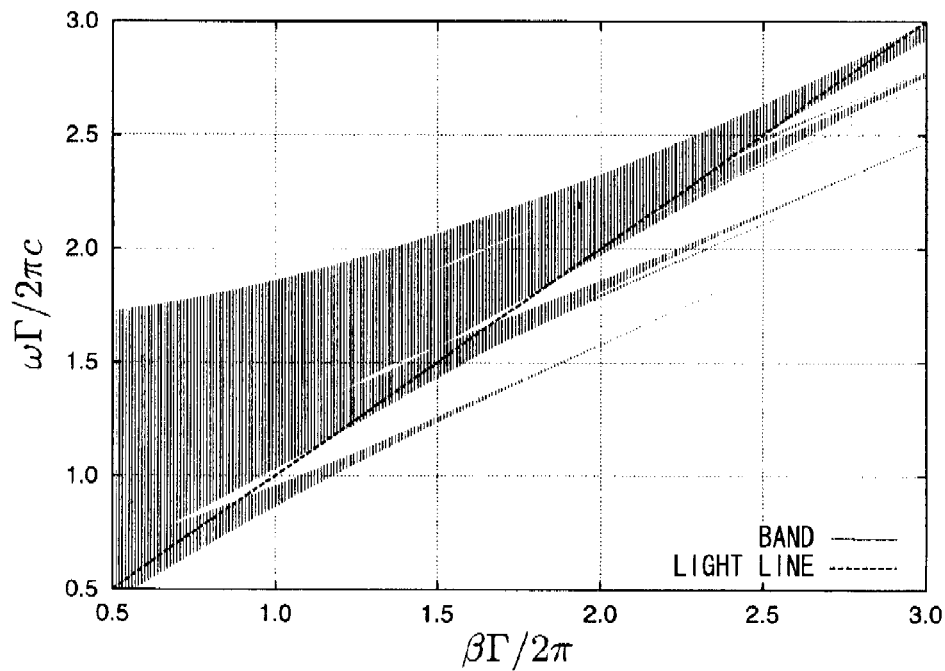
FIG. 74 is a graph showing the band structure in the hexagonal air hole extended triangular lattice structure of FIG. 73.

FIG. 73 is a reference example that shows the hexagonal air hole extended triangular lattice structure with $\omega_r/\Lambda=1$ and $\omega_b/\Lambda=0.06$, while FIG. 74 is a graph that shows its band structure. In this case, the first wave guide region is present in a range of $\Gamma/\lambda=0.79$ to 1.13, and the second wave guide region is present in the range 1.60 to 1.83.

Figure 75:
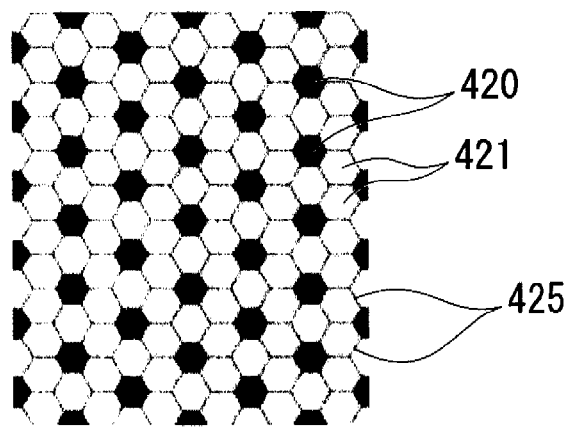
FIG. 75 shows a cross section of a hexagonal air hole extended triangular lattice structure with $\omega_r/\Lambda$=0.9, $\omega_b/\Lambda$=0.06, used in the PBGF of the fourth embodiment of the present invention.
Figure 76:
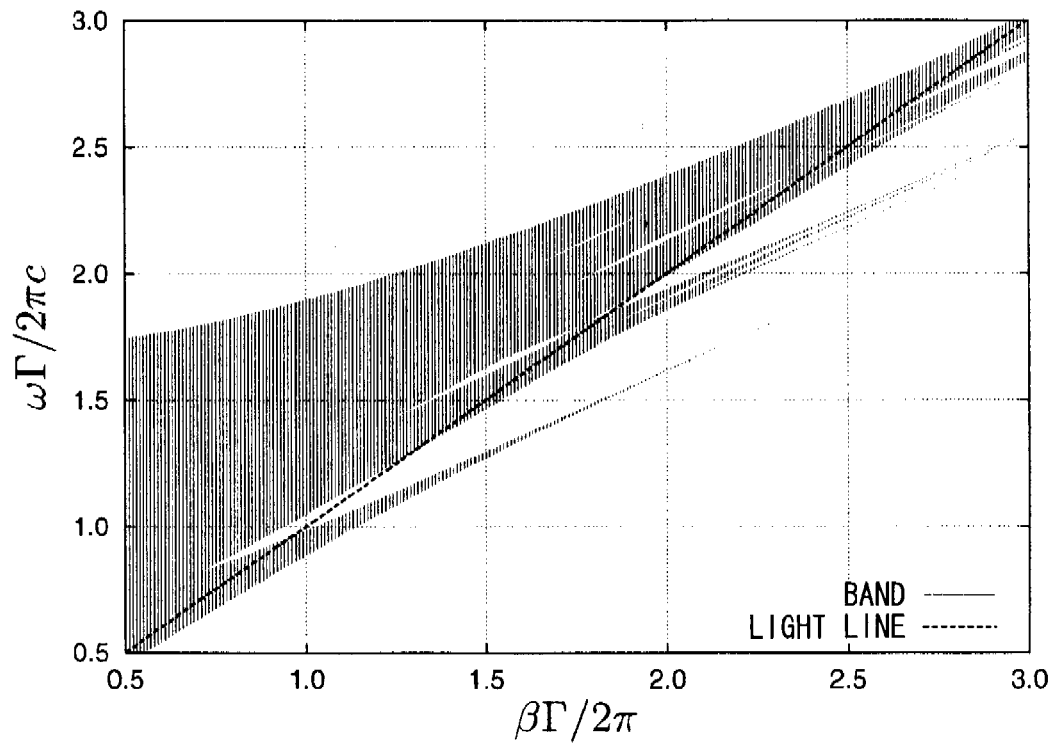
FIG. 76 is a graph showing the band structure of the hexagonal air hole extended triangular lattice of FIG. 75.

On the other hand, FIG. 76 shows the band structure of a hexagonal air hole extended triangular lattice structure related to the fourth embodiment of the present invention shown in FIG. 75. Similar to FIGS. 66A and 66B, the hexagonal air hole extended triangular lattice is alternately arranged with first rows of air holes 422 each having multiple hexagonal air holes 421 at first pitch $\Lambda$ in the cross section of the fiber, and multiple second rows of air holes 423 each having multiple hexagonal air holes at the second pitch $\Gamma$, which is twice the first pitch through hexagonally-shaped silica portions 420, and the length $\omega_r$ between the two sides facing each other of the silica portions 420 is smaller than the first pitch $\Lambda$. In this example, $\omega_r/\Lambda=0.9$, and $\omega_b/\Gamma=0.06$.

In this case, the first wave guide region is present in a range of $\Gamma/\lambda=0.86$ to 1.25 and the second wave guide region is present in a range of 1.82 to 1.94. Similar to the ideal fiber with $\omega_b=0$ as shown in FIG. 7, compare to the fiber in FIG. 73 wherein $\omega_r/\Lambda=1$, the band gap has widened and the position of the band gap has become higher.

Figure 77:
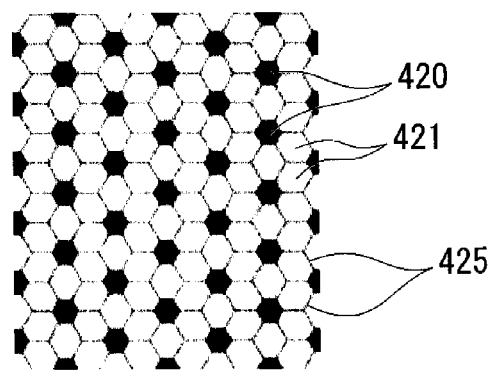
FIG. 77 is a cross section showing the hexagonal air hole extended triangular lattice structure with $\omega_r/\Lambda$=0.8, $\omega_b/\Lambda$=0.06 used in the PBGF of the fourth embodiment of the present invention.
Figure 78:
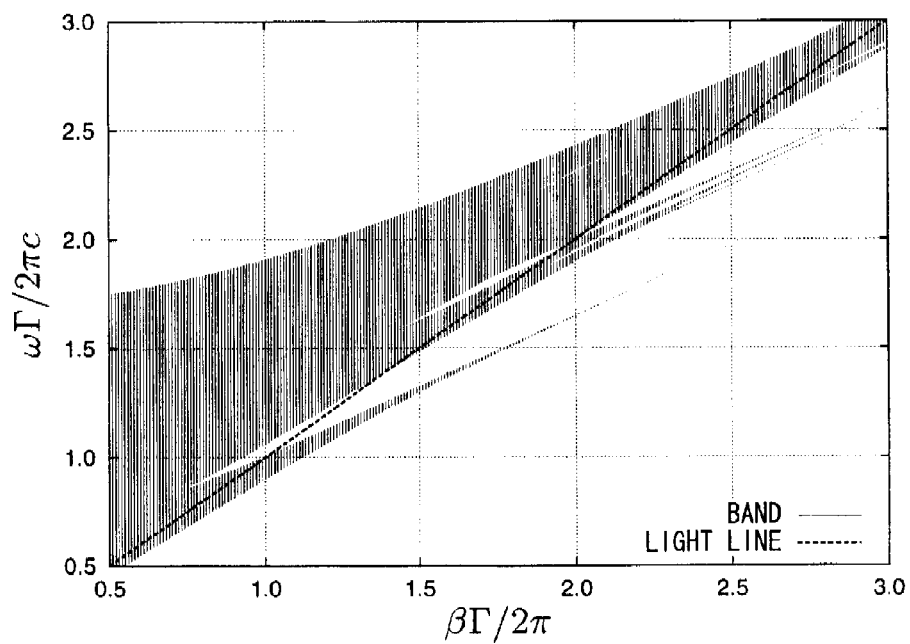
FIG. 78 is a graph showing the band structure of hexagonal air hole extended triangular lattice of the fourth embodiment of FIG. 77.

FIG. 78 shows the band structure of a hexagonal air hole extended triangular lattice structure related to the present invention shown in FIG. 77, wherein the silica portion 420 has been made smaller. The present example shows the hexagonal air hole extended triangular lattice structure with $\omega_r/\Lambda=0.8$, and $\omega_b=0.06$. In this case, the first wave guide region is present in a range of $\Gamma/\lambda$ between 0.89 and 1.33. Compared to the band structure of the hexagonal air hole extended triangular lattice structure wherein $\omega_r/\Lambda=1$, the fiber of the present example has a wider band gap, and moreover, the position of the band gap is higher.

Figure 79:
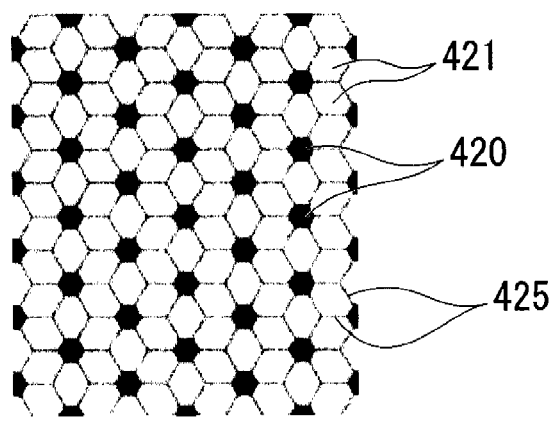
FIG. 79 is a cross section showing the hexagonal air hole extended triangular lattice structure with $\omega_r/\Lambda=0.7$, $\omega_b/\Lambda=0.06$ used in the PBGF of the fourth embodiment of the present invention.
Figure 80:
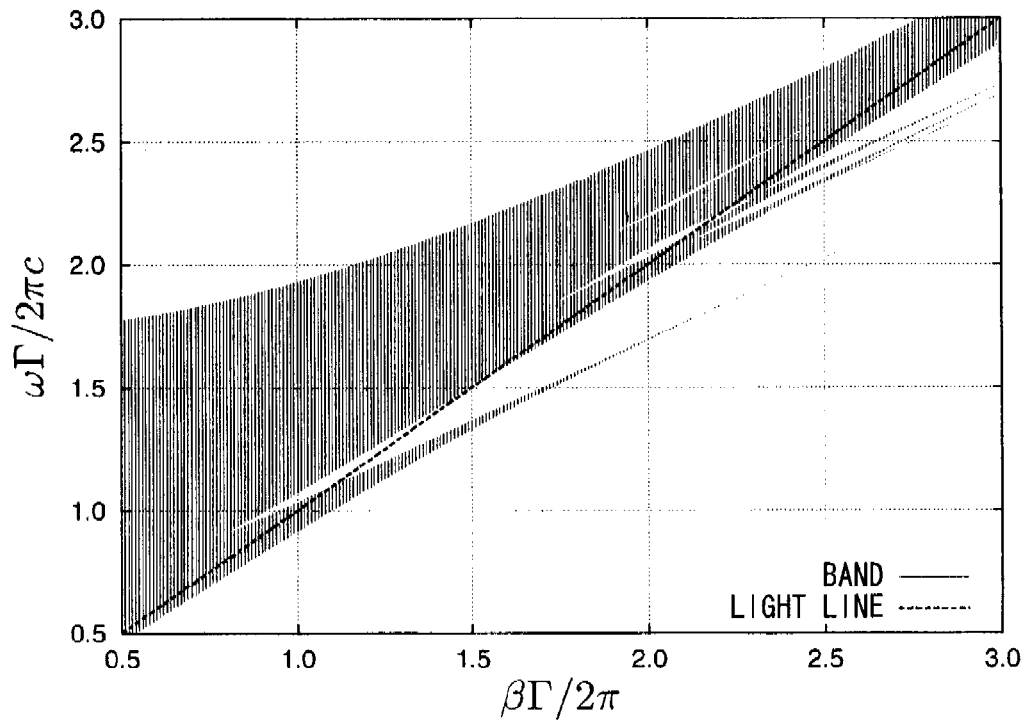
FIG. 80 is a graph showing the band structure of the hexagonal air hole extended triangular lattice of FIG. 79.

FIG. 80 shows the band structure of the hexagonal air hole extended triangular lattice structure related to the present invention shown in FIG. 79, wherein the silica portion 420 has been made smaller. The present example shows the hexagonal air hole extended triangular lattice structure with $\omega_r/\Lambda=0.7$, and $\omega_b=0.06$. In this case, the first wave guide region is present in a range of $\Gamma/\lambda$ between 0.97 and 1.46 and the second wave guide region is present in a range of between 1.93 and 2.18. Compared to the band structure of the hexagonal air hole extended triangular lattice structure wherein $\omega_r/\Lambda=1$, the fiber of the present example has a wider band gap, and moreover, the position of the band gap is higher.

The PBGF of the fourth embodiment of the present invention has an air hole periodic structure in an extended triangular lattice configuration mentioned earlier, in the cladding, and also has an air hole core at the center, and a core 424 with multiple hexagonal air holes arranged in triangular lattice configuration. The material of the silica portion 420 other than the air holes in the PBGF of the present invention can be made the same over the entire fiber. For instance, the use of pure silica ($SiO_2$) may be used, but silica glass including a dopant for adjusting the refractive index, such as fluorine or germanium dioxide may alternately be used.

In an exemplary embodiment of the present invention, if a configuration with partition walls 425 is adopted, then the thickness $\omega_b$ of these partition walls may be in the range of $0.05\Lambda \leq \omega_b \leq 0.2\Lambda$, or $\omega_b$ may further be in the range of $0.05\Lambda \leq \omega_b \leq 0.5\Lambda$.

If thin partition walls 425 are formed, optical characteristics similar to a PBGF with no partition walls, as shown in FIGS. 69 and 71 can be obtained, the band gap is widened and wider transmission bandwidths can be ensured.

On the other hand, if comparatively thicker partition walls 425 are formed, an extremely wide transmission bandwidth can be ensured, and the transmission bandwidth can also be shifted to the short wavelength side. If comparatively thicker partition walls 425 are formed, the advantage is that the PBGF production becomes easier.

In an exemplary embodiment of the present invention, the length $\omega_r$ between the two sides facing each other of the silica portions 420 may be in the range $0.4\Lambda \leq \omega_r \leq \Lambda$. If the length $\omega_r$ is less than the range mentioned above, the band gap becomes narrower, and the operating range of the fiber is reduced; thus, this length is not preferable.

In an exemplary embodiment of the present invention, the diameter D of the core 424 may be set so that it lies in the ranges (A) to (C) below.

(A) Range of $0.7\Lambda \leq D \leq 3.3\Lambda$
(B) Range of $4.7\Lambda \leq D \leq 7.3\Lambda$
(C) Range of $8.7\Lambda \leq D \leq 11.3\Lambda$ By setting the diameter D of core 324 within any of the ranges mentioned above, a PBGF with no surface mode can be offered. By making the diameter D of the core smaller, the core mode can be made a single mode. On the other hand, by increasing the diameter D of the core 424, multiple modes can be achieved.

The air hole periodic structure of the extended triangular lattice configuration provided in the cladding may be provided in three or more layers outside the core 424. If the number of layers of extended triangular lattice provided in the cladding is 2 or less, the confinement of light may become inadequate and the loss may increase.

The PBGF of the fourth embodiment of the present invention may have a core mode in which 60% or more, 70% or more or 80% or more of the transmitting power is concentrated in the core region, and may have optical characteristics wherein the surface mode is absent substantially. If the percentage of the transmitting power of the core mode mentioned above is less than 60%, light will be transmitted into the silica, which is not preferable.

The PBGF of the fourth embodiment of the present invention may have optical characteristics wherein the core mode is present within a range in which a wavelength $\lambda$, transmitted in the fiber, satisfies of $0.6 \leq \Gamma/\lambda \leq 1.7$. If $\Gamma/\lambda$ is less than 0.6, band gap will be no longer present, and light will not be transmitted. Moreover, if $\Gamma/\lambda$ exceeds 1.7, the band gap will be no longer present, and light will not be transmitted.

If a PBGF operates in high level band gaps, the $\Gamma/\lambda$ mentioned above, may be in a range of $1.5 \leq \Gamma/\lambda \leq 2.4$. If the ratio $\Gamma/\lambda$ is less than 1.5, the PBGF is outside the high order band gap and does not operate. Also, if $\Gamma/\lambda$ exceeds 2.4, the PBGF is again outside the high order band gap, and it does not operate.

Moreover, the PBGF may have optical characteristics wherein the core mode is present when the wavelength $\lambda$, transmitted in the fiber, satisfies a range of $2.1 \leq \Gamma/\lambda \leq 3.5$. Also, the PBGF may have optical characteristics wherein the core mode is present when the wavelength $\lambda$, transmitted in the fiber, satisfies a range of $0.7 \leq \Gamma/\lambda \leq 2.4$.

Figure 81:
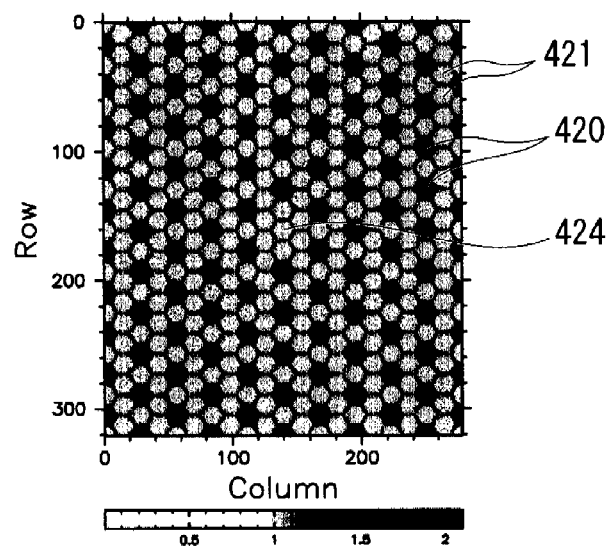
FIG. 81 is a cross section of the PBGF using a hexagonal air hole extended triangular lattice structure with $\omega_r/\Lambda=0.9$, $\omega_b/\Lambda=0.06$ produced in Example 4-1.

Next, an example of the production method of a PBGF of the fourth embodiment of the present invention is described here. In this example, the PBGF shown in FIG. 81 provided with the core 324 (capillary core) wherein the central silica portion 420 has been replaced by the air hole 421, and wherein the cladding has the hexagonal air hole extended triangular lattice structure shown in FIG. 66A, is described.

In this production method, first, silica capillary tubes, silica rods and hollow silica tubes thicker than the capillary tubes and rods are kept ready. First rows of air holes and second rows of air holes are arranged. In each first row multiple capillary tubes are arranged, and in each second row capillary tubes and hollow silica tubes are alternately arranged. Thus, the capillary tube arrangement of the cross section forms an extended triangular lattice. A capillary tube bundle is made with a capillary core region having central hollow silica tubes replaced by capillary tubes. The capillary tubes used in the production method of the present invention may be of annular cross section and the hollow silica tubes may be of annular cross section with thicknesses equal to the diameter of other capillary tubes. This central silica tube is taken as the silica portion through the hollow part, and its thickness can be appropriately selected according to the $\omega_r/\Lambda$ value in the PBGF to be produced.

The production method of a PBGF of the fourth embodiment of the present invention is not restricted to the example of method of formation of core region mentioned above, and the core structure of the PBGF to be produced may be changed appropriately. For instance, during production of the PBGF shown in FIG. 95, the hollow silica tube at the center of the hexagonal air hole extended triangular lattice structure and six hollow silica tubes surrounding this silica tube are replaced by capillary tubes to form the capillary core region. Also, when forming the air hole core, either the hollow silica tube at the center of the hexagonal air hole extended triangular lattice structure can be eliminated, or the central hollow silica tube, and the capillary tubes and hollow silica tubes in no less than one layer and no more than five layers surrounding the central hollow silica tube may be eliminated to form the air hole core.

Next, the capillary tube bundle mentioned above is heated and integrated to produce the preform for fiber spinning. This heating and integrating process may be one wherein the capillary tube bundle mentioned above is integrated in the inserted condition in the silica tube to produce the preform for fiber spinning. When the capillary tube bundle containing silica rods is integrated with the bundle inserted in the air hole of the silica tube as-is, the pressure and gas composition within the capillary tubes' spaces and in the spaces surrounding the capillary tubes, including the internal parts of the hollow silica tubes, can be separately adjusted.

When the capillary tube bundle is integrated with the capillary tube bundle inserted in air hole of the silica tube, only the spaces within the capillary tubes of the inserted capillary tube bundle is maintained at or above the atmospheric pressure. On the other hand, the clearance between the hollow parts of the hollow silica tubes and the capillary tubes may be maintained in a reduced pressure condition and heated; integration may be attained by eliminating the clearance between the capillary tubes while penetrating the hollow part of the hollow silica tubes.

By spinning the preform for fiber spinning produced as mentioned above, the PBGF shown in FIG. 81 can be obtained. This spinning process may be implemented after maintaining the pressure within the capillary tubes at a higher level than the pressure in the spaces surrounding the capillary tubes, and with a balanced pressure maintained in the spaces of capillary tube air holes. With this pressure adjustment, the capillary tube air holes become hexagonal in cross section, and the cross section of the silica portions become hexagonal.

The PBGF according to this example has a hexagonal air hole extended triangular lattice structure in the cladding. Thus, if an air hole core or a capillary core is formed at its center, an air hole core or a capillary core can be configured without the core edge cutting across the bulk mode, and optical characteristics can be obtained wherein only the core mode is present and no surface mode is generated; moreover, a wide wave guide bandwidth can be obtained, and the transmission loss can be reduced.

In the structure above, the hexagonally-shaped silica portion was made smaller than the pitch $\Lambda$ of the hexagonal air holes. Compared to the periodic structure wherein the pitch $\Lambda$ of the silica portions was equal to the pitch $\Lambda$ of the air holes, the band gap widens, the position of the band gap becomes higher, the size of the fiber required to realize the same wavelength pass band increases, and production becomes easier.

The production method of a PBGF according to the present example can be made the same as the conventional method of using capillary tubes, except for replacing some of the capillary tubes with thicker hollow silica tubes and combining them, and a PBGF with air hole periodic structure in an extended triangular lattice configuration can be easily produced. Thus, a PBGF with better optical characteristics than the conventional PBGF can be produced more easily and more economically by using methods similar to the conventional PBGF.

EXAMPLE 4-1

As shown in FIG. 81, a PBGF was produced with a cladding containing a hexagonal air hole extended triangular lattice structure wherein the ratio of length $\omega_r$ between the two sides of the silica portions 420 with respect to the pitch $\Lambda$ was 0.9 ($\omega_r/\Lambda=0.9$, the ratio of thickness $\omega_b$ of the partition walls 425 was 0.06 ($\omega_b/\Lambda=0.06$) with respect to the pitch $\Lambda$, and having a core 424 (capillary core) wherein the central silica portion 420 was replaced by the air hole 421, and the dispersion of the core mode was studied.

Figure 82:
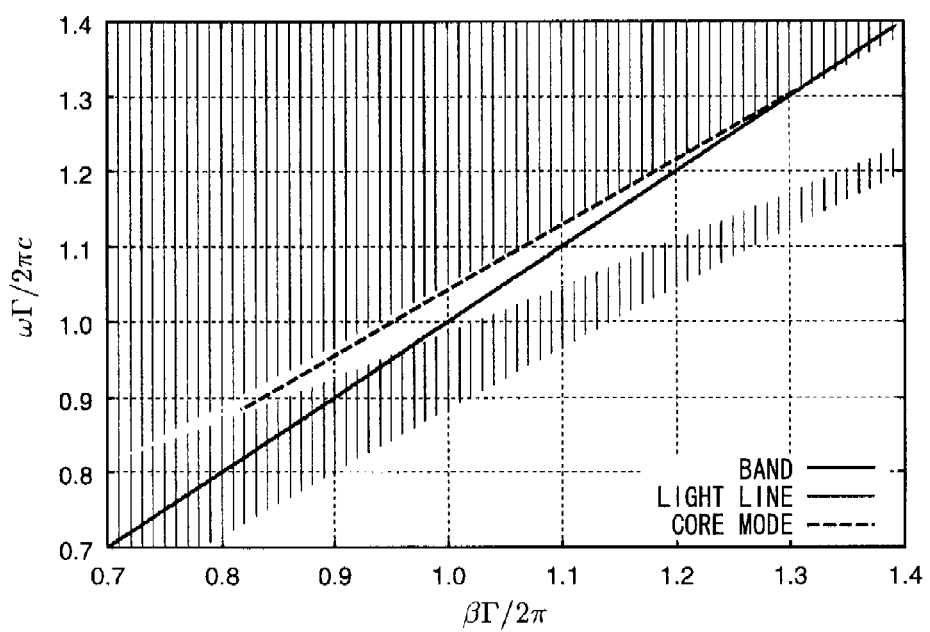
FIG. 82 is a graph showing the dispersion in the first band gap of the PBGF of Example 4-1.

FIG. 82 is a graph showing the dispersion in the first band gap of this PBGF. In FIG. 82, $\beta$ is the wave number of the transmission direction (direction perpendicular to the periodic structure), $\Gamma=2\Lambda$ is the lattice constant of the extended triangular lattice, $\omega$ is the angular frequency, and c is the velocity of light. The light line expresses the dispersion curve when light is transmitted through a vacuum medium. The region enveloped by bands is the region wherein light cannot be transmitted in any direction in the cross section of the periodic structure, that is, it expresses the band gap. As shown in FIG. 82, only the core mode is present and the surface mode is absent in the band gap of $\Gamma/\lambda$ ($=\omega\Gamma/2\pi c$)=0.89 to 1.30. Also, the core mode in this case is a single mode (including a degenerative mode).

Figure 83:
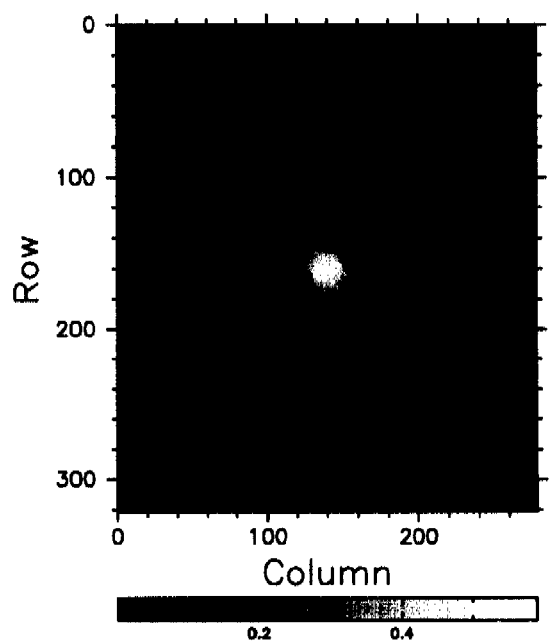
FIG. 83 is a figure showing the power distribution of the core mode of the first band gap of the PBGF of Example 4-1.
Figure 84:
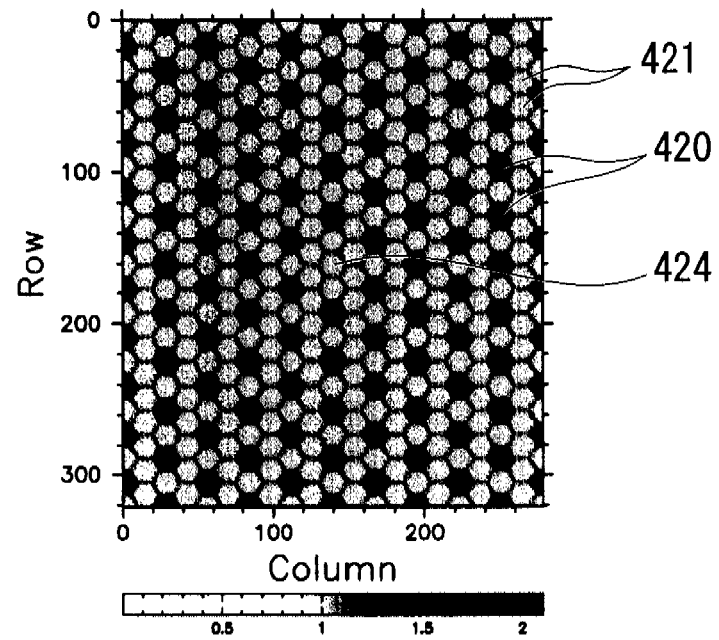
FIG. 84 shows the permittivity distribution of the PBGF of Example 4-1.

FIG. 83 shows the typical power distribution of the core mode at this stage. FIG. 84 is the permittivity of the fiber shown in the same scale as FIG. 81. As shown in the figure, the power of the core mode is distributed only slightly over the silica portion 420 just near the core, while most of it is distributed within the core 424.

Figure 85:
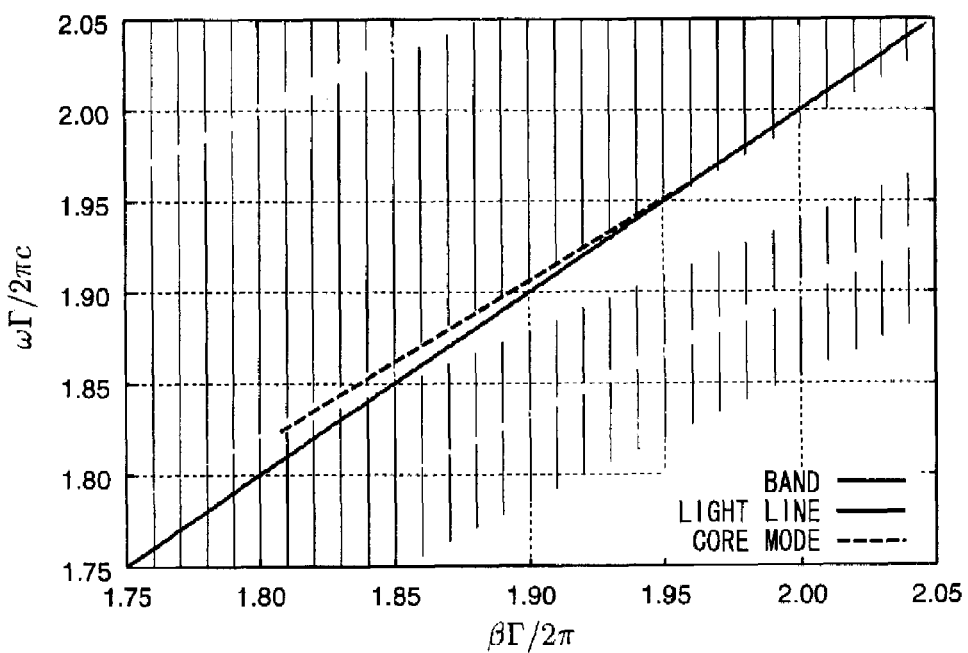
FIG. 85 is a graph showing the dispersion in the second band gap of the PBGF of Example 4-1.

FIG. 85 shows the dispersion of the second band gap in the PBGF of the present embodiment. As shown in the figure, the core mode is present but the surface mode is absent in $\Gamma/\lambda=1.83$ to 1.96. The core mode in this case is also a single mode (including a degenerative mode).

Figure 86:
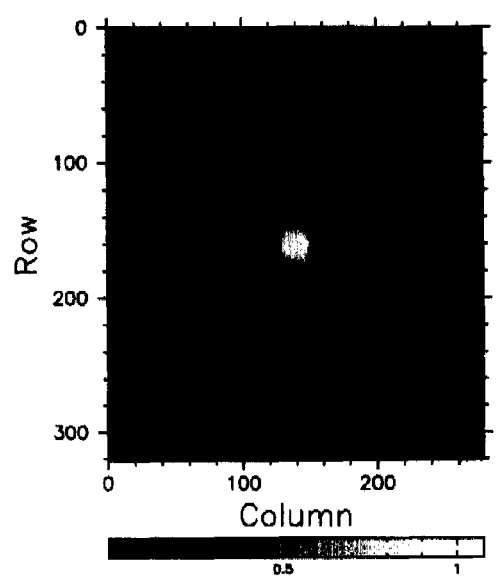
FIG. 86 is a figure showing the power distribution of the core mode of the second band gap of the PBGF of Example 4-1.

FIG. 86 shows the typical power distribution of the core mode at this stage. As shown in the figure, substantially the entire power of the core mode is distributed within the core 424.

EXAMPLE 4-2

Figure 87:
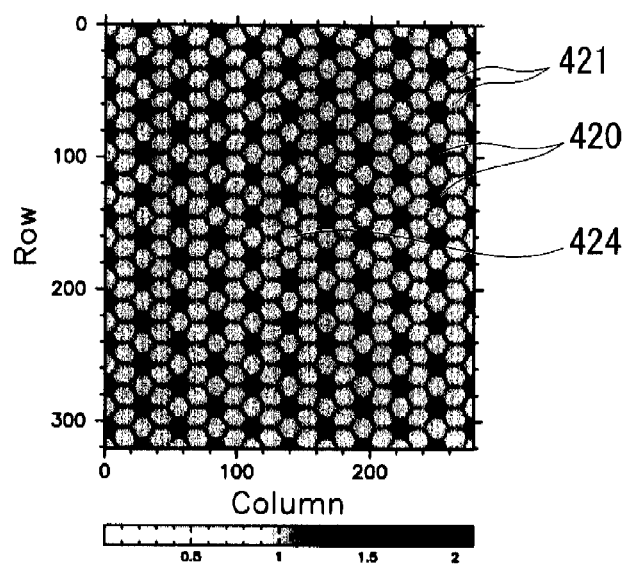
FIG. 87 is a cross section of a PBGF using a hexagonal air hole extended triangular lattice structure with $\omega_r/\Lambda=0.8$, $\omega_b/\Lambda=0.06$ produced in Example 4-2.
Figure 88:
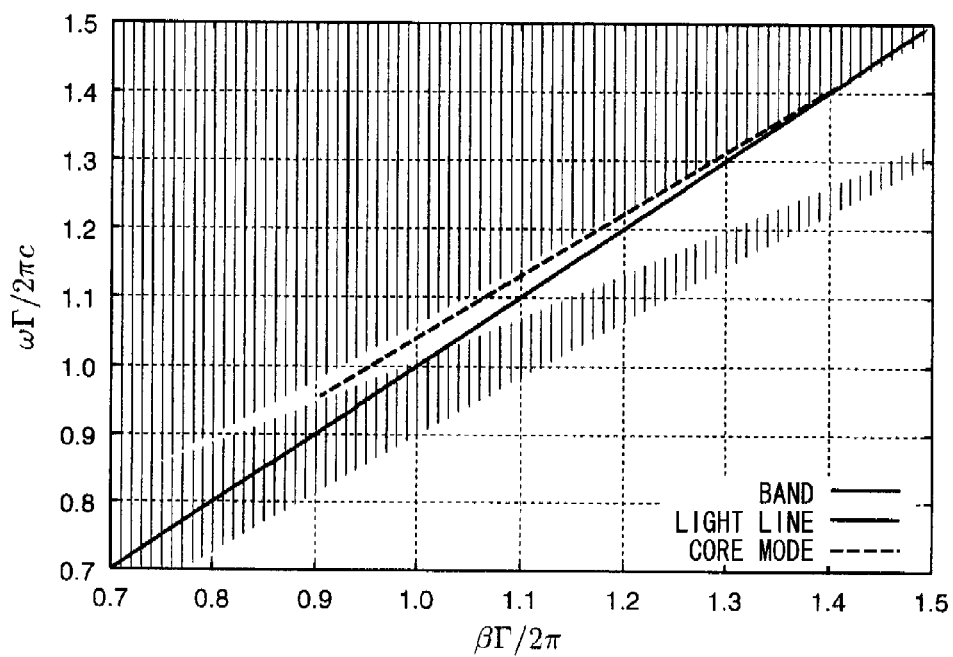
FIG. 88 is a graph showing the dispersion in the first band gap of the PBGF of Example 4-2.

As shown in FIG. 87, a PBGF was produced with cladding containing a hexagonal air hole extended triangular lattice structure wherein $\omega_r/\Lambda=0.8$, $\omega_b/\Lambda=0.06$, and having a core 424 (capillary core) wherein the central silica portion 420 was replaced by the air hole 421, and the dispersion of the core mode was studied. FIG. 88 is a graph showing the dispersion in the first band gap of this PBGF. As shown in the figure, only the core mode is present in the band gap when $\Gamma/\lambda=0.96$ to 1.40, and the surface mode is absent. Also, the core mode in this case is a single mode (including a degenerative mode).

Figure 89:
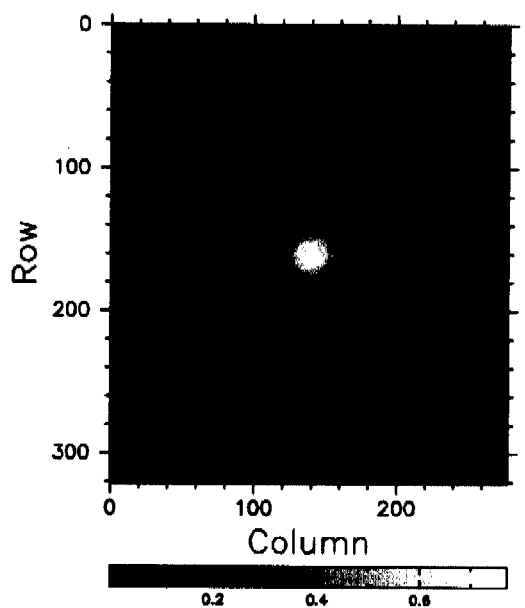
FIG. 89 is a figure showing the power distribution of the core mode of the first band gap of the PBGF of Example 4-2.
Figure 90:
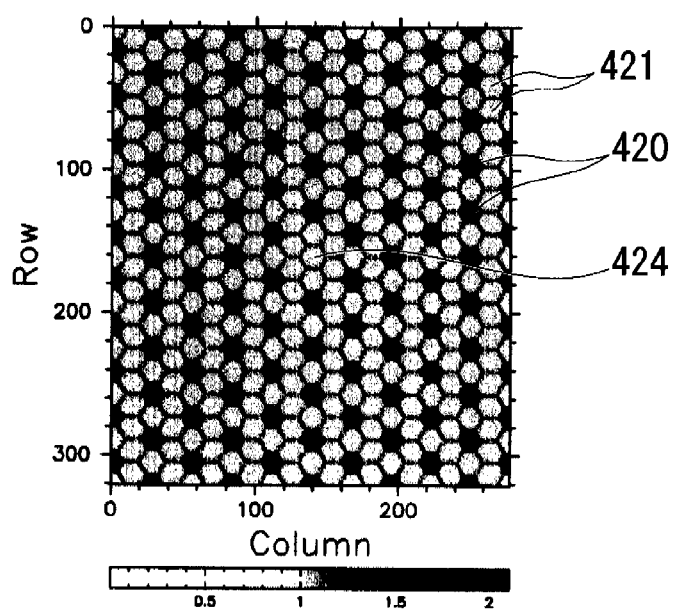
FIG. 90 shows the permittivity distribution of the PBGF of Example 4-2.

FIG. 89 shows the typical power distribution of the core mode at this stage. FIG. 90 is the permittivity of the fiber shown in the same scale as FIG. 87. As shown in the figure, substantially the entire power of the core mode is distributed within the core 424.

EXAMPLE 4-3

Figure 91:
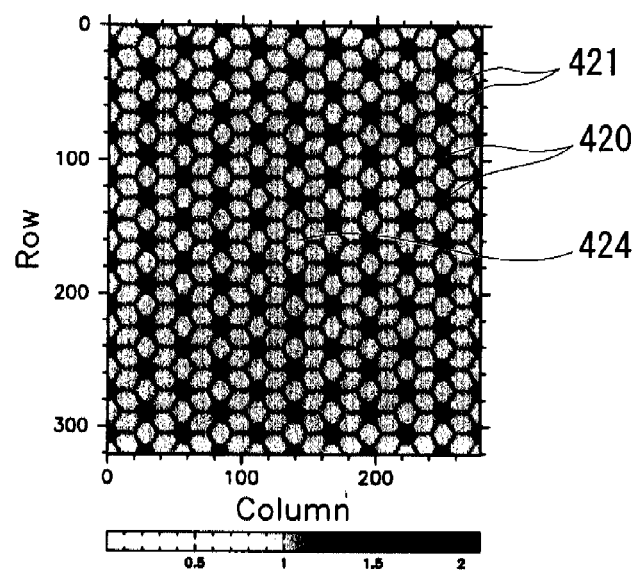
FIG. 91 is a cross section of the PBGF using a hexagonal air hole extended triangular lattice structure with $\omega_r/\Lambda=0.7$, $\omega_b/\Lambda=0.06$ produced in Example 4-3.
Figure 92:
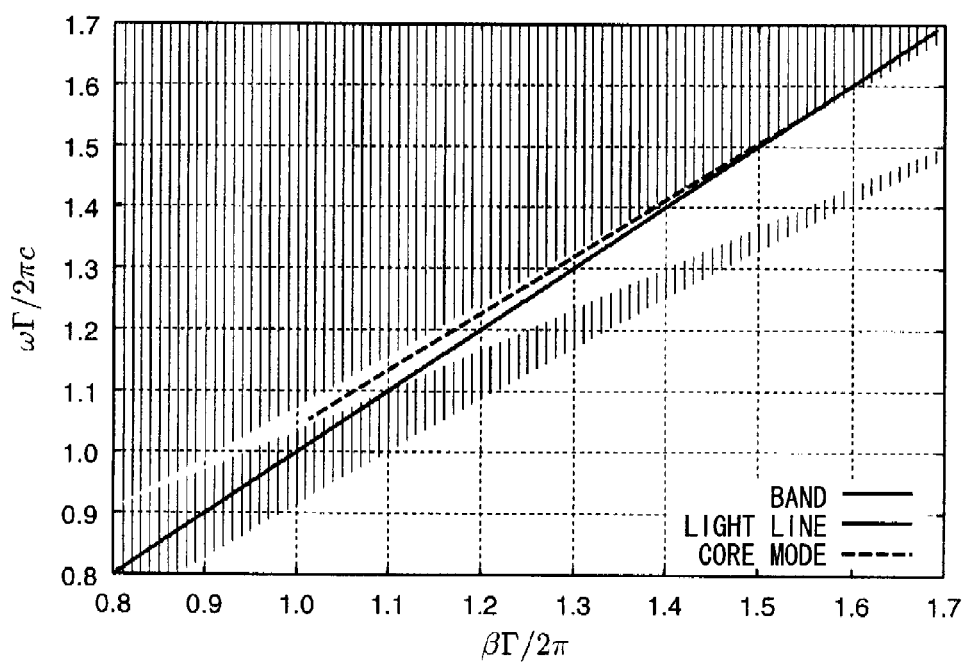
FIG. 92 is a graph showing the dispersion in the first band gap of the PBGF of Example 4-3.

As shown in FIG. 91, a PBGF was produced with cladding containing a hexagonal air hole extended triangular lattice structure wherein $\omega_r/\Lambda=0.7$, $\omega_b/\Lambda=0.06$, and having a core 424 (capillary core) wherein the central silica portion 420 was replaced by the air hole 421, and the dispersion of the core mode was studied. FIG. 92 is a graph showing the dispersion in the first band gap of this PBGF. As shown in the figure, only the core mode is present in the band gap when $\Gamma/\lambda=1.05$ to 1.57, and the surface mode is absent. Also, the core mode in this case is a single mode (including a degenerative mode).

Figure 93:
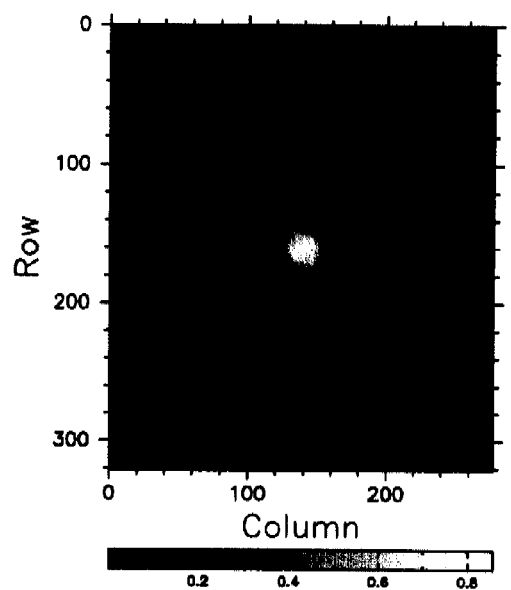
FIG. 93 is a figure showing the power distribution of the core mode of the first band gap of the PBGF of Example 4-3.
Figure 94:
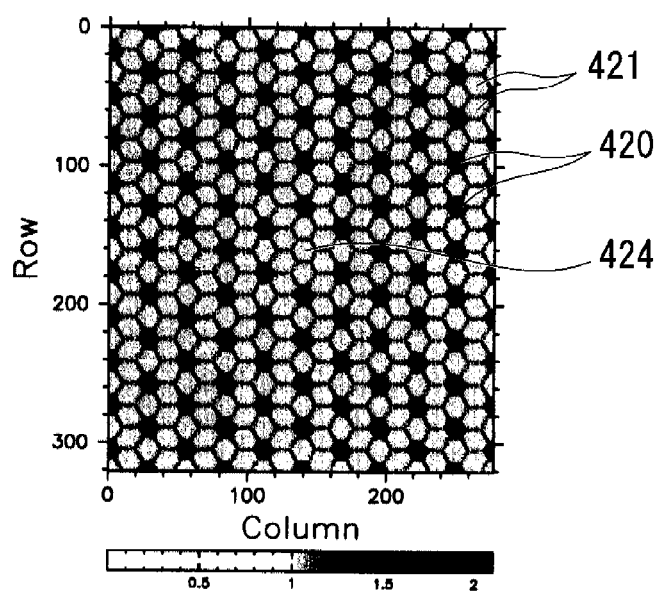
FIG. 94 shows the permittivity distribution of the PBGF of Example 4-3.

FIG. 93 shows the typical power distribution of the core mode at this stage. FIG. 94 is the permittivity of the fiber shown in the same scale as FIG. 91. As shown in the figure, substantially the entire power of the core mode is distributed within the core 424.

EXAMPLE 4-4

Figure 95:
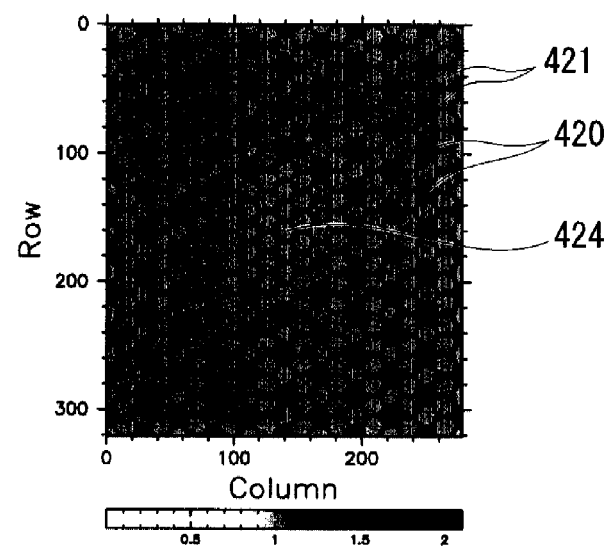
FIG. 95 is the cross section of the PBGF using a hexagonal air hole extended triangular lattice structure with $\omega_r/\Lambda=0.9$, $\omega_b/\Lambda=0.06$, produced in Example 4-4.
Figure 96:
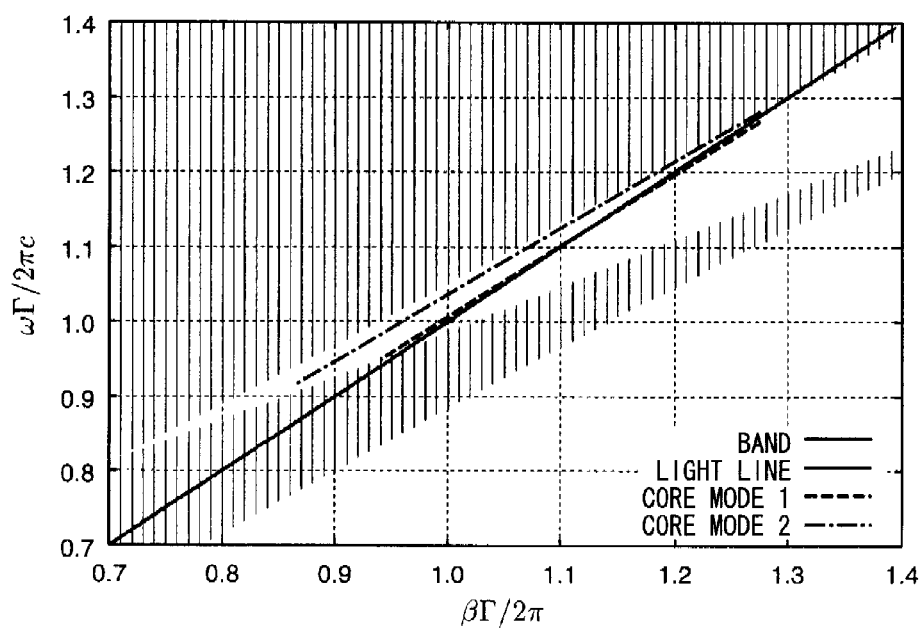
FIG. 96 is a graph showing the dispersion in the first band gap of the PBGF of Example 4-4.

As shown in FIG. 95, a PBGF was produced with cladding containing a hexagonal air hole extended triangular lattice structure wherein $\omega_r/\Lambda=0.9$, $\omega_b/\Lambda=0.06$, and having a core 424 (capillary core) wherein the central silica portion 420, and six silica portions 420 in one layer on the outside of it, were replaced by the air hole 421, and the dispersion of the core mode was studied. FIG. 96 is a graph showing the dispersion in the first band gap of this PBGF. As shown in the figure, the core mode 1 is present when $\Gamma/\lambda=0.96$ to 1.26, the core mode 2 is present when $\Gamma/\lambda=0.92$ to 1.27, and the surface mode is absent. However, the degenerative mode is included in each core mode.

Figure 97:
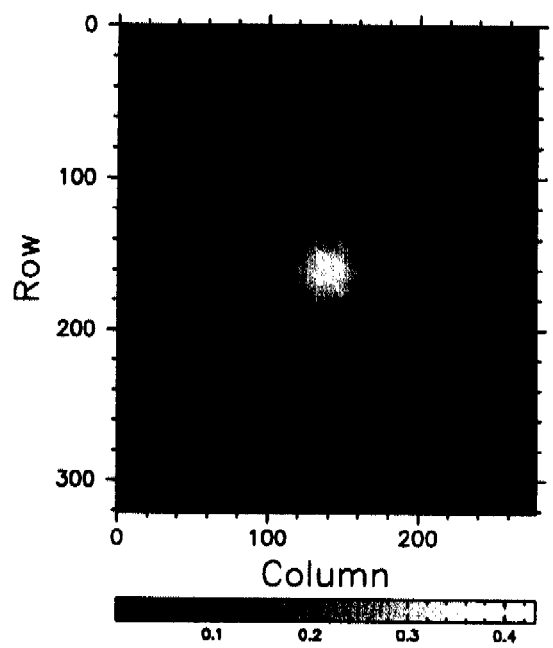
FIG. 97 is a figure showing the power distribution of a core mode 1 of the first band gap of the PBGF of Example 4-4.
Figure 98:
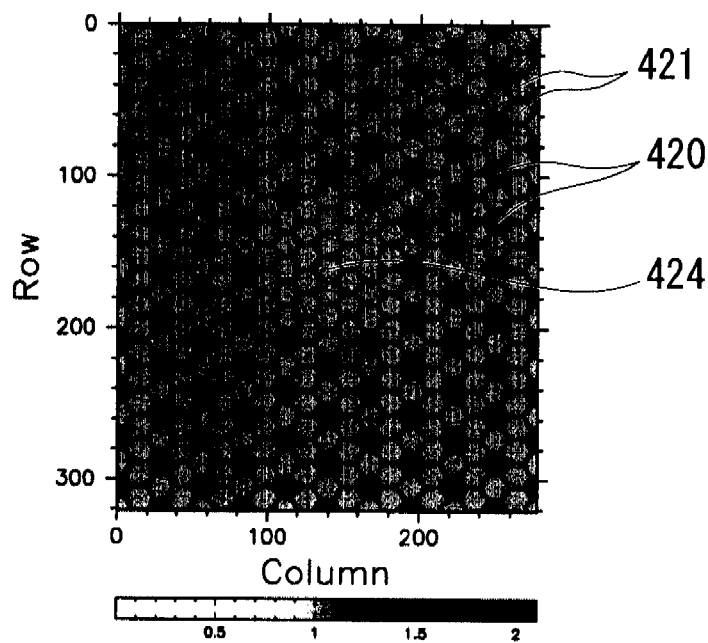
FIG. 98 shows the permittivity distribution of the PBGF of Example 4-4.

FIG. 97 shows the typical power distribution of the core mode 1 at this stage. FIG. 98 is the permittivity of the fiber shown in the same scale as FIG. 95. As shown in the figure, substantially the entire power of the core mode is distributed within the core 424.

Figure 99:
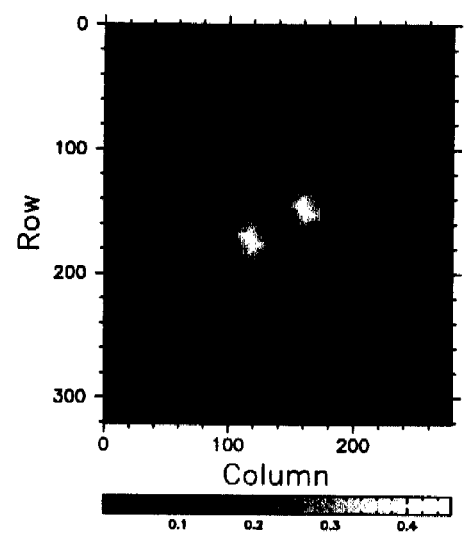
FIG. 99 is a figure showing the power distribution of a core mode 2 of the first band gap of the PBGF of Example 4-4.

Also, FIG. 99 shows the typical power distribution of the core mode 2 in the first band gap in the PBGF of the present embodiment.

Figure 100:
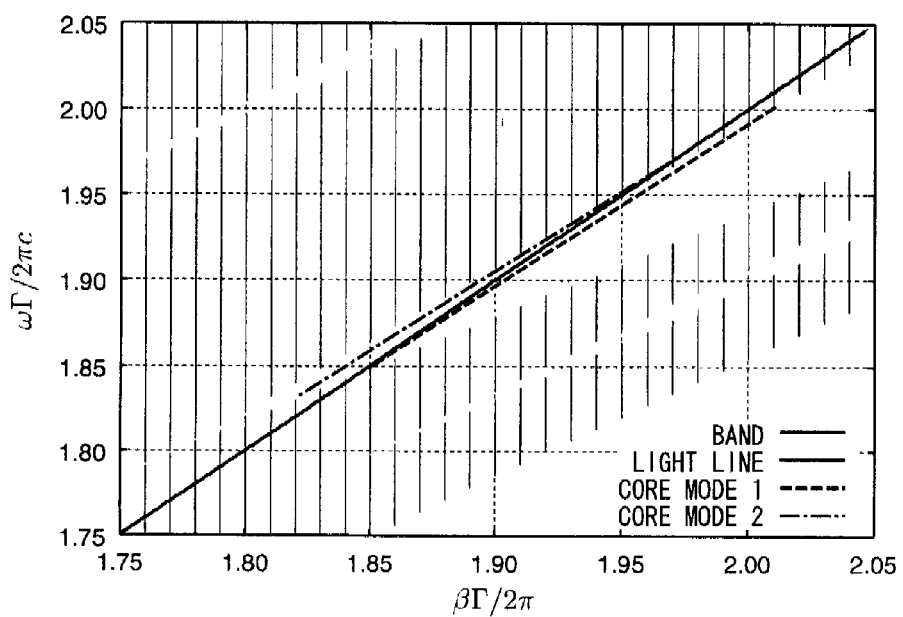
FIG. 100 is a graph showing the dispersion in the first band gap of the PBGF of Example 4-4.

FIG. 100 shows the dispersion of the second band gap in the PBGF of the present embodiment. As shown in the figure, the core mode 1 is present when $\Gamma/\lambda=1.85$ to 2.00, the core mode 2 is present when $\Gamma/\lambda=1.83$ to 1.97, and the surface mode is absent. However, the degenerative mode is included in each core mode. The dispersion of the core mode is present in the region below the light line also because a small amount of silica remains as partition wall in the core 424.

Figure 101:
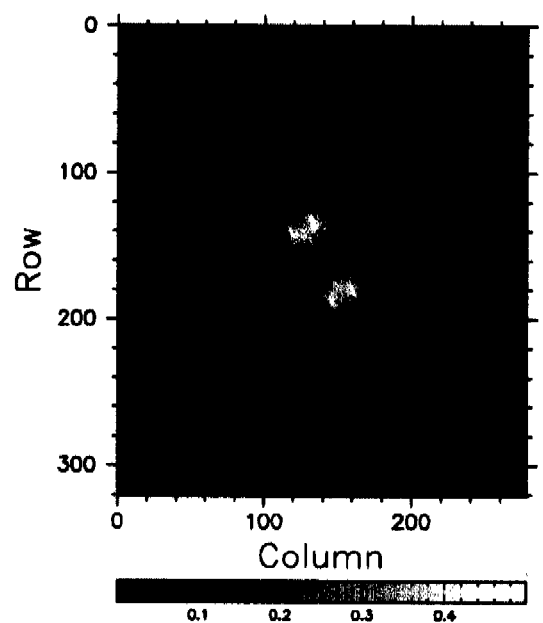
FIG. 101 is a figure showing the power distribution of a core mode 1 of the second band gap of the PBGF of Example 4-4.
Figure 102:
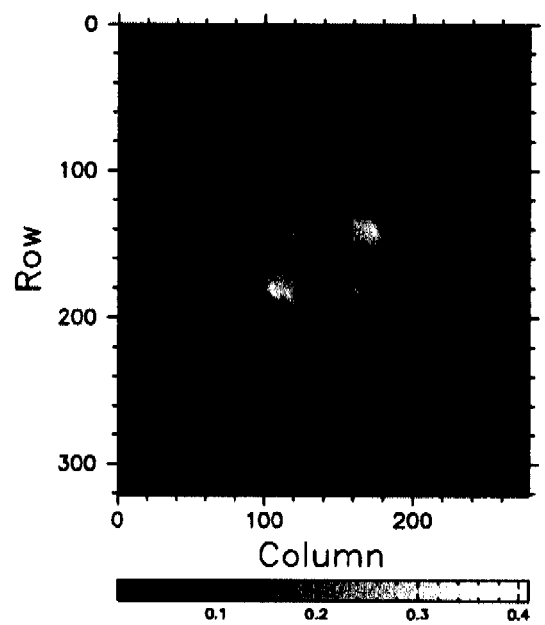
FIG. 102 is a figure showing the power distribution of a core mode 2 of the second band gap of the PBGF of Example 4-4.

FIG. 101 shows the typical power distribution of the core mode 1 at this stage. FIG. 102 shows the typical power distribution of the core mode 2 in this case.

EXAMPLE 4-5

Figure 103:
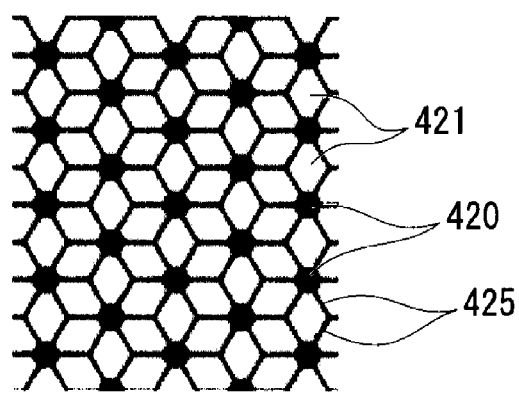
FIG. 103 is a cross section of a hexagonal air hole extended triangular lattice structure with $\omega_r/\Lambda=0.7$, $\omega_b/\Lambda=0.1$, produced in Example 4-5.
Figure 104:
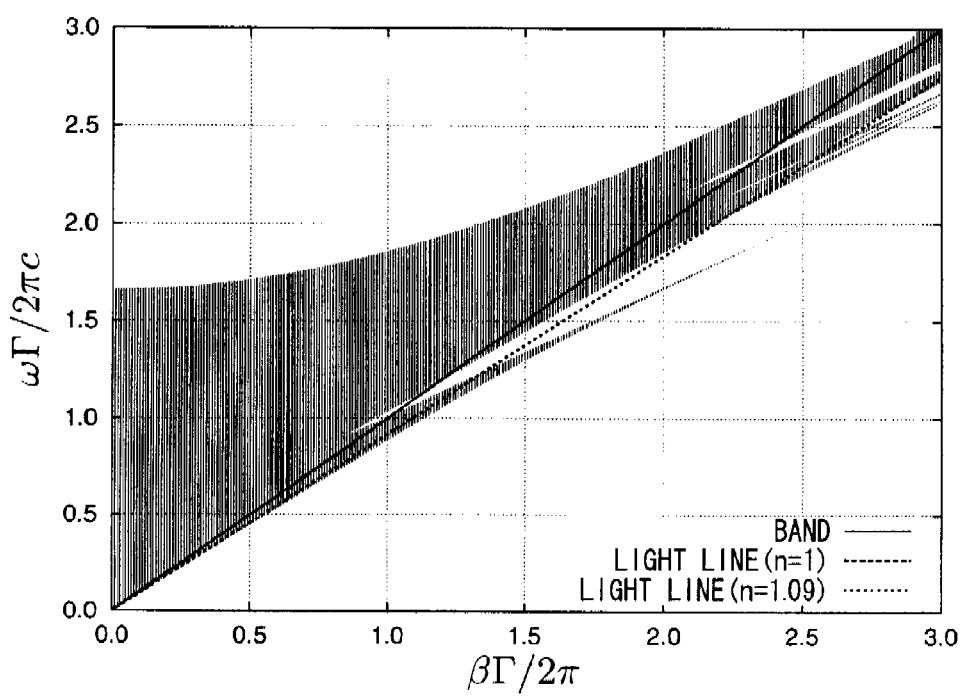
FIG. 104 is a graph showing the dispersion in the first band gap of the PBGF of Example 4-5.

FIG. 104 shows the band structure of hexagonal air hole extended triangular lattice wherein $\omega_r/\Lambda=0.7$, and $\omega_b/\Lambda=0.1$, as shown in FIG. 103. Here, the refractive index of silica was taken as n=1.45. In FIG. 103, the black hexagonal parts are the silica portions 420, the white hexagonal parts are the air holes 421, and the bold lines that divide the air holes 421 are the partition walls 425. The band structure was calculated by the Plane wave decomposition method described in "Block-iterative frequency-domain methods for Maxwell's equations in plane wave basis," Opt. Express, vol. 8, no. 3, pp. 173-190, 2001 by S. G. Johnson and J. D. Joannopoulos. In FIG. 104, β is the wave number of the transmission direction (direction perpendicular to the periodic structure), $\Gamma=2\Lambda$ is the lattice constant of the extended triangular lattice, ω is the angular frequency, and c is the velocity of light. The light line (n=1) expresses the dispersion curve when light is transmitted through a vacuum medium. The region enveloped by bands is the region wherein light cannot be transmitted in any direction in the cross section of the periodic structure, that is, it expresses the band gap.

When this periodic structure is used in the fiber cladding, and air hole used in the core, the band wherein light in the fiber core becomes the wave guide is adjacent to the n=1 light line above which the band gap is present. In this case, the wave guide region is present in a range of $\Gamma/\lambda$ ($\omega\Gamma/2\pi c$)=0.93 to 1.16. Here, λ is the wavelength of light transmitted in the fiber. However, if a capillary core is used, the permittivity refractive index of the core increases; therefore, light line that transmits within the dielectric is used instead of the light line that transmits within the vacuum medium mentioned above. In this case, the average refractive index of the core can be approximated by equation (1).

$$n_{eff} = \frac{n_{air}S_{air} + n_{silica}S_{silica}}{S_{air} + S_{silica}} \qquad (1)$$

Figure 105:
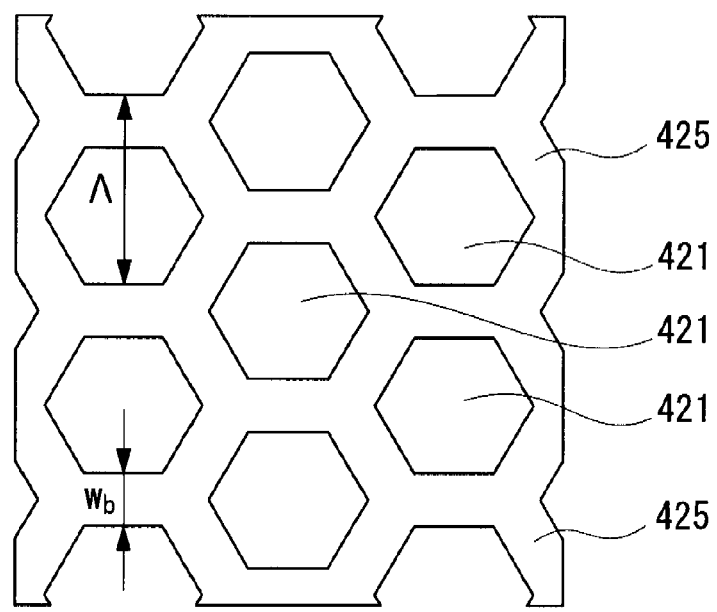
FIG. 105 is a cross section that shows the capillary core structure of the PBGF of Example 4-5.

However, $n_{eff}$, $n_{air}$, $n_{silica}$ are respectively the average refractive index of core, the refractive index of air, and the refractive index of silica respectively, while $S_{air}$ and $S_{silica}$ are the areas occupied by air the core and the area occupied by silica in the core respectively. The capillary core is shown in FIG. 105. Since the structure is arranged in a triangular lattice configuration by almost hexagonally-shaped multiple air holes 421 through the partition walls 425, each area can be expressed by the equations (2) and (3).

$$S_{air} = \frac{3}{4}(\Lambda - w_b)^2, \qquad (2)$$

$$S_{silica} = \frac{3}{4}[\Lambda^2 - (\Lambda - w_b)^2] \qquad (3)$$

In this example, $n_{eff}$ becomes 1.09. As shown by the light line (n=1.09) in FIG. 104, a wave guide region is present in a range of $\Gamma/\lambda=1.11$ to 2.02 for the fiber having capillary core, and compared to the air hole core (air hole core), it has a fairly wide wave guide band, and the wavelength band also shifts to the short wavelength side. As a result, not only is a wider bandwidth realized, but also the limitations of size of microstructure in fiber production become more relaxed; that is, simplification of fiber production is realized.

Figure 106:
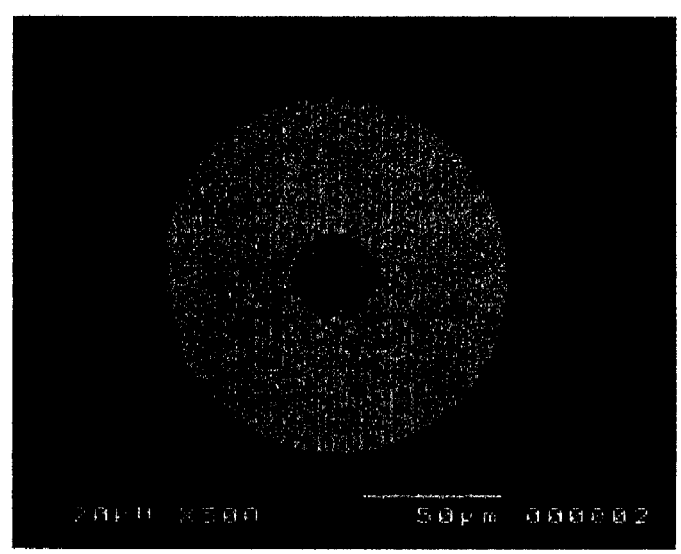
FIG. 106 is a cross section using a hexagonal air hole extended triangular lattice structure with $\omega_r/\Lambda=0.7$, $\omega_b/\Lambda=0.1$, produced in Example 4-5.
Figure 107:
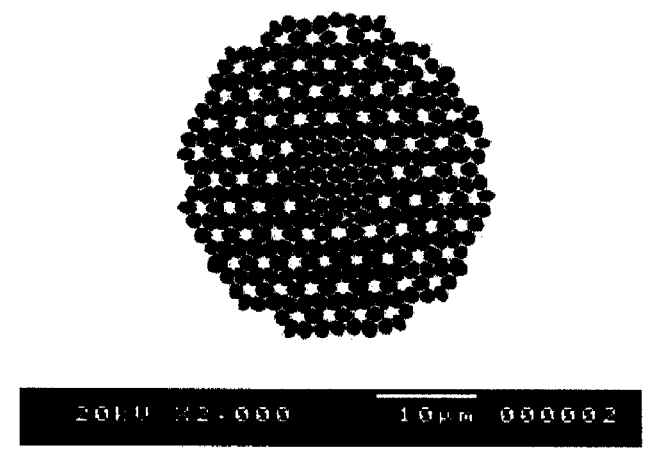
FIG. 107 is an enlarged view of a portion of FIG. 106.
Figure 108:
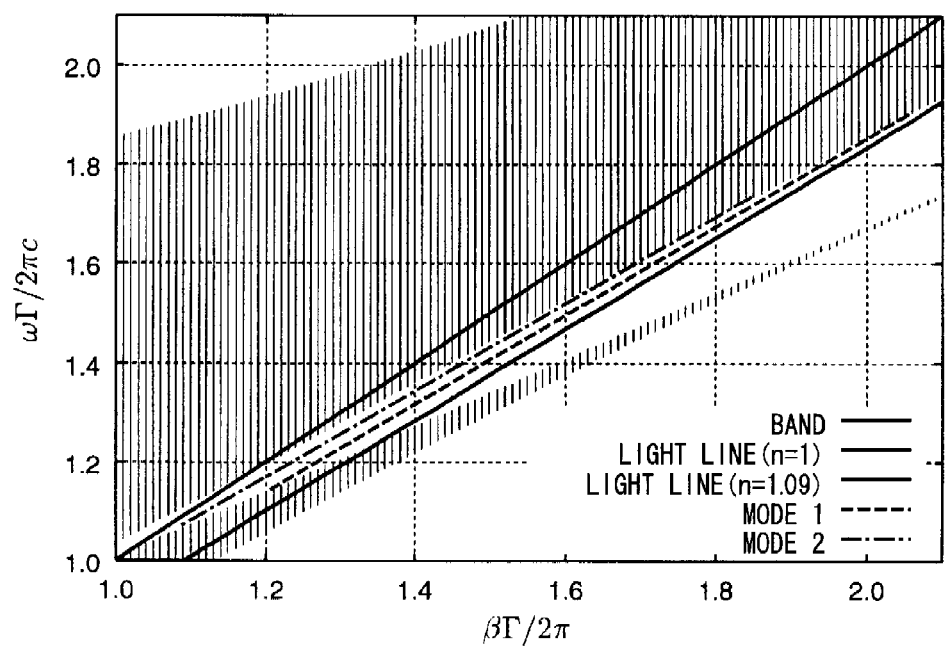
FIG. 108 is a graph showing the dispersion in the first band gap of the PBGF of Example 4-5.

The inventors of the present invention produced a PBGF hexagonal air hole extended triangular lattice configuration having a capillary core, as shown by the end faces in FIGS. 106 and 107. The black parts are air holes and the white parts are silica portions in FIG. 107. This PBGF has $\Gamma=0.75$ μm, $\omega_r/\Lambda=0.7$, $\omega_b/\Lambda=0.1$. FIG. 108 shows the dispersion in the first band gap of this PBGF. As shown in FIG. 108, a mode 1 is present in a range of $\Gamma/\lambda=1.15$ to 1.91, and a mode 2 is present in a range of $\Gamma/\lambda=1.06$ to 1.74 in the first band gap of this PBGF. The mode in this case includes a degenerative mode, the mode 1 is double degenerative, while the mode 2 is quadruple degenerative.

Figure 109:
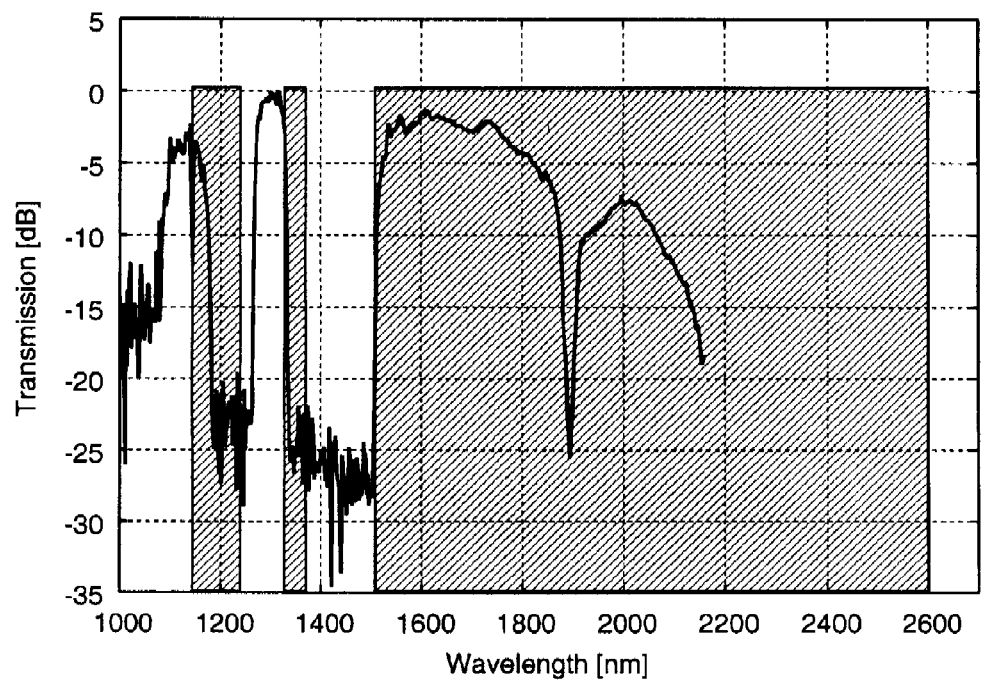
FIG. 109 is a graph showing the transmission characteristics of the PBGF of Example 4-5.

FIG. 109 is a graph showing the results of measurement of transmission characteristics of the PBGF (a length of 1 m) produced in this way. The bold line in FIG. 109 indicates measured values; the shaded region indicates the band estimated from calculations. The two transmission bandwidths in the short wavelength side correspond to the high order band gap. The transmission bandwidth greater than a wavelength of 1550 m corresponds to the first band gap. The measured values are restricted to about 2150 nm because of the limitation of the measuring equipment. The drop in measured values observed near a wavelength of 1900 nm is due to the loss of the remaining OH radical in the fiber (P. Kaiser, A. R. Tynes, H. W. Astle, A. D. Pearson, W. G. French, R. E. Jaeger, and A. H. Cherinet, "Spectral losses of unclad vitreous silica and soda-lime-silicate fibers," J. Opt. Soc. Amer., vol. 63, pp. 1141-1148, September 1973).

Figure 110:
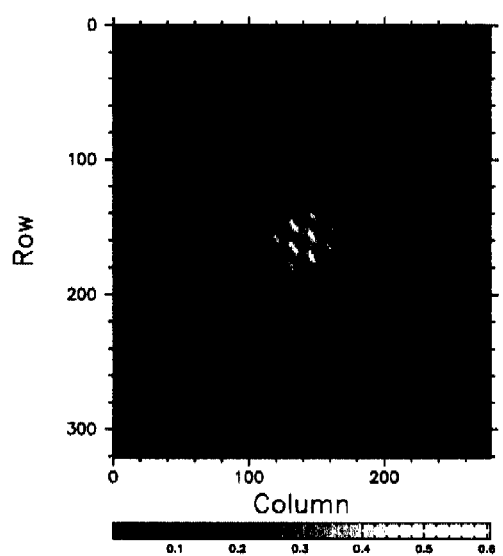
FIG. 110 shows the power distribution of mode 1 of the PBGF of Example 4-5.
Figure 111:
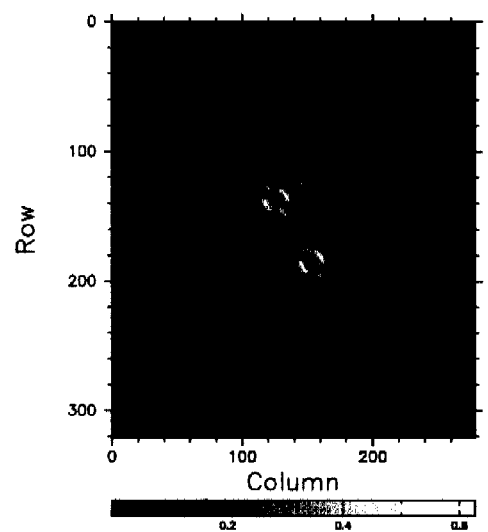
FIG. 111 shows the power distribution of mode 2 of the PBGF of Example 4-5.

FIG. 110 and FIG. 111 show the typical power distributions of the mode 1 and the mode 2 respectively of the PBGF.

Figure 112:
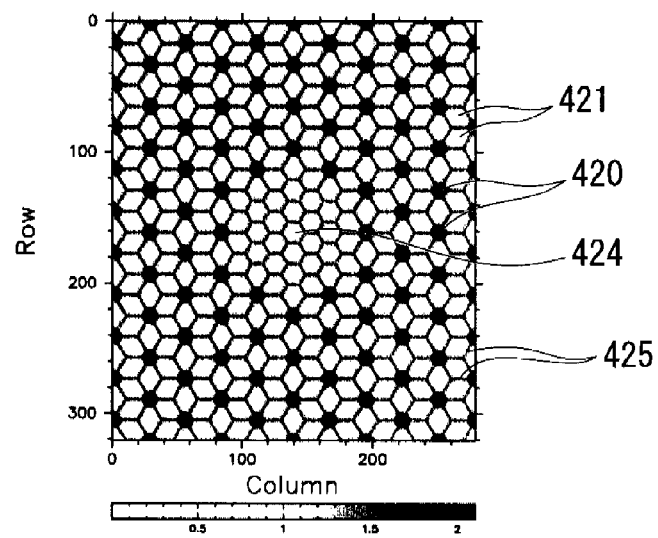
FIG. 112 shows the permittivity distribution of the PBGF of Example 4-5.

FIG. 112 shows the permittivity distribution of the PBGF.

EXAMPLE 4-6

Figure 113:
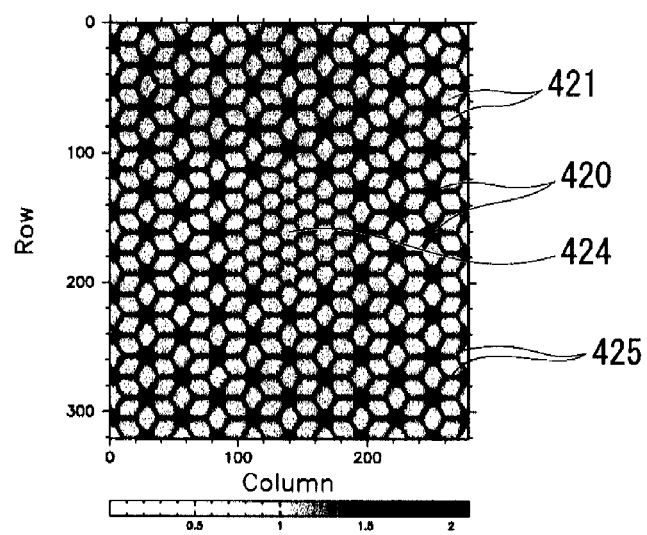
FIG. 113 is a cross section of a PBGF using a hexagonal air hole extended triangular lattice structure with $\omega_r/\Lambda=0.8$, $\omega_b/\Lambda=0.1$, produced in Example 4-6.
Figure 114:
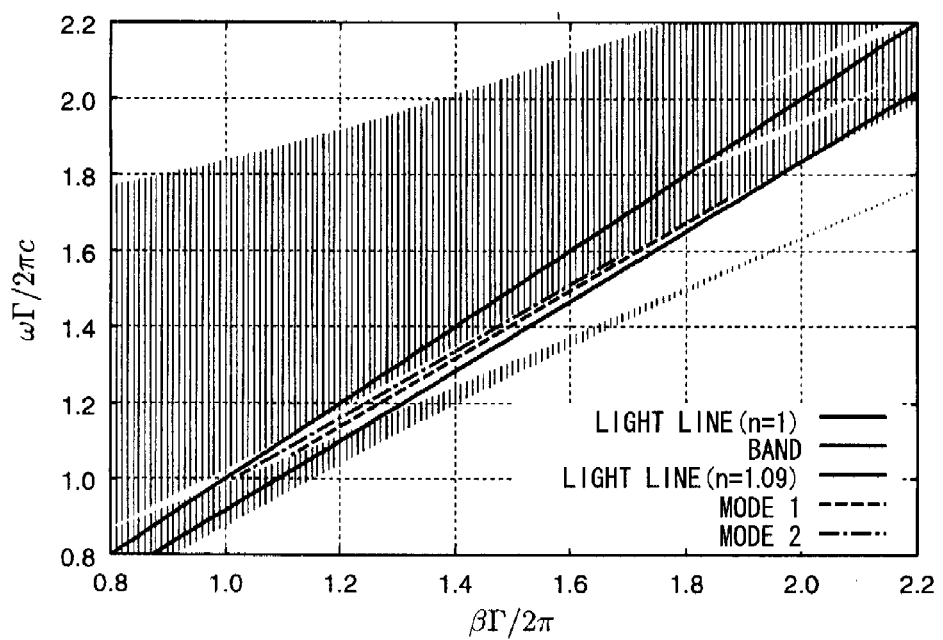
FIG. 114 is a graph showing the dispersion in the first band gap of the PBGF of Example 4-6.

As shown in FIG. 113, a PBGF was produced with a cladding containing a hexagonal air hole extended triangular lattice structure wherein $\omega_r/\Lambda=0.8$, $\omega_b/\Lambda=0.1$, and having a core 424 (capillary core) wherein the central silica portion 420, and six silica portions 420 in one layer on the outside of the central silica portion, were replaced by the air hole 421, and the dispersion of the transmission mode was calculated. FIG. 114 is a graph that shows the dispersion of the first band gap of this PBGF.

As shown in FIG. 114, if the core 424 is a complete air hole core, a transmission mode can be made present in the band gap above the light line (n=1) transmitted through air. Compared to the presence of the transmission mode in a range of $\Gamma/\lambda=0.9$ to 1.12, in case of a capillary core, a transmission mode can be made present in the band gap above the light line (n=1.09) in dielectric, therefore, a transmission mode is present in a range of $\Gamma/\lambda=1.00$ to 1.79, the transmission bandwidth becomes wider and shifts to the short wavelength side. In practice, the mode 1 is present in a range of $\Gamma/\lambda=1.05$ to 1.75, and the mode 2 is present in a range of $\Gamma/\lambda=1.00$ to 1.58. However, the degenerative mode is included in each core mode.

Figure 115:
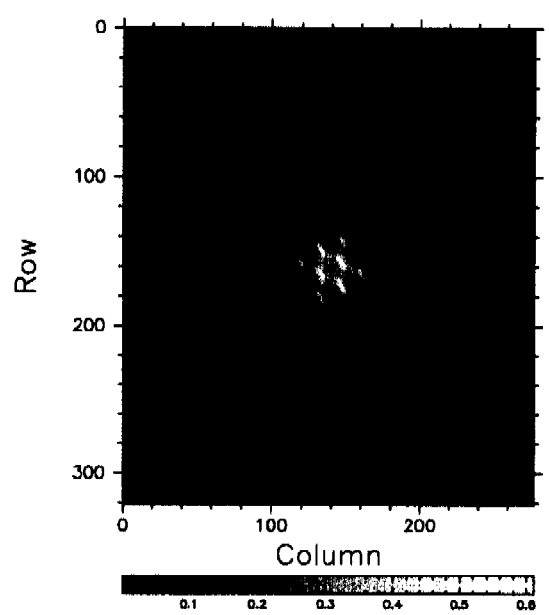
FIG. 115 shows the power distribution of mode 1 of the PBGF of Example 4-6.
Figure 116:
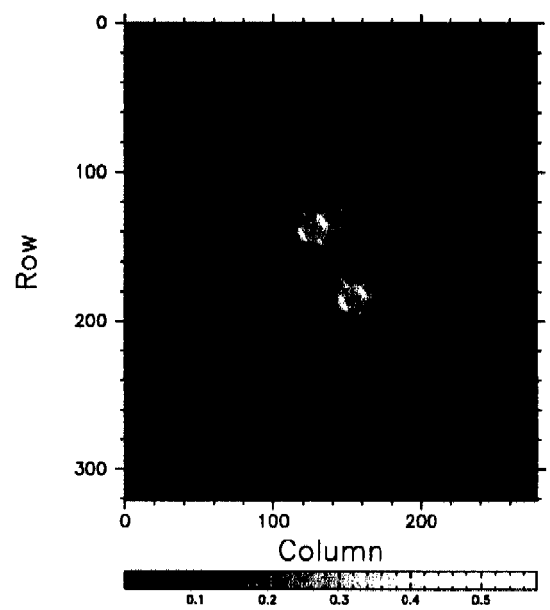
FIG. 116 shows the power distribution of mode 2 of the PBGF of Example 4-6.

FIG. 115 shows the typical power distribution of the core mode 1 at this stage. FIG. 116 shows the typical power distribution of the core mode 2 in this case.

Figure 117:
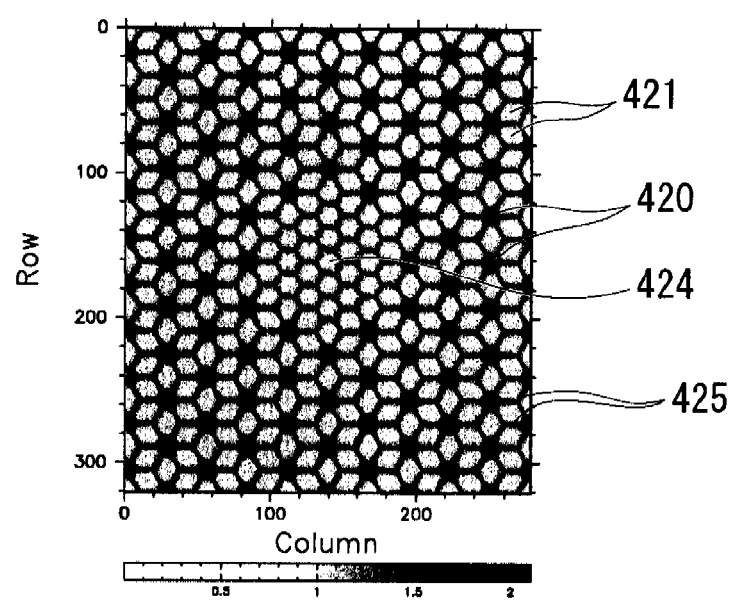
FIG. 117 shows the permittivity distribution of the PBGF of Example 4-6.

FIG. 117 shows the permittivity distribution of the fiber drawn to the same scale as FIG. 113.

EXAMPLE 4-7

Figure 118:
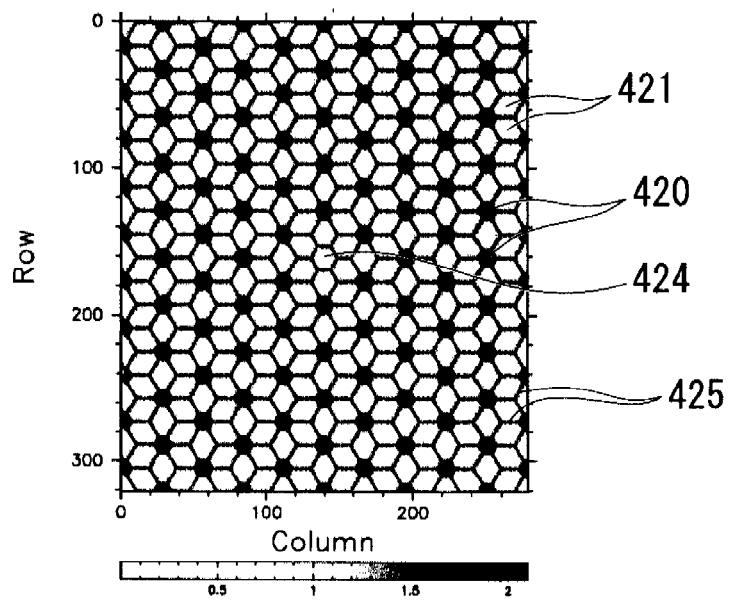
FIG. 118 is a cross section of the PBGF using a hexagonal air hole extended triangular lattice structure with $\omega_r/\Lambda=0.7$, $\omega_b/\Lambda=0.1$ produced in Example 4-7.
Figure 119:
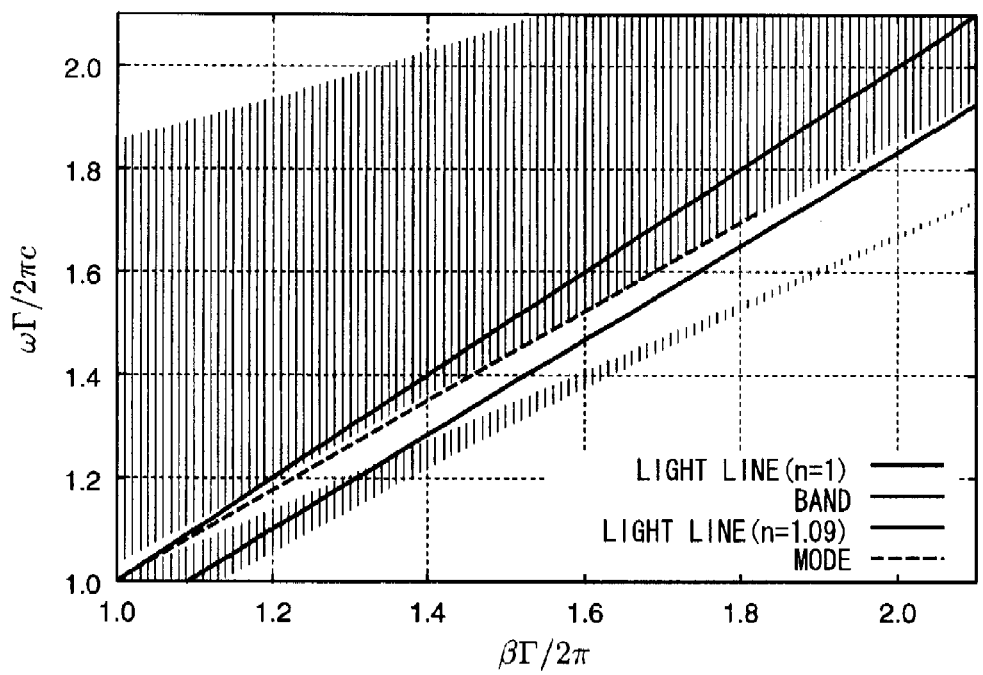
FIG. 119 is a graph showing the dispersion in the first band gap of the PBGF of Example 4-7.

As shown in FIG. 118, a PBGF was produced with cladding containing a hexagonal air hole extended triangular lattice structure wherein $\psi_r/\Lambda=0.7$, $\omega_b/\Lambda=0.1$, and having a core 424 (capillary core) wherein the central silica portion 420 is replaced by the air hole 421, and the dispersion of the transmission mode was calculated. FIG. 119 is a graph showing the dispersion in the first band gap of this PBGF.

As shown in FIG. 119, if the core 424 is a complete air hole core, a transmission mode can be made present in the band gap above the light line (n=1) transmitted through air. Compared to the presence of a transmission mode in a range of $\Gamma/\lambda=0.93$ to 1.16, in case of a capillary core, a transmission mode can be made present in the band gap above the light line (n=1.09) in dielectric, therefore, a transmission mode is present in a range of $\Gamma/\lambda=1.01$ to 1.73. The core diameter D in this case is small, therefore, the mode is a single mode. However, this mode is double degraded. In this way, compared to the air hole core fiber, the transmission bandwidth becomes wider and shifts to the short wavelength side in the capillary core fiber.

Figure 120:
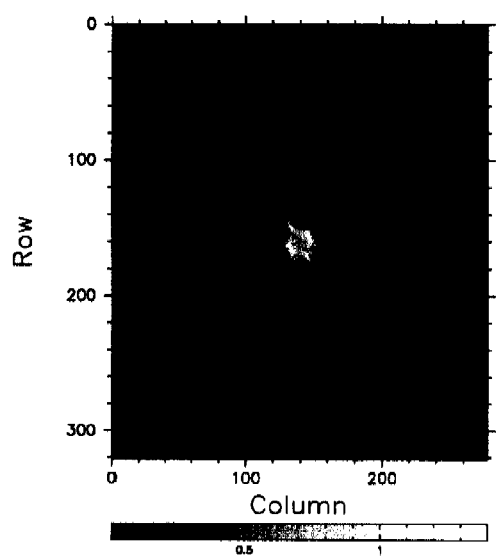

FIG. 120 shows the typical power distribution of the mode at this stage.

Figure 121:
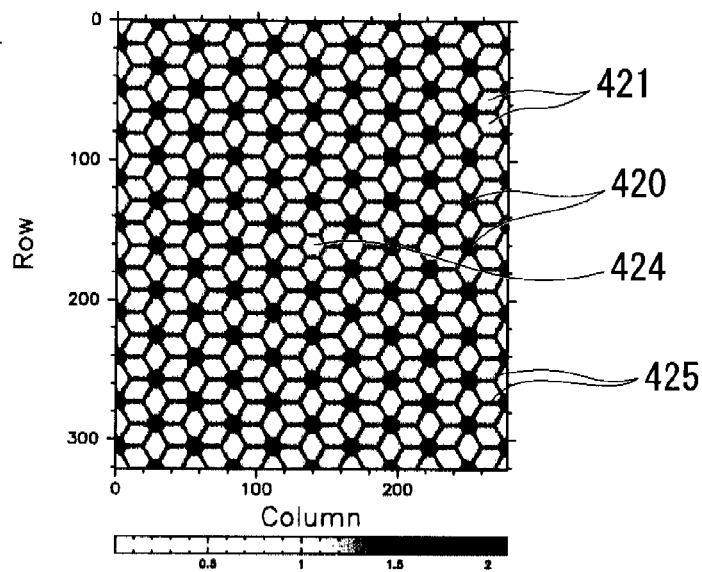

FIG. 121 shows the permittivity distribution of the fiber drawn to the same scale as FIG. 118.

EXAMPLE 4-8

Figure 122:
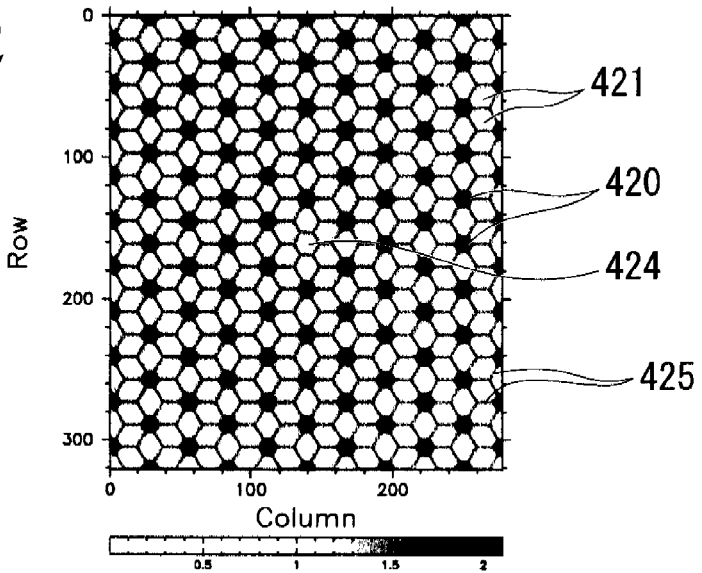
Figure 123:
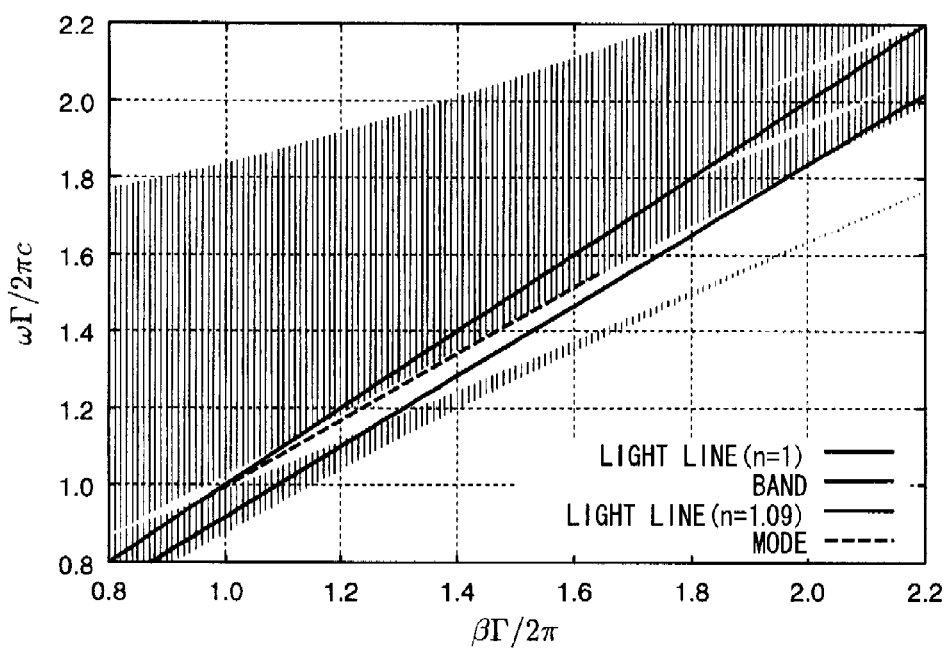

As shown in FIG. 122, a PBGF was produced with cladding containing a hexagonal air hole extended triangular lattice structure wherein $\omega_r/\Lambda=0.8$, $\omega_b/\Lambda=0.1$, and having a core 424 (capillary core) wherein the central silica portion 420 is replaced by the air hole 421, and the dispersion of the transmission mode was calculated. FIG. 123 is a graph showing the dispersion in the first band gap of this PBGF.

As shown in FIG. 123, if the core 424 is a complete air hole core, a transmission mode can be made present in the band gap above the light line (n=1) transmitted through air. Compared to the presence of a transmission mode in a range of $\Gamma/\lambda=0.90$ to 1.12, in case of a capillary core, a transmission mode can be made present in the band gap above the light line (n=1.09) in dielectric, therefore, a transmission mode is present in a range of $\Gamma/\lambda=0.97$ to 1.56. The core diameter D in this case is small, therefore, the mode is a single mode. However, this mode is double degenerative. In this way, compared to the air hole core fiber, the transmission bandwidth becomes wider and shifts to the short wavelength side in the capillary core fiber.

Figure 124:
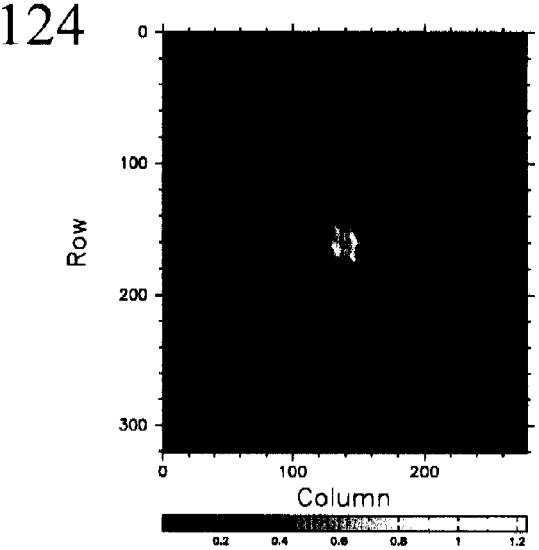

FIG. 124 shows the typical power distribution of the mode at this stage.

Figure 125:
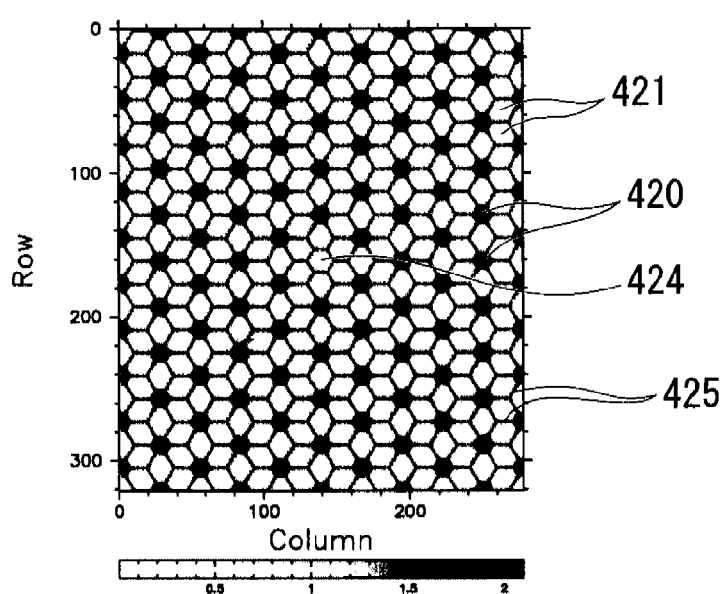

FIG. 125 shows the permittivity distribution of the fiber drawn to the same scale as FIG. 122.

While embodiments of the invention have been described and illustrated above, it may be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A photonic band gap fiber comprising:
    silica portions;
    multiple air holes, provided in the silica portions, extending in a longitudinal direction of the photonic band gap fiber; and
    a cladding having an air hole periodic structure in an extended triangular lattice configuration in a cross section of the photonic band gap fiber,
    wherein: first rows each having a number of air holes at a first pitch, and second rows each having a plurality of air holes at a second pitch which is twice the first pitch, are arranged such that the air holes of the first rows are disposed alternately with the air holes of the second rows, and wherein the first rows and the second rows are arranged so as to form the extended triangular lattice configuration in the cross section of the photonic band gap fiber; and
    the photonic band gap fiber further comprises an air hole core which has a substantially circular shape in the cross section of the photonic band gap fiber, and a diameter D of the air hole core satisfies $0.7\Lambda \leq D \leq 3.3\Lambda$ with respect to the first pitch $\Lambda$.

2. A photonic band gap fiber comprising:
    silica portions;
    multiple air holes, provided in the silica portions, extending in a longitudinal direction of the photonic band gap fiber; and
    a cladding having an air hole periodic structure in an extended triangular lattice configuration in a cross section of the photonic band gap fiber;
    wherein: first rows each having a number of air holes at a first pitch, and second rows each having a plurality of air holes at a second pitch which is twice the first pitch, are arranged such that the air holes of the first rows are disposed alternately with the air holes of the second rows, and wherein the first rows and the second rows are arranged so as to form the extended triangular lattice configuration in the cross section of the photonic band gap fiber; and
    the photonic band gap fiber further comprises an air hole core which has a substantially circular shape in the cross section of the photonic band gap fiber and a diameter D of the air hole core satisfies $4.7\Lambda \leq D \leq 7.3\Lambda$ with respect to the first pitch $\Lambda$.

3. A photonic band gap fiber comprising:
    silica portions;
    multiple air holes, provided in the silica portions, extending in a longitudinal direction of the photonic band gap fiber; and
    a cladding having an air hole periodic structure in an extended triangular lattice configuration in a cross section of the photonic band gap fiber;
    wherein: first rows each having a number of air holes at a first pitch, and second rows each having a plurality of air holes at a second pitch which is twice the first pitch, are arranged such that the air holes of the first rows are disposed alternately with the air holes of the second rows, and wherein the first rows and the second rows are arranged so as to form the extended triangular lattice configuration in the cross section of the photonic band gap fiber; and
    the photonic band gap fiber further comprises an air hole core which has a substantially circular shape in the cross section of the photonic band gap fiber and a diameter D of the air hole core satisfies $8.7\Lambda \leq D \leq 11.3\Lambda$ with respect to the first pitch $\Lambda$.

4. The photonic band gap fiber according to any one of claims 1, 2, and 3, wherein the air holes each have a circular cross section with a diameter d that satisfies $0.85\Lambda \leq d \leq \Lambda$ with respect to the first pitch $\Lambda$.

5. The photonic band gap fiber according to any one of claims 1, 2, and 3, wherein three or more layers of the air hole periodic structure in the extended triangular lattice configuration in the cladding are provided outside the air hole core.

6. The photonic band gap fiber according to any one of claims 1, 2, and 3, having a core mode in which 60% or more of a transmitting power is concentrated in the air hole core region, and having optical characteristics wherein a surface mode is substantially absent.

7. The photonic band gap fiber according to any one of claims 1, 2, and 3, having an optical characteristic wherein only a single core mode (where the number of modes in case of all degenerative modes is taken as 1) is present.

8. The photonic band gap fiber according to any one of claims 1, 2, and 3, having an optical characteristic wherein a core mode is present when a wavelength $\lambda$, transmitted in the photonic band gap fiber, satisfies a range of $0.7 \leq \Gamma/\lambda \leq 1.2$ (where $\Gamma=2\Lambda$, and $\Lambda$ is the first pitch).

9. The photonic band gap fiber according to any one of claims 1, 2, and 3, having an optical characteristic wherein a core mode is present when a wavelength $\lambda$, transmitted in the photonic band gap fiber, satisfies a range of $1.4 \leq \Gamma/\lambda \leq 1.8$ (where $\Gamma=2\Lambda$, and $\Lambda$ is the first pitch).

* * * * *